(12) United States Patent
Tajima et al.

(10) Patent No.: US 12,222,683 B2
(45) Date of Patent: Feb. 11, 2025

(54) CONNECTING MEMBER, POWER SUPPLY DEVICE, ELECTRONIC DEVICE, AND SYSTEM

(71) Applicant: SEMICONDUCTOR ENERGY LABORATORY CO., LTD., Atsugi (JP)

(72) Inventors: Ryota Tajima, Kanagawa (JP); Kensuke Yoshizumi, Kanagawa (JP)

(73) Assignee: SEMICONDUCTOR ENERGY LABORATORY CO., LTD., Kanagawa-ken (JP)

( * ) Notice: Subject to any disclaimer, the term of this patent is extended or adjusted under 35 U.S.C. 154(b) by 0 days.

(21) Appl. No.: 18/205,268

(22) Filed: Jun. 2, 2023

(65) Prior Publication Data

US 2023/0324852 A1    Oct. 12, 2023

Related U.S. Application Data

(63) Continuation of application No. 16/926,891, filed on Jul. 13, 2020, now Pat. No. 11,714,385, which is a (Continued)

(30) Foreign Application Priority Data

Feb. 26, 2016  (JP) .................................. 2016-035810

(51) Int. Cl.
*G04B 37/14* (2006.01)
*A44C 5/00* (2006.01)
(Continued)

(52) U.S. Cl.
CPC ........ *G04B 37/1493* (2013.01); *A44C 5/0053* (2013.01); *A44C 5/14* (2013.01);
(Continued)

(58) Field of Classification Search
CPC ..... G04B 37/1493; A44C 5/0053; A44C 5/14; G04G 17/06; G04G 19/00; H01M 50/202;
(Continued)

(56) References Cited

U.S. PATENT DOCUMENTS 2,032,557 A    3/1936   Baker
2,805,391 A    9/1957   Meadows
(Continued)

FOREIGN PATENT DOCUMENTS

CA    2915579 C  *  7/2019  ........... B60R 16/033
CN    001305128 A     7/2001
(Continued)

OTHER PUBLICATIONS

International Search Report (Application No. PCT/IB2017/050834) Dated May 30, 2017.
(Continued)

*Primary Examiner* — M Baye Diao
(74) *Attorney, Agent, or Firm* — NIXON PEABODY LLP; Jeffrey L. Costellia

(57) ABSTRACT

A device capable of being used for a long time is achieved. A power supply, a connection method of a power supply, or a connecting member, for easy attachment and detachment and non-detachment when in use, is provided. A power supply, a connection method of a power supply, or a connecting member for easy replacement is provided. A highly designed power supply is provided. Power from a battery is supplied to an electronic device through a connecting member including a pipe, a spring, and a pair of pivots. The pair of pivots are electrically insulated from each other, and electrically connected to any one of a pair of electrodes of the battery. The electronic device into which the pair of pivots are inserted includes a pair of bearings capable of receiving power.

6 Claims, 20 Drawing Sheets

Related U.S. Application Data continuation of application No. 15/434,864, filed on Feb. 16, 2017, now Pat. No. 10,770,910.

(51) Int. Cl.
| | |
|---|---|
| *A44C 5/14* | (2006.01) |
| *G04G 17/06* | (2006.01) |
| *G04G 19/00* | (2006.01) |
| *H01M 50/202* | (2021.01) |
| *H01M 50/569* | (2021.01) |
| *H02J 7/00* | (2006.01) |

(52) U.S. Cl.
CPC .............. *G04G 17/06* (2013.01); *G04G 19/00* (2013.01); *H01M 50/202* (2021.01); *H01M 50/569* (2021.01); *H02J 7/0045* (2013.01); *H01M 2220/30* (2013.01)

(58) Field of Classification Search
CPC ........... H01M 50/569; H01M 2220/30; H01M 50/50; H02J 7/0045; H02J 7/007; H02J 7/0031; H02J 7/00302; H02J 7/00306; H02J 7/0063; Y02E 60/10
USPC ......................................................... 320/107
See application file for complete search history.

(56) References Cited

U.S. PATENT DOCUMENTS

| | | | |
|---|---|---|---|
| 3,032,651 A | 5/1962 | Gisiger-Stahli | |
| 3,670,491 A | 6/1972 | Weschler | |
| 4,168,607 A | 9/1979 | Friedman | |
| 5,615,179 A | 3/1997 | Yamamoto et al. | |
| 5,672,953 A | 9/1997 | Kim | |
| 5,742,256 A | 4/1998 | Wakabayashi | |
| 6,014,793 A | 1/2000 | Howald | |
| 6,137,675 A | 10/2000 | Perkins | |
| 6,396,771 B2 | 5/2002 | Paratte | |
| 7,280,844 B2 | 10/2007 | Ikeda et al. | |
| 8,929,085 B2 | 1/2015 | Franklin et al. | |
| 9,065,143 B2 | 6/2015 | Kwon et al. | |
| 9,274,562 B2 | 3/2016 | Franklin et al. | |
| 9,293,783 B2 | 3/2016 | Kwon et al. | |
| 9,461,386 B1 | 10/2016 | Johns | |
| 9,507,324 B2 | 11/2016 | Guo et al. | |
| 9,557,874 B2 | 1/2017 | Franklin et al. | |
| 9,971,448 B2 | 5/2018 | Franklin et al. | |
| 10,141,612 B2 | 11/2018 | Yang | |
| 10,318,061 B2 | 6/2019 | Franklin et al. | |
| 10,476,291 B2 | 11/2019 | Rho et al. | |
| 10,739,908 B2 | 8/2020 | Franklin et al. | |
| 10,770,910 B2 * | 9/2020 | Tajima ................... G04G 17/06 | |
| 10,879,725 B2 * | 12/2020 | Hong ...................... H02J 7/342 | |
| 11,675,390 B2 | 6/2023 | Franklin et al. | |
| 11,994,906 B2 | 5/2024 | Franklin et al. | |
| 2004/0093689 A1 | 5/2004 | Sosa et al. | |
| 2008/0020812 A1 | 1/2008 | Kobayashi et al. | |
| 2009/0071952 A1 | 3/2009 | Kuwabara | |
| 2009/0237033 A1 | 9/2009 | Kanzaki et al. | |
| 2011/0089903 A1 | 4/2011 | Heikkinen | |
| 2012/0077437 A1 * | 3/2012 | Agevik ............. A61M 16/0057 | |
| | | | 340/539.13 |
| 2012/0300595 A1 | 11/2012 | Kamiyama et al. | |
| 2014/0015330 A1 | 1/2014 | Byun et al. | |
| 2014/0078462 A1 | 3/2014 | Abreu | |
| 2014/0142467 A1 | 5/2014 | Tropper et al. | |
| 2014/0174958 A1 | 6/2014 | Martinez et al. | |
| 2014/0177399 A1 * | 6/2014 | Teng ....................... G04C 10/00 | |
| | | | 368/204 |
| 2014/0184165 A1 | 7/2014 | Takahashi et al. | |
| 2015/0022957 A1 | 1/2015 | Hiroki et al. | |
| 2015/0077048 A1 | 3/2015 | Bae | |
| 2015/0130411 A1 | 5/2015 | Kim | |
| 2015/0220172 A1 | 8/2015 | Garcia et al. | |
| 2015/0223355 A1 * | 8/2015 | Fleck ....................... G06F 1/163 |
| | | | 361/679.03 |
| 2015/0304757 A1 * | 10/2015 | Kim ..................... H04R 1/1041 |
| | | | 381/74 |
| 2015/0340664 A1 | 11/2015 | Takahashi et al. | |
| 2016/0043359 A1 | 2/2016 | Miyake | |
| 2016/0043363 A1 | 2/2016 | Tajima et al. | |
| 2016/0073519 A1 | 3/2016 | Hiroki | |
| 2016/0087305 A1 | 3/2016 | Yoneda et al. | |
| 2016/0094079 A1 * | 3/2016 | Hiroki .................... H02J 7/34 |
| | | | 320/108 |
| 2016/0094259 A1 | 3/2016 | Hatanaka et al. | |
| 2016/0118640 A1 | 4/2016 | Miyake | |
| 2016/0156012 A1 | 6/2016 | Takahashi et al. | |
| 2016/0156071 A1 | 6/2016 | Yamakaji et al. | |
| 2016/0157372 A1 | 6/2016 | Hiroki | |
| 2016/0204437 A1 | 7/2016 | Tajima et al. | |
| 2016/0218327 A1 | 7/2016 | Takahashi et al. | |
| 2016/0218387 A1 | 7/2016 | Tajima | |
| 2016/0223992 A1 | 8/2016 | Seo et al. | |
| 2016/0226055 A1 | 8/2016 | Miyake | |
| 2016/0233469 A1 | 8/2016 | Kimura | |
| 2016/0240325 A1 | 8/2016 | Tajima et al. | |
| 2016/0254500 A1 | 9/2016 | Kawata et al. | |
| 2016/0313769 A1 | 10/2016 | Yoshitani. et al. | |
| 2016/0315296 A1 | 10/2016 | Kimura et al. | |
| 2016/0322612 A1 | 11/2016 | Takahashi et al. | |
| 2016/0329533 A1 | 11/2016 | Tajima | |
| 2016/0343999 A1 | 11/2016 | Yonemura et al. | |
| 2016/0363957 A1 * | 12/2016 | Stroetmann ............ G04G 17/06 |
| 2016/0372717 A1 | 12/2016 | Noda | |
| 2017/0005364 A1 | 1/2017 | Yamazaki et al. | |
| 2017/0005504 A1 | 1/2017 | Rho et al. | |
| 2017/0033326 A1 | 2/2017 | Goto et al. | |
| 2017/0033327 A1 | 2/2017 | Tajima | |
| 2017/0117511 A1 | 4/2017 | Takahashi et al. | |
| 2017/0117589 A1 | 4/2017 | Tajima et al. | |
| 2017/0141359 A1 | 5/2017 | Ueda et al. | |

FOREIGN PATENT DOCUMENTS

| | | | |
|---|---|---|---|
| CN | 1114336 C * | 7/2003 | ........... G06F 1/1616 |
| CN | 002752826 Y | 1/2006 | |
| CN | 101129233 A | 2/2008 | |
| CN | 102790570 A | 11/2012 | |
| CN | 202883693 U | 4/2013 | |
| CN | 103827771 A | 5/2014 | |
| CN | 203673261 U | 6/2014 | |
| CN | 203909483 U | 10/2014 | |
| CN | 104188284 A | 12/2014 | |
| CN | 104238349 A | 12/2014 | |
| CN | 104466093 A | 3/2015 | |
| CN | 104752779 A | 7/2015 | |
| CN | 105186638 A | 12/2015 | |
| CN | 204812425 U | 12/2015 | |
| CN | 204989782 U | 1/2016 | |
| CN | 105917517 A | 8/2016 | |
| EP | 0660204 A | 6/1995 | |
| EP | 0876114 A | 11/1998 | |
| EP | 2846381 A | 3/2015 | |
| EP | 3299927 A | 3/2018 | |
| EP | 3940503 A | 1/2022 | |
| JP | 53-031465 A | 3/1978 | |
| JP | 57-072915 A | 5/1982 | |
| JP | 61-010594 A | 1/1986 | |
| JP | 07-029497 A | 6/1995 | |
| JP | 2000-019201 A | 1/2000 | |
| JP | 2000-505664 | 5/2000 | |
| JP | 3041955 | 5/2000 | |
| JP | 2005-045531 A | 2/2005 | |
| JP | 2006/057350 | 6/2008 | |
| JP | 2012-032070 A | 2/2012 | |
| JP | 2015-038868 A | 2/2015 | |
| KR | 2013-0044836 A | 5/2013 | |
| KR | 2015-0079440 A | 7/2015 | |
| KR | 10-154846 | 8/2015 | |
| KR | 10-1548465 | 8/2015 | |
| WO | WO-1997/024044 | 7/1997 | |

(56) References Cited

FOREIGN PATENT DOCUMENTS

| WO | WO-1997/036181 | 10/1997 |
| WO | WO-2013/048925 | 4/2013 |
| WO | WO-2015/133066 | 9/2015 |

OTHER PUBLICATIONS

Written Opinion (Application No. PCT/IB2017/050834) Dated May 30, 2017.
Chinese Office Action (Application No. 201780011715.9) Dated Nov. 1, 2019.
Chinese Office Action (Application No. 202110518674.0) Dated Feb. 21, 2022.
Chinese Office Action (Application No. 202211284897.6) Dated Dec. 12, 2023.
Chinese Office Action (Application No. 202211284897.6) Dated Jul. 31, 2024.

\* cited by examiner

CONNECTING MEMBER, POWER SUPPLY DEVICE, ELECTRONIC DEVICE, AND SYSTEM

TECHNICAL FIELD

One embodiment of the present invention relates to a battery. One embodiment of the present invention relates to a power transmission mechanism of a battery. One embodiment of the present invention relates to a wearable electronic device. One embodiment of the present invention relates to a system for charging and discharging of a battery.

Note that one embodiment of the present invention is not limited to the above technical fields. Examples of the technical field of one embodiment of the present invention disclosed in this specification include a semiconductor device, a display device, a light-emitting device, a power storage device, a memory device, an electronic device, a lighting device, an input device, an input/output device, a driving method thereof, and a fabricating method thereof.

BACKGROUND ART

Mobile information terminals typified by smartphones and tablet devices have been actively developed. Such mobile information terminals are required to be lightweight, compact, for example.

In recent years, wearable electronic devices (also referred to as wearable devices) especially have been under active development. Examples of wearable devices include a watch-type device worn on an arm, a glasses-like device worn on a head, and a necklace-type device worn on a neck. For example, a watch-type device includes a small-sized display instead of a conventional watch dial to provide the user with various information in addition to the time. Such wearable devices have attracted attention to the medical use, the use for self-health management, or the like and have been increasingly put into practical use.

Mobile devices include secondary batteries that are capable of being repeatedly charged and discharged, in many cases. Wearable devices particularly include small-sized secondary batteries; thus, secondary batteries should be lightweight and compact and should be capable of being used for a long time.

For example, Patent Document 1 discloses a wearable device including a flexible secondary battery in which a film is used as its exterior body.

REFERENCE

Patent Document

[Patent Document 1] Japanese Published Patent Application No. 2015-038868

DISCLOSURE OF INVENTION

An object of one embodiment of the present invention is to achieve a device which is capable of being used for a long time.

Another object of one embodiment of the present invention is to provide a power supply device that is easily attached and detached and that is not detached when in use. Another object is to provide a power supply device that can be easily replaced. Another object is to provide a highly designed power supply device. Another object is to provide a comfortably fittable power supply device.

Another object is to provide a connection method or a connecting member for such a power supply device. Another object is to provide a device to which such a power supply device is connectable. Another object is to provide an electronic device in which such a power supply device is used and a system including the electronic device.

One embodiment of the present invention is a connecting member including a pair of pivots, a pipe, and a spring. Each of the pivots includes a tip portion, a collar portion, an axis portion, and an end portion. The spring is placed in the pipe and is placed between the pair of pivots. The end portion is a portion that is placed in the pipe. The tip portion and the collar portion are portions that are projected from the pipe in a natural state. The axis portion is a portion that is placed between the collar portion and the end portion. The axis portion includes a portion that is projected from the pipe in a natural state and is placed in the pipe when the spring is compressed. The axis portion and the tip portion each have a conductive portion. The pair of pivots are electrically insulated from each other.

In the above, each of a surface of the end portion and a surface of part of the axis portion on the end portion side, in each of the pair of pivots, preferably has an insulating property.

In addition, it is preferable that two springs be provided and a cushioning member be provided between the two springs. In this structure, a surface of the cushioning member preferably has an insulating property. Additionally, the cushioning member and the pipe are preferably integrated with each other in this structure.

In the above, a surface of the spring preferably has an insulating property.

Another embodiment of the present invention is a power supply device including the above connecting member, a battery, and a band-like exterior body. The battery includes a pair of electrodes. The pair of electrodes are electrically connected to the axis portions. The exterior body covers the battery and the pipe of the connecting member. The tip portions of the connecting member are not covered by the exterior body.

The above structure preferably includes a pair of conductive members. It is preferable that the conductive members be electrically connected to the electrodes of the battery. The axis portions preferably fit into the conductive members so as to be in contact with each other.

In the above, the axis portions preferably fit into the conductive members so as to be rotatable in a rotating direction and be slidable in an extending direction of the axis portions.

Alternatively, in the above, the axis portions preferably fit into the conductive members so as to be fixed in a rotating direction and be slidable in an extending direction of the axis portions.

In the above, the exterior body is preferably flexible. The battery preferably has a function of changing its shape following a change in the shape of the exterior body.

Another embodiment of the present invention is an electronic device to which the above connecting member or the above power supply device is attachable. The electronic device includes a housing and a power control circuit. The housing includes a pair of bearings. The power control circuit is placed in the housing. The bearings can be electrically connected to the tip portions of the connecting member. It is preferable that the pair of bearings each be electrically connected to the power control circuit by wirings.

In the above, the housing preferably includes a sensor that has a function of sensing whether the pair of bearings are electrically insulated from or electrically connected to each other.

Alternatively, in the above, the housing preferably includes a sensor that has a function of sensing a potential difference between the pair of bearings.

Another embodiment of the present invention is a system including a pair of bearings, a control portion, a power supply control portion, a first battery, a sensor, and a functional circuit. The sensor has a function of outputting a potential difference between the pair of bearings to the control portion as a potential information. The power supply control portion is controlled by the control portion and has a function of outputting any one of power of the first battery and power supplied from the pair of bearings to the functional circuit. The control portion has a function of controlling the power supply control portion to output the power of the first battery when the potential information is information indicating any of a conductive state, an insulated state, and a state in which the potential difference is under a predetermined value. In addition, the control portion has a function of controlling the power supply control portion to output the power supplied from the pair of bearings when the potential information is information indicating a state in which the potential difference is greater than or equal to the predetermined value.

The above structure preferably includes a power receiving portion. The power supply control portion preferably has a function of outputting power supplied from the power receiving portion to the first battery and the pair of bearings. In addition, the control portion preferably has a function of controlling the power supply control portion to output the power supplied from the power receiving portion to the pair of bearings when the potential information is information indicating a state in which the potential difference is under the predetermined value.

According to one embodiment of the present invention, a device which is capable of being used for a long time can be achieved. A power supply device that is easily attached and detached and that is not detached when in use can be provided. A power supply device that can be easily replaced can be provided. A highly designed power supply device can be provided. A comfortably fittable power supply device can be provided.

According to one embodiment of the present invention, a connection method or a connecting member for such a power supply device can be provided. A device to which such a power supply device is connectable can be provided. An electronic device in which such a power supply device is used and a system including the electronic device can be provided.

BEST MODE FOR CARRYING OUT THE INVENTION

Figure 1A:
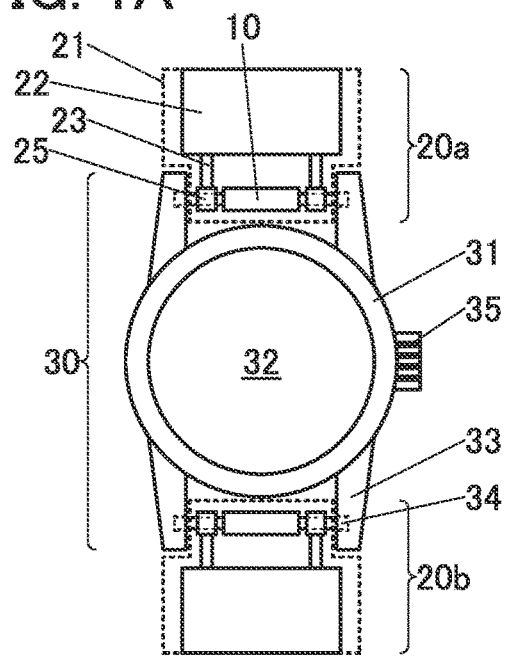
FIGS. 1A to 1E each illustrate an electronic device, a power supply device, and a connecting member of an embodiment.

Embodiments will be described in detail with reference to the drawings. Note that the present invention is not limited to the following description. It will be readily appreciated by those skilled in the art that modes and details of the present invention can be modified in various ways without departing from the spirit and scope of the present invention. Thus, the present invention should not be construed as being limited to the description in the following embodiments.

Note that in structures of the present invention described below, the same portions or portions having similar functions are denoted by the same reference numerals in different drawings, and a description thereof is not repeated. Furthermore, the same hatching pattern is applied to portions having similar functions, and the portions are not especially denoted by reference numerals in some cases.

Note that in each drawing described in this specification, the size, the layer thickness, or the region of each component is exaggerated for clarity in some cases. Therefore, the size, the layer thickness, or the region is not limited to the illustrated scale.

Note that in this specification and the like, ordinal numbers such as "first," "second," and the like are used in order to avoid confusion among components and do not limit the number.

Embodiment 1

One embodiment of the present invention is a connecting member including a pipe, a spring, and a pair of pivots. The connecting member, in a watch-type device for example, can be used as a spring bar for attaching a band (also referred to as a strap, a belt, or the like) to a housing (also referred to as a body, a case, or the like). Note that, hereinafter, the connecting member of one embodiment of the present invention is referred to as a spring bar in some cases.

The pivots of the connecting member of one embodiment of the present invention each include a tip portion, a collar portion, an axis portion, and an end portion. The pair of pivots are electrically insulated from each other. The tip portion and axis portion of the pivot are electrically connected to each other and the surfaces thereof have conductivity.

The axis portion of the pivot can be electrically connected to one of a pair of electrodes (tabs, wirings, or the like) of a battery. The pair of pivots included in the connecting member are insulated from each other in this structure; therefore, the pair of electrodes of the battery can be prevented from being electrically connected to each other. Accordingly, the two tip portions positioned at the both ends of the connecting member are each electrically connected to either of the pair of electrodes of the battery. That is, the two tip portions can function as a pair of terminals of the battery.

The connecting member to which the battery is connected in such a manner is attached to an electronic device, which enables the battery to be used as an auxiliary power supply of the electronic device. Specifically, the electronic device is provided with a pair of bearings to which the connecting member can be attached, and power from the battery is supplied to the electronic device via the bearings and the connecting member.

When a secondary battery is used as the battery, the battery can be charged via the bearings of the electronic device and the connecting member. The electronic device itself may have a battery serving as a main power supply. In that case, it is preferable to set in advance or to be selectable by the user which battery is preferentially charged, the battery attached to the electronic device via the connecting member or the battery included in the electronic device itself.

A battery that includes a flexible film for its exterior body and that can be bent and straightened repeatedly can be favorably used as the battery. This allows the battery and part of the connecting member to be placed in the band-like exterior body. Therefore, the band-like exterior body can have an external appearance or fittability similar to those of conventional bands (straps, belts, or the like) that do not include batteries.

Note that in the case where a non-bendable battery is used as the battery, the battery can be placed in a portion which is not bent in the band-like exterior body. As the battery here, any of various batteries such as coin-type (or button-type) batteries, cylindrical batteries, or prismatic batteries can be used.

Such a band-like power supply device can be attached to the electronic device using the above connecting member, and thus can be easily replaced by the user. For example, the battery can be easily replaced in the cases where the charging amount of the battery is reduced, the battery deteriorates, and a primary battery is used as the battery. In the case where the auxiliary power supply is not required, the user can replace the power supply device with a conventional band (without a battery) using a conventional spring bar. The user has a free choice between the band-like power supply device and the conventional band according to the usage or his/her preference and can attach either of them to the electronic device.

The electronic device to which the connecting member or power supply device of one embodiment of the present invention is attachable preferably has a function of sensing a potential difference between the pair of bearings or a function of sensing a conductive or insulated state between the pair of bearings.

For example, when the connecting member of one embodiment of the present invention, a conventional spring bar, or the like is not attached to the electronic device, the pair of bearings are insulated from each other and each of the bearings is in an electrically floating state. In addition, in the case where the connecting member of one embodiment of the present invention to which the battery is not connected is attached to the electronic device, the pair of bearings are electrically insulated from each other. In the case where the conventional spring bar is attached to the electronic device, the pair of bearings are in an insulated or conductive (shorted) state depending on the materials of the spring bar. When a state in which the pair of bearings are electrically connected to or insulated from each other is sensed as described above, it can be determined that the connecting member to which the battery is connected is not attached to the electronic device, so that the electronic device can operate using power of another battery included in the electronic device itself.

In contrast, in the case where the connecting member of one embodiment of the present invention to which the battery is connected is attached to the electronic device, a potential difference corresponding to an output voltage of the battery is generated between the pair of bearings. Sensing this potential difference makes it possible to determine the attachment of the connecting member to which the battery is connected, and the electronic device can operate using power supplied from the battery.

Specific structure examples of the connecting member, power supply device, and electronic device of one embodiment of the present invention and examples of a system of one embodiment of the present invention will be described below with reference to drawings.

Application Example

First, an example of an electronic device to which a connecting member and power supply device that will be described below are attached will be described. As an example of the electronic device, a watch-type information terminal device is described here.

Figure 1B:
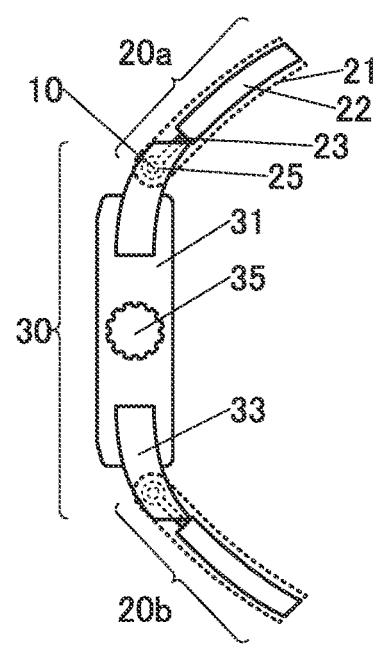

FIGS. 1A and 1B show an example of an electronic device 30 to which connecting members 10, a power supply device 20a, and a power supply device 20b are connected. FIG. 1A is a front view and FIG. 1B is a side view.

The electronic device 30 includes a housing 31 and a switch 35. The switch 35 is provided on a side surface of the housing 31. The housing 31 includes a display portion 32, lugs 33, and bearings 34.

A variety of image information can be displayed on the display portion 32. A display device in which a display element such as a liquid crystal element or an organic EL element is used can be used for the display portion 32. In addition, a touch panel functioning as a touch sensor is preferably used for the display portion 32.

Note that in order to use the electronic device 30 as an analog watch, not as an information terminal device, the display portion 32 can be replaced with a watch dial including at least one of an hour hand, a minute hand, and a second hand. In order to use the electronic device 30 as a digital watch, the display portion 32 can be replaced with a watch dial including a segment type liquid crystal element or the like.

The switch 35 serves as one of user interfaces. The user can make operations for the switch 35 such as pushing, pulling, winding, or sliding up and down or back and forth, for example. The electronic device 30 can start or switch applications or execute other processings in response to these operations. Note that although an example in which the housing 31 includes one switch 35 is described here, the housing 31 may include another switch or the like.

The lug 33 provided on the housing 31 is a portion to which a spring bar or the like, in addition to the connecting member 10, is attached. Alternatively, part of the housing 31 may serve as the lug 33. There are a pair of the lugs 33 provided symmetrically in the housing 31. The pair of lugs 33 face each other. Each of the lugs 33 includes the bearing 34 on its inward-facing surface. Therefore, the connecting member 10 can be attached to the pair of bearings 34 facing each other.

Each of the bearings 34 includes a depressed portion into which a later-described tip portion 12a of a pivot 12 included in the connecting member 10 is inserted. The bearing 34 includes a conductive portion to which a potential of the tip portion 12a is applied.

The power supply device 20a and the power supply device 20b each serve as a wearing tool (a band, a strap, a belt, or the like) used when the electronic device 30 is worn on an arm or the like.

The power supply device 20a and the power supply device 20b each include a band-like exterior body 21. A battery 22 is provided inside the exterior body 21. The connecting member 10 is provided so as to be partly projected from the exterior body 21. The battery 22 includes a pair of tabs 23, each of which is joined with a conductive member 25. The conductive member 25 fits a later-described axis portion 12c of the pivot 12 included in the connecting member 10, so that the conductive member 25 and the pivot 12 are electrically connected to each other.

Each of the pair of tabs 23 of the battery 22 is electrically connected to the bearing 34 via the connecting member 10. This makes it possible to supply power to the electronic device 30 from the battery 22 and to charge the battery 22 by the electronic device 30.

Note that although an example in which two power supply devices, the power supply device 20a and the power supply device 20b, are attached to the electronic device 30 is described here, either may be replaced with a normal wearing tool (band, belt, strap, or the like).

Structure Example of Connecting Member

Figure 1C:
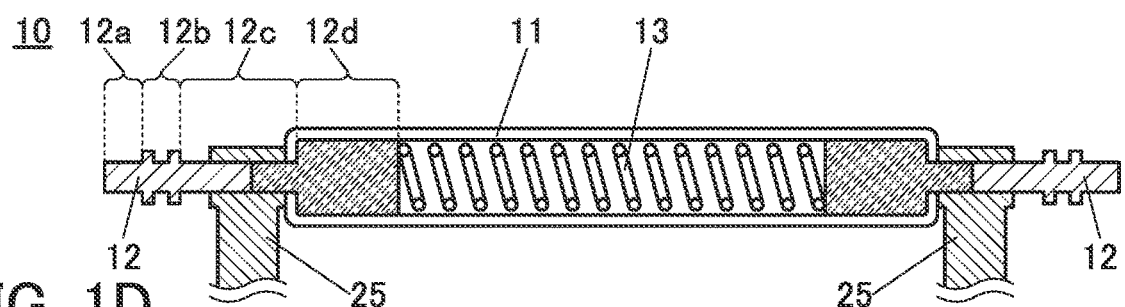

FIG. 1C is a schematic cross-sectional view in a direction parallel to an axis direction of the connecting member 10.

The connecting member 10 includes a pipe 11, a pair of the pivots 12, and a spring 13.

The pivot 12 includes the tip portion 12a, a collar portion 12b, the axis portion 12c, and an end portion 12d in this order from the outer side.

The pipe 11 is hollow and its ends are narrowed. Inside the pipe 11, the spring 13 and the end portions 12d of the pair of pivots 12 are provided. The spring 13 is provided so as to be shorter than its natural length in a natural state. Owing to the restoring force of the spring 13, an outward force is applied to the pair of pivots 12.

The tip portion 12a and the collar portion 12b are portions that are projected from the pipe 11 in a natural state. The axis portion 12c includes a portion that is projected from the pipe 11 in a natural state. The axis portion 12c also includes a portion in which part of the axis portion 12c is inserted in the pipe 11 when an external force is applied in a direction in which the spring 13 is compressed. The end portion 12d is a portion that is placed in the pipe 11 in a natural state. A natural state here is a state where no external force is applied in the axis direction (a longitudinal direction) of the connecting member 10.

A diameter of the end portion 12d is greater than a diameter of a hole of the end of the pipe 11. A diameter of the axis portion 12c is the same as or smaller than the diameter of the hole of the end of the pipe 11. This can prevent the pivot 12 from coming out from the pipe 11 even if a force is applied to the pivot 12 from the spring 13.

The tip portion 12a is a portion that is inserted into a hole of the bearing 34 of the electronic device 30. The collar portion 12b is a portion that is engaged with a depressed portion of the bearing 34. When the connecting member 10 is attached to the electronic device 30 by not only inserting the tip portion 12a into the bearing 34 but also engaging the collar portion 12b with part of the bearing 34, a more stable attachment can be achieved.

The collar portion 12b can also be used as a portion that is engaged with a detachment jig that can be used for attaching and detaching the connecting member 10. This makes it easy that the connecting member 10 is attached to or detached from the electronic device 30. The collar portion 12b has one or more portions whose diameters are greater than those of the tip portion 12a and the axis portion 12c. As illustrated in FIG. 1C, the collar portion 12b preferably has two or more portions whose diameters are greater than those of the other portions because the convenience is improved. For example, a detachment jig can be positioned between the two portions having greater diameters.

FIG. 1C illustrates the conductive member 25 which is attached to the connecting member 10. The conductive member 25 includes a portion into which the axis portion 12c fits. The conductive member 25 can be attached to the axis portion 12c in such a manner that the axis portion 12c fits into the conductive member 25. Here, the conductive member 25 is preferably attached to the axis portion 12c so as to be slidable in an axis direction.

Figure 1D:
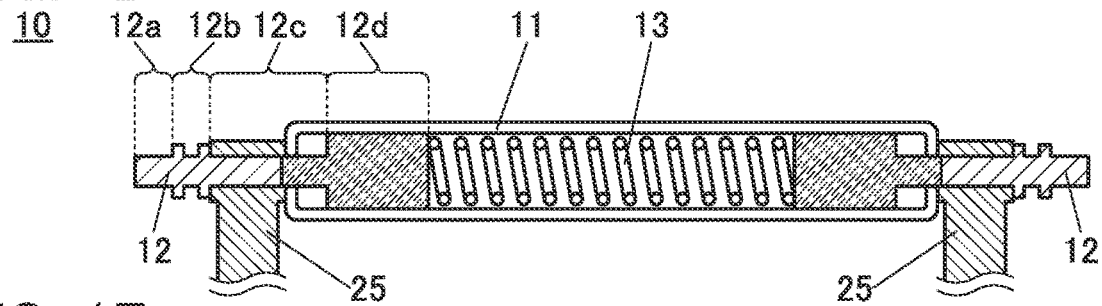

FIG. 1D is a schematic cross-sectional view of a state which is changed from the state of FIG. 1C and in which the spring 13 is compressed by an external force applied to the pair of pivots 12. As illustrated in FIG. 1D, an external force is applied and then the spring 13 is compressed, so that part of the axis portion 12c is inserted in the pipe 11.

FIG. 1D illustrates a state in which the width of the conductive member 25 in the axis direction is equal to the width, in the axis direction, of the portion of the axis portion 12c which is projected from the pipe 11. One end of the conductive member 25 is in contact with the end of the pipe 11 and the other end of the conductive member 25 is in contact with the collar portion 12b. That is, it can also be said that the pivot 12 cannot slide inside anymore and the connecting member 10 is most compressed in FIG. 1D.

When an external force is relaxed, the state illustrated in FIG. 1D becomes the state illustrated in FIG. 1C again. At this time, the conductive member 25 attached to the axis portion 12c is slidable; therefore, the position of the conductive member 25 remains as it is in FIG. 1C.

Here, the tip portion 12a, the collar portion 12b, and part of the axis portion 12c have conductive surfaces in FIGS. 1C and 1D. In contrast, the other part of the axis portion 12c and the end portion 12d have insulating surfaces. Different hatching patterns are used for the conductive surfaces and the insulating surfaces in FIGS. 1C and 1D.

Even when the spring 13 is conductive, the pair of pivots 12 can be electrically insulated from each other owing to the insulating surface of the end portion 12d.

Even when the pipe 11 is conductive, the pair of the pivots 12 can be electrically insulated from each other owing to the insulating properties of the end portion 12d and part of the axis portion 12c. When the pivots 12 are innermostly positioned as illustrated in FIG. 1D, a portion of the axis portion 12c which are in contact with the end of the pipe 11 preferably has an insulating property. In addition, it is important that the conductive portion of the axis portion 12c is in contact with the conductive member 25 when the pivot 12 is outermostly positioned as illustrated in FIG. 1C.

Figure 1E:
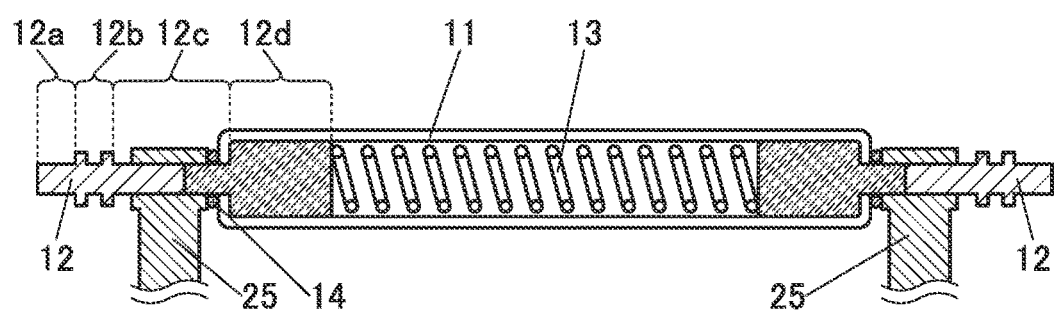

In the case where a surface of the end of the pipe 11 and a surface of the end of the conductive member 25 are each conductive, the pair of conductive members 25 are electrically shorted in some cases when the conductive members 25 and the pipe 11 are in contact with each other as illustrated in FIG. 1C. To prevent this, an insulating cushioning material 14 is preferably provided between the conductive member 25 and the pipe 11 as illustrated in FIG. 1E. As the cushioning material 14, a ring-shaped component of rubber, plastic, or the like can be used.

For the pipe 11, the pivot 12, and the spring 13, metals typified by stainless can be used here. When such a metal is used, in order to make their surfaces to be insulated partly or entirely, a method for oxidizing the surfaces, a method for forming an insulating coating film by a plating method or the like, or a method for coating the surfaces with an insulating resin or the like can be used, for example. Insulating materials such as a resin can also be used for the pipe 11, the pivot 12, and the spring 13. When a resin is used, conductivity may be added to part or a whole of the surfaces. For example, a method for forming a conductive coating film by a plating method can be used.

Here, the structure of the connecting member 10 is not limited to the structures illustrated in FIG. 1C and other drawings, and any structure is acceptable as long as the structure includes the pair of pivots 12 that are electrically insulated from each other. Another example of the connecting member 10 will be described below.

Figure 2A:
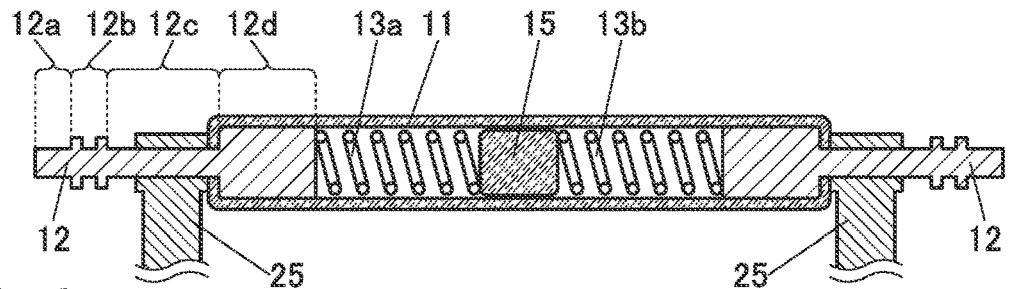
FIGS. 2A to 2E each illustrate a connecting member of an embodiment.

In each of the pivots 12 included in the connecting member 10 in FIG. 2A, a surface of the axis portion 12c and a surface of the end portion 12d are each conductive. At least an inner surface of the pipe 11 and surfaces of the openings of the pipe 11 have insulating properties. The pipe 11 contains two springs (a spring 13a and a spring 13b) and a cushioning material 15 therebetween. The cushioning material 15 has an insulating surface.

In FIG. 2A, the spring 13a and the spring 13b are separated from each other by the cushioning material 15. The spring 13a and the spring 13b are each in contact with the pipe 11, and the contact surfaces have insulating properties. Therefore, the spring 13a and the spring 13b are electrically insulated from each other. Even in the case where the pair of pivots 12 are each conductive, the above structure prevents electrical shorting via the spring 13a and the spring 13b, and the pair of pivots 12 are electrically insulated from each other.

In addition, this structure enables the whole surfaces of the axis portions 12c of the pivots 12 to be made conductive. This makes it possible to increase areas where the axis portions 12c are in contact with the conductive members 25 and to reduce the contact resistances therebetween.

Figure 2B:
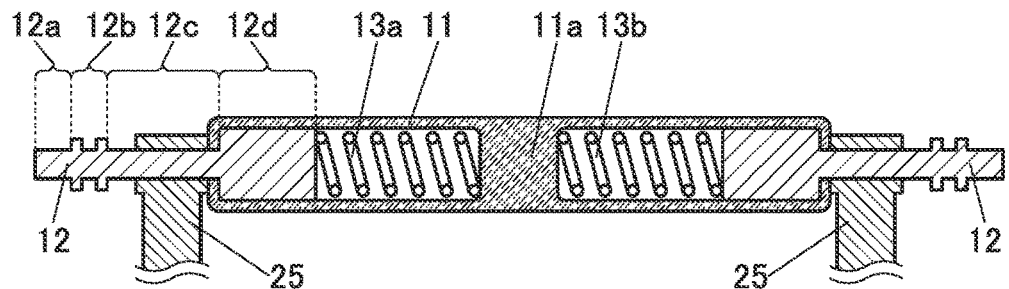

FIG. 2B illustrates an example in which the pipe 11 does not contain the cushioning material 15 as illustrated in FIG. 2A, but includes a partition wall 11a. The partition wall 11a is positioned almost at the center of the pipe 11 and has a function of separating the spring 13a and the spring 13b from each other.

Figure 2C:
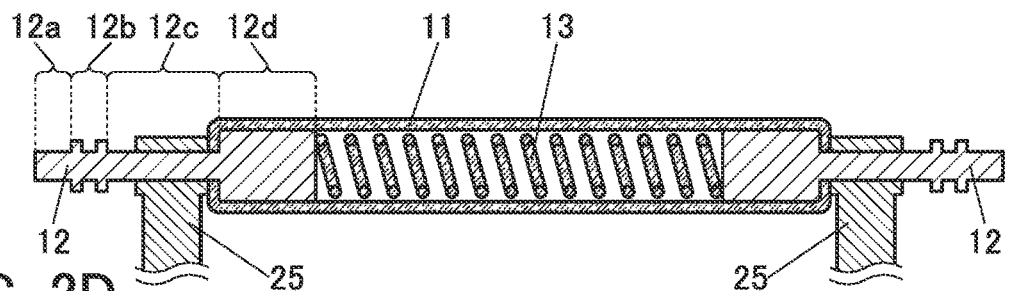

FIG. 2C illustrates an example in which a surface of the pipe 11 and a surface of the spring 13 each have an insulating property.

In the above structure, the conductive member 25 and the pivot 12 are electrically connected to each other because the conductive member 25 is in contact with the axis portion 12c of the pivot 12. However, the structure is not limited thereto, and any structure is acceptable as long as the conductive member 25 and the tip portion 12a of the pivot 12 are electrically connected to each other.

Figure 2D:
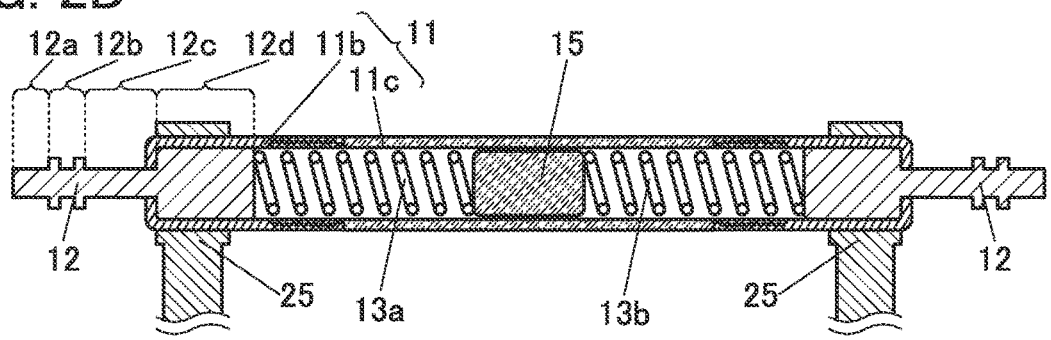

FIG. 2D illustrates an example in which the pipe 11 includes a pair of conductive portions 11b and an insulating portion 11c positioned between the portions 11b. The pair of portions 11b are electrically insulated from each other. The portions 11b fit into the conductive members 25. Therefore, the pivots 12 and the conductive members 25 are electrically connected to each other via the portions 11b.

It is preferable that the portions 11b and the portion 11c have screw structures by which they are fastened, as illustrated in FIG. 2D. Note that the portions 11b and the portion 11c may be joined to each other with an adhesive or the like.

Figure 2E:
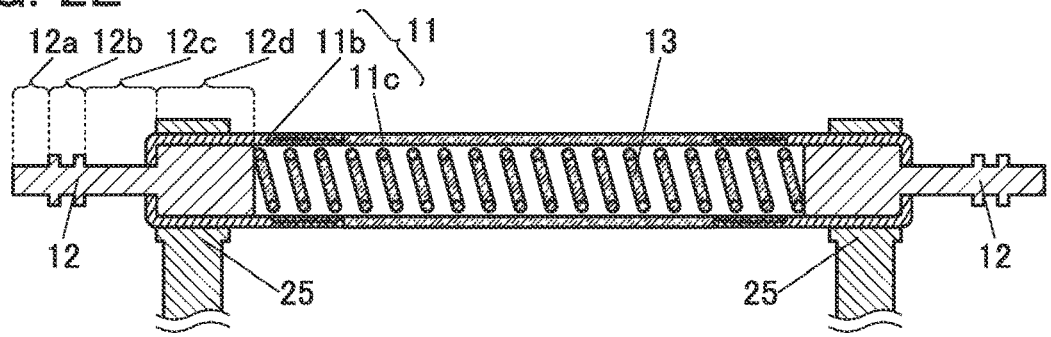

FIG. 2D illustrates an example in which the spring 13a and the spring 13b are separated from each other by the cushioning material 15; however, the spring 13a and the spring 13b may be separated from each other by the partition wall 11a of the pipe 11 like the structure illustrated in FIG. 2B. In addition, a structure which does not include the cushioning material 15 but includes the spring 13 having an insulating surface as illustrated in FIG. 2E may be used.

The above is the description of the connecting member.

Structure Example of Battery

Structure examples of the battery 22 that can be used for a power supply device 20 will be described below.

Figure 3A:
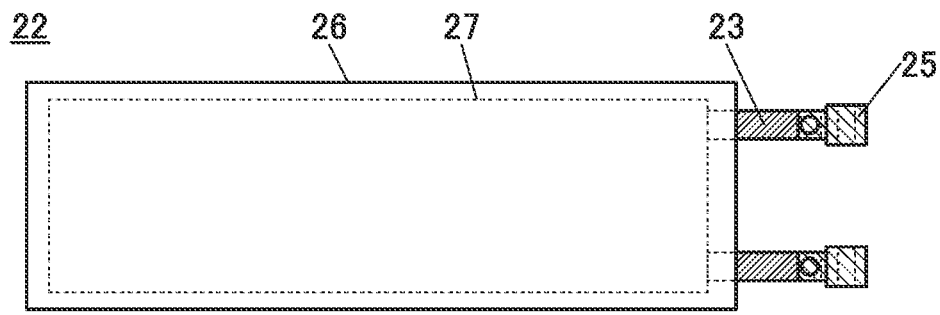
FIGS. 3A to 3D each illustrate a power supply device of an embodiment.

FIG. 3A is a schematic top view of the battery 22 to which the conductive members 25 are connected. The battery 22 includes the pair of tabs 23, an exterior body 26, and a content 27. The battery 22 is preferably a secondary battery.

A flexible and highly moisture-resistant film can be used for the exterior body 26. For example, a stacked film of a metal film and a plastic film is preferably used. This makes it possible to achieve the bendable battery 22.

The content 27 is sealed by the exterior body 26. The exterior body 26 is thermocompression-bonded and joined outside the content 27. The content 27 contains at least a positive electrode, a negative electrode, and an electrolyte. The details will be described later.

Each of the pair of tabs 23 is electrically connected to either the positive electrode or the negative electrode. The tabs 23 are partly projected from the exterior body 26 and not covered.

Each of the pair of tabs 23 is joined to the conductive member 25 by a joining method such as an ultra welding method.

Figure 3B:
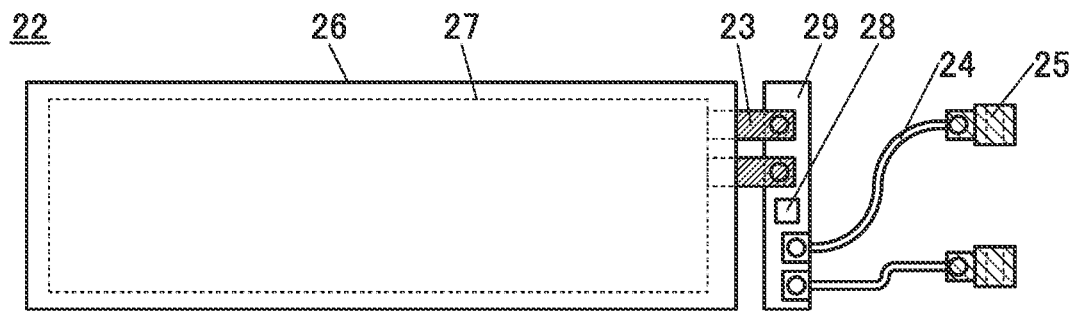

The battery 22 may include a protective circuit. FIG. 3B illustrates an example in which a substrate 29 including a protective circuit 28 is provided.

For example, a printed circuit board (PCB) or a flexible printed circuit (FPC) can be used as the substrate 29. In the example illustrated in FIG. 3B, the protective circuit 28 is an IC chip mounted on the substrate 29.

As the protective circuit 28, a circuit having a function of stopping charging in the case where the battery 22 is over charged, a function of stopping discharging in the case where the battery 22 is over discharged, or the like can be used, for example. In addition, the protective circuit 28 preferably has a function of preventing a high current flow in the case where the positive electrode and the negative electrode are electrically shorted.

The substrate 29 includes a pair of electrodes that are connected to the tabs 23. The substrate 29 also includes a pair of electrodes that are connected to wirings 24. The tabs 23 and the wirings 24 are joined to their respective electrodes of the substrate 29 by a joining method such as an ultra welding method.

The wirings 24 electrically connect the conductive members 25 to the substrate 29. As the wirings 24, cable wirings or FPCs may be used.

Note that a method for connecting via a connector may be used in order to connect the tabs 23 and the substrate 29, the wirings 24 and the substrate 29, and the wirings 24 and the conductive members 25.

Note that although FIGS. 3A and 3B illustrate structure examples of the battery 22 in which a film is used as the exterior body 26, the structure is not limited thereto and a coin-type (button-type) battery may be used.

Figure 3C:
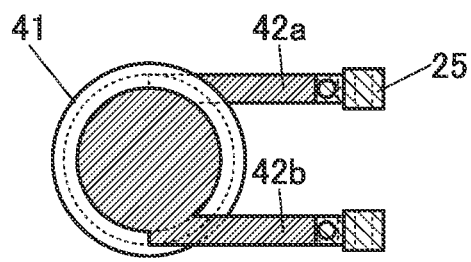
Figure 3D:
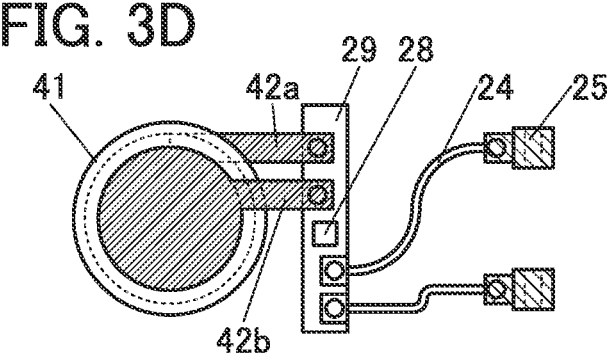

FIG. 3C illustrates an example in which a coin-type battery 41 is used. FIG. 3D illustrates an example in which the substrate 29 including the protective circuit 28 is connected to the battery 41.

Portions of an exterior body of the battery 41 (on its top side and rear side) serve as a positive electrode and a negative electrode. As illustrated in FIG. 3C, an electrode 42a is electrically connected to an electrode on the rear side of the battery 41, and an electrode 42b is electrically connected to an electrode on the top side of the battery 41. Each of the electrode 42a and the electrode 42b is electrically connected to the conductive member 25.

In order to use the coin-type battery 41 for the power supply device 20 which is attached to the watch-type electronic device 30 illustrated in FIG. 1A and other drawings, the battery 41 is preferably positioned at a portion which is not bent when the exterior body 21 of the power supply device 20 is worn on a wrist or the like. For example, it is preferable to position the battery 41 in the power supply device 20 near to or far from the electronic device 30 and not to position the battery 41 near the center.

The above is the description of the battery.

[Conductive Member]

Examples of the conductive member 25 that electrically connects an electrode (tab) of a battery and the connecting member 10 will be described below.

Figure 4A:
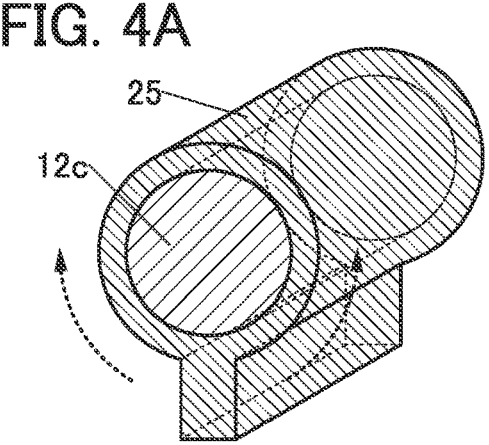
FIGS. 4A to 4G each illustrate a conductive member of an embodiment.

FIG. 4A is a schematic perspective view illustrating the conductive member 25 and part of the axis portion 12c of the pivot 12. Note that although the conductive member 25 is connected to the axis portion 12c here as an example, the conductive member 25 may be connected to part of the pipe 11 as illustrated in FIG. 2D and other drawings by increasing the diameter of the conductive member 25.

The conductive member 25 illustrated in FIG. 4A includes a tubular portion including a hole which fits the axis portion 12c and a leg portion which is joined to the tab of the battery or the like. In the example of FIG. 4A, a cross section of the tubular portion of the conductive member 25 is a ring shape and a cross section of the axis portion 12c is a circle. Therefore, the conductive member 25 and the axis portion 12c can have a structure in which the conductive member 25 is rotatable around the axis portion 12c in rotating directions indicated by the arrows in FIG. 4A, and slidable in an extending direction of the axis portion 12c.

Figure 4B:
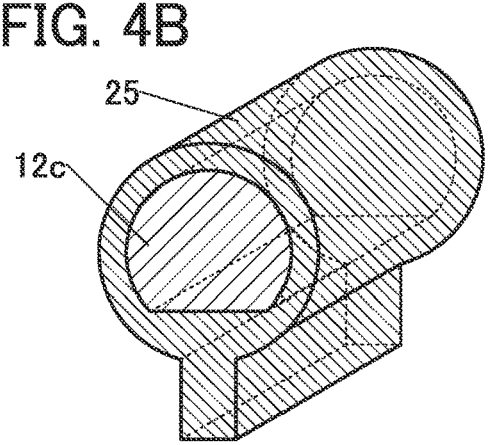

FIG. 4B illustrates an example in which the cross section of the axis portion 12c has a partly cut-out shape. The shape of the hole of the conductive member 25 is similar to the shape of the cross section of the axis portion 12c in order to fit the axis portion 12c. Such a structure enables the conductive member 25 and the axis portion 12c to be connected in a state where they are fixed in the rotating directions and slidable in the extending direction of the axis portion 12c.

Figure 4C:
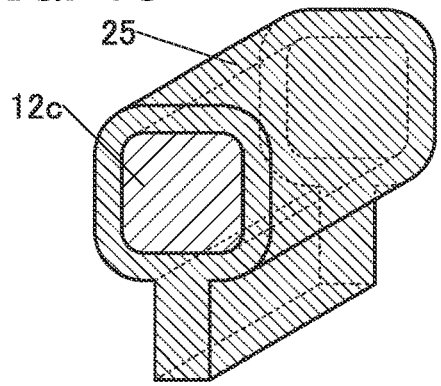

As illustrated in FIG. 4C, the cross section of the axis portion 12c may be a substantially polygonal shape. FIG. 4C illustrates an example in which the cross section of the axis portion 12c is a square shape having round corners. Such a structure also enables the conductive member 25 and the axis portion 12c to be connected in a state where they are fixed in the rotating directions and slidable in the extending direction of the axis portion 12c.

It is preferable that part of the conductive member 25 have a tubular shape as illustrated in FIGS. 4A, 4B, and 4C because an area where the conductive member 25 is in contact with the axis portion 12c can be increased. The tubular-shaped conductive member 25 may be formed in such a manner that a material that is compressed by heat or the like is used as the conductive member 25, the conductive member 25 having a diameter larger than that of the collar portion 12b is inserted from the tip portion 12a side, and then, its diameter is compressed by heat or the like. Alternatively, a tubular-shaped portion of the conductive member 25 may be formed in such a manner that a band-like member is wounded around the axis portion 12c.

Figure 4D:
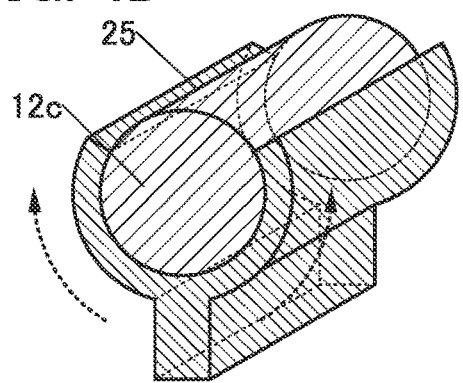

FIG. 4D illustrates an example in which the conductive member 25 has a tubular shape which is partly cut out (also referred to as a shape having a circularly arced cross section). In FIG. 4D, part on the side opposite to the leg portion is cut out. Such a structure makes it easy to attach and detach the axis portion 12c to and from the conductive member 25.

In FIG. 4D, the conductive member 25 is connected to the axis portion 12c so as to be rotatable around the axis portion 12c in the rotating directions and slidable in the extending direction of the axis portion 12c.

Figure 4E:
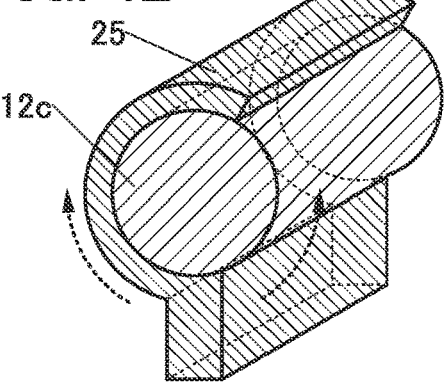

FIG. 4E illustrates an example in which the position of a cut-out portion of the conductive member 25 is different from that of the cut-out portion of the conductive member 25 in FIG. 4D.

Figure 4F:
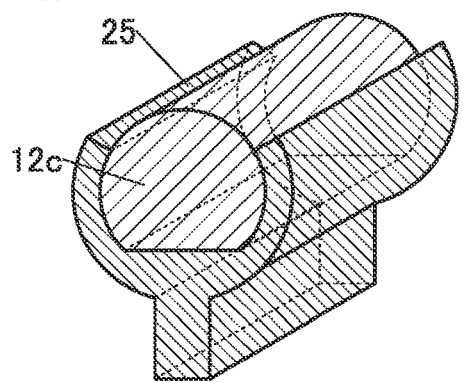
Figure 4G:
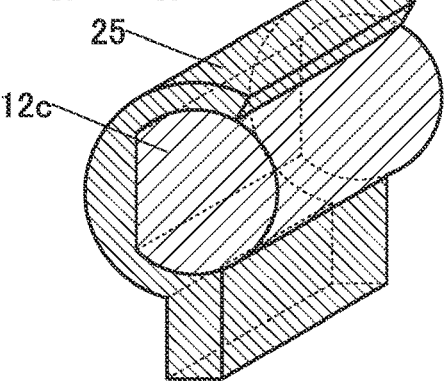

FIGS. 4F and 4G each illustrate an example in which the cross section of the axis portion 12c is not a round shape. Such a structure enables the conductive member 25 and the axis portion 12c to be connected in a state where they are fixed in the rotating directions and slidable in the extending direction of the axis portion 12c. In addition, the conductive member 25 and the axis portion 12c can be easily attached to and detached from each other.

The above is the description of the conductive member.

Structure Example of Power Supply Device

An example of a power supply device that can be attached to an electronic device will be described below. In particular, a power supply device that can be used for the watch-type electronic device 30 will be described here.

Figure 5A:
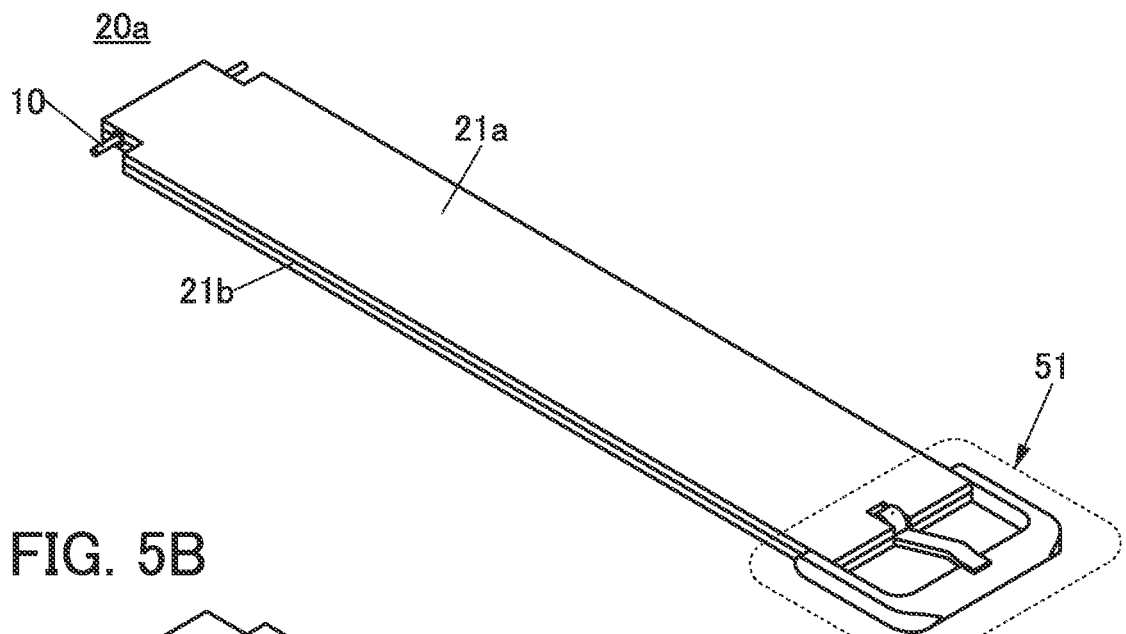
FIGS. 5A and 5B illustrate a power supply device of an embodiment.
Figure 5B:
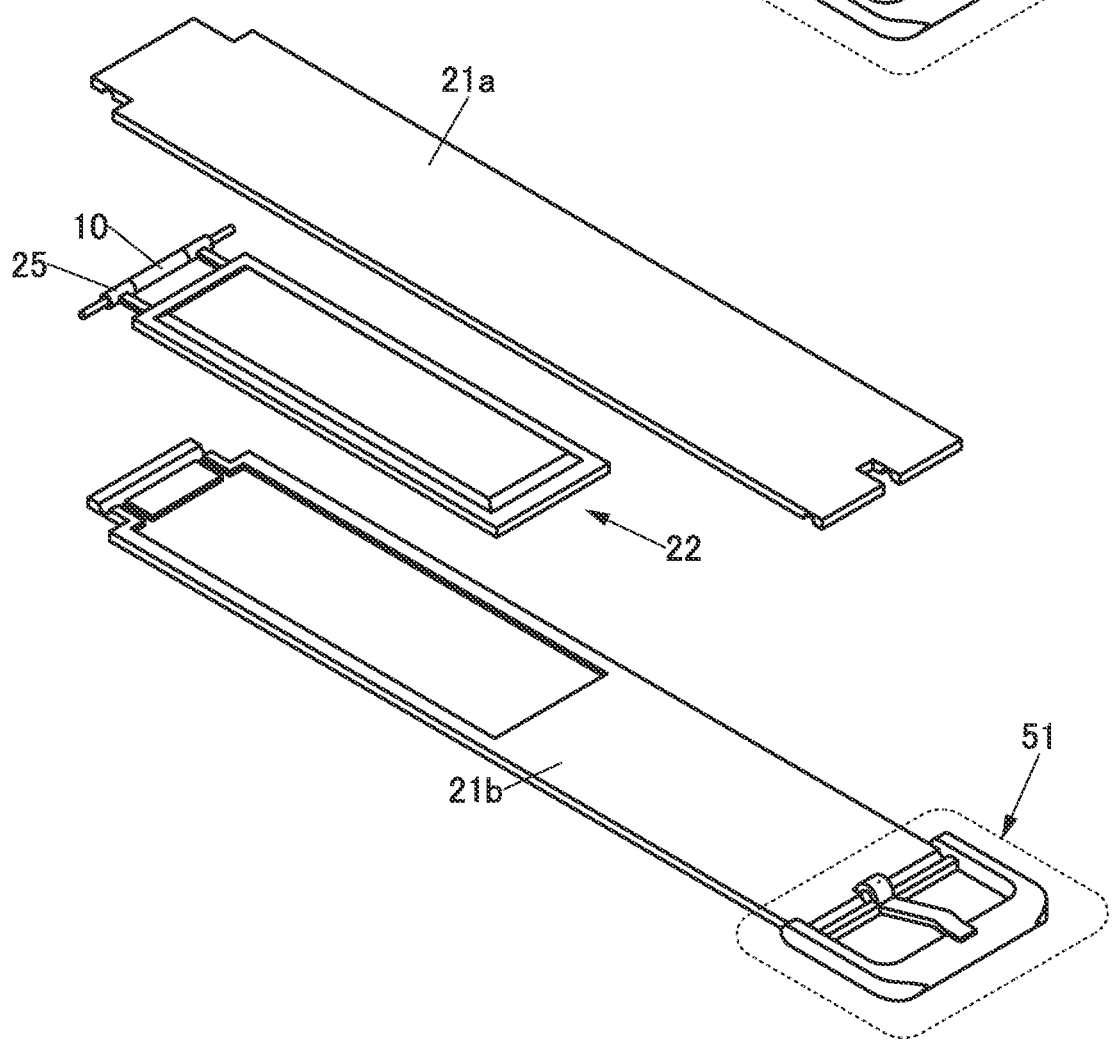

FIG. 5A is a schematic perspective view of the power supply device 20a and FIG. 5B is a schematic perspective view illustrating the inside structure of the power supply device 20a.

The power supply device 20a includes the connecting member 10, the battery 22, an exterior body 21a, an exterior body 21b, a buckle 51, and the like. The connecting member 10 is partly projected from the power supply device 20a.

As illustrated in FIG. 5B, the battery 22 is positioned between the exterior body 21a and the exterior body 21b. Depressed portions for a space in which the battery 22 is provided are formed on the inner sides of the exterior body 21a and the exterior body 21b. This structure makes it possible to equal the thicknesses of a portion which includes the battery 22 and a portion which does not include the battery 22, and to improve its fittability.

For the exterior body 21a and the exterior body 21b, a material used for a normal band (without a battery) or the like can be used. For example, any of various materials such as rubber, leather, cloth, a metal, and a resin can be used. Rubber or a resin is particularly preferable because it is easy to shape.

Figure 6A:
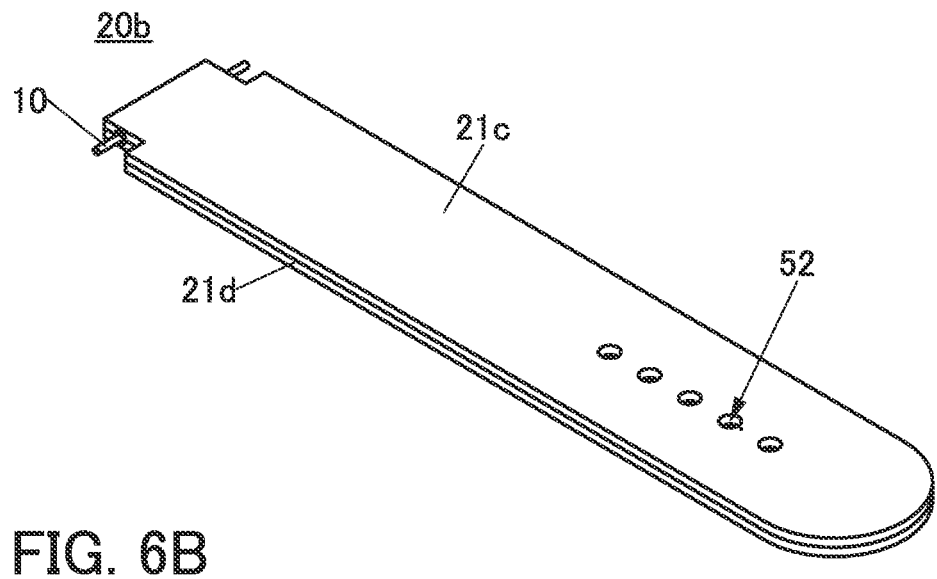
FIGS. 6A and 6B illustrate a power supply device of an embodiment.
Figure 6B:
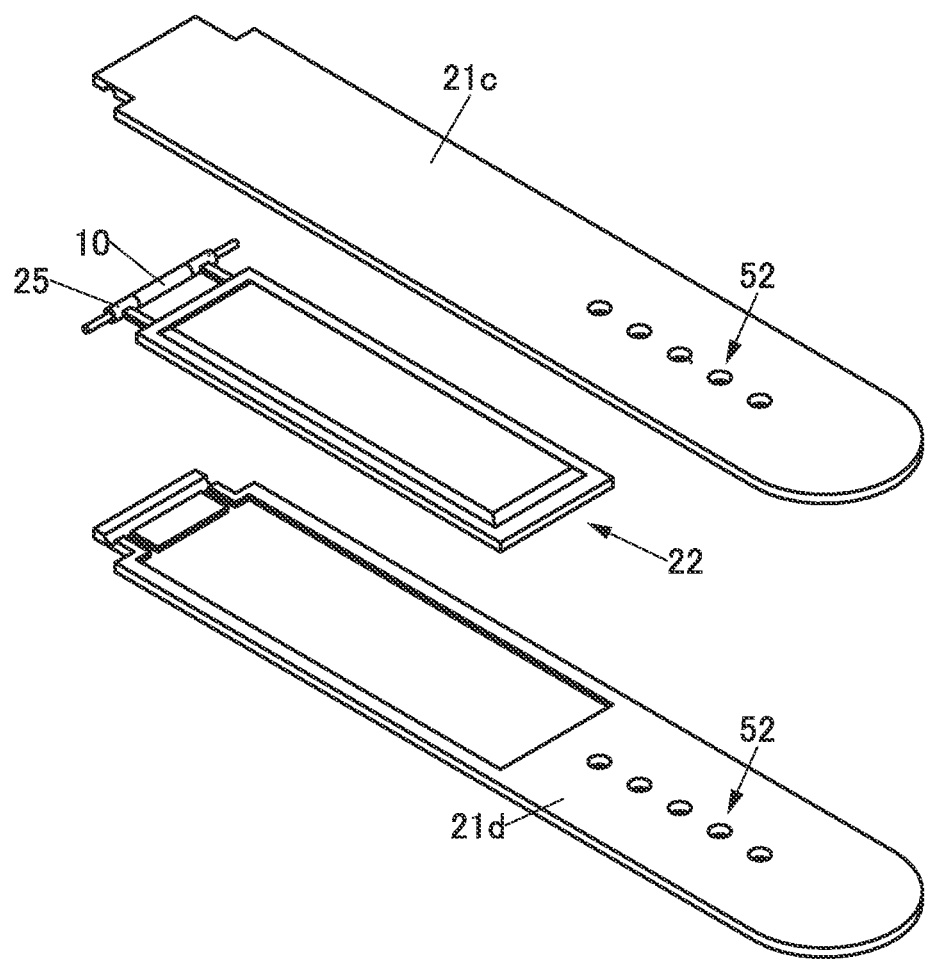

FIGS. 6A and 6B are schematic perspective views of the power supply device 20b, which is a counterpart to the power supply device 20a. The power supply device 20b includes the connecting member 10, the battery 22, an exterior body 21c, an exterior body 21d, and the like.

The exterior bodies 21c and 21d are different from the exterior bodies 21a and 21b in that a plurality of holes 52 are provided instead of the buckle 51.

In such a manner, the power supply device 20a and the power supply device 20b can have external forms almost the same as that of a combined component of the conventional spring bar and the conventional wearing tool (without a battery or the like) such as a band, a belt, or a strap.

The power supply devices 20a and 20b attached to the electronic device 30 function not only as wearing tools, but also as auxiliary power supplies or main power supplies of the electronic device 30.

With the use of the power supply device 20a or the power supply device 20b of one embodiment of the present invention, it is not necessary to carry an auxiliary power supply separately; thus, the convenience is improved. In addition, the electronic device 30 to which the power supply device 20a or 20b is attached has no need to additionally connect an auxiliary power supply to itself unlike the conventional electronic device 30 provided with wearing tools. Therefore, although connected to the auxiliary power supply, the electronic device 30 to which the power supply device 20a or 20b is attached is compact and does not prevent movements of the user. In addition, there is no need to connect an auxiliary power supply to the electronic device 30 using a connector or the like; therefore, there is no danger that the auxiliary power supply comes out and drops. There is no need to provide the electronic device 30 with a terminal for the connector; therefore, a highly water resistant and highly designed electronic device can be achieved.

When the exterior body 26 of the battery 22 included in the power supply device 20a and the power supply device 20b has an uneven surface, the reliability of the battery 22 which is subjected to repeated bending can be improved.

Figure 7A:
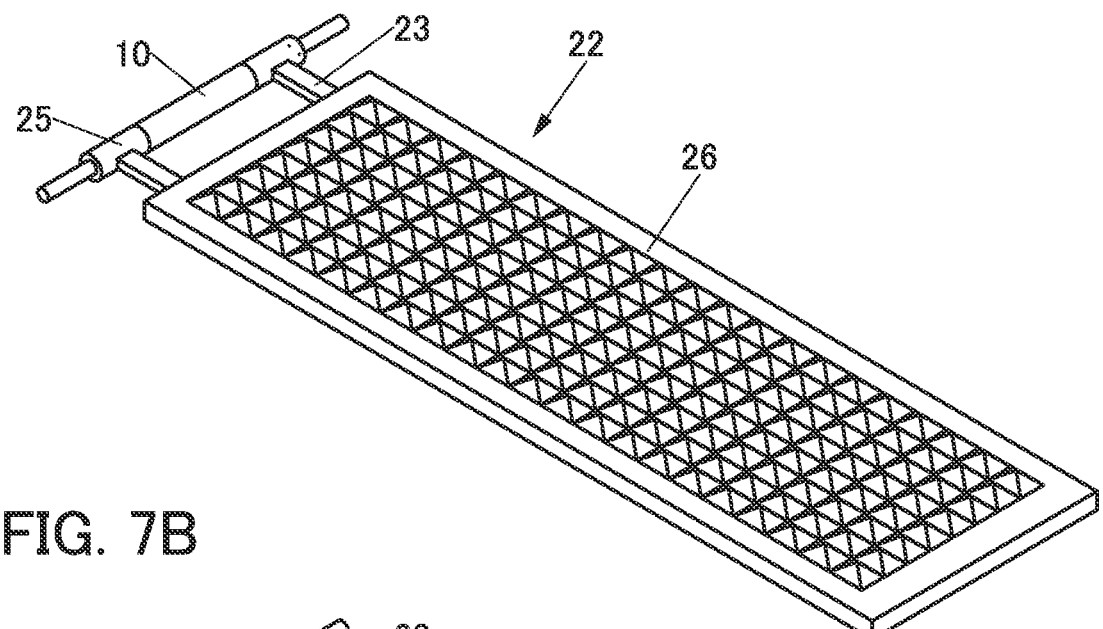
FIGS. 7A and 7B each illustrate a power supply device of an embodiment.
Figure 7B:
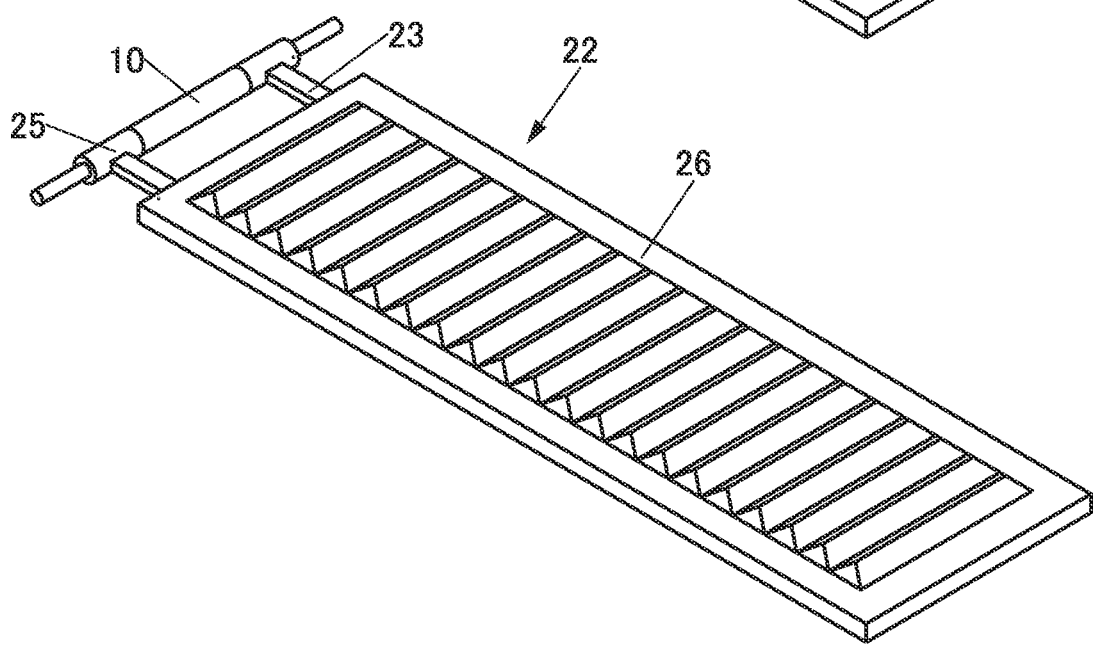

FIG. 7A illustrates an example in which the exterior body 26 has a mesh embossed surface. FIG. 7B illustrates an example in which the exterior body 26 has a stripe embossed surface.

The exterior body 26 having an uneven surface is changed in shape so that the projected portions and the depressed portions on the outer side of a bent part are straightened and the projected portions and the depressed portions on the inner side of a bent part are compressed, when the battery 22 is bent. This can relieve stress applied to the exterior body 26.

The above is the description of the power supply device.

Structure Example of Electronic Device

Specific structure examples of an electronic device that can receive power from the above power supply device will be described below.

Figure 8A:
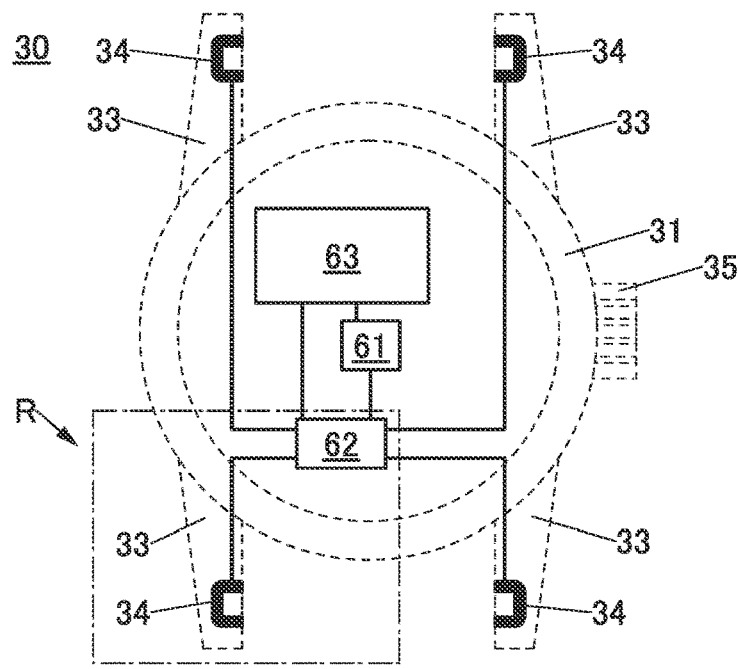
FIGS. 8A to 8D each illustrate an electronic device of an embodiment.

FIG. 8A is a schematic view illustrating a main part of the electronic device 30. The electronic device 30 includes a control portion 61, a power supply control portion 62, a functional circuit 63, and the like in the housing 31, and further includes the bearings 34 in the lugs 33.

The bearings 34 are provided so as to face each other in one pair of the lugs 33 facing each other. The bearings 34 each have a function of fixing the connecting member 10 and function as a terminal to which a potential of the tip portion 12a of the connecting member 10 is applied.

FIG. 8A illustrates an example in which the bearings 34 are provided for an upper pair of the lugs 33 and a lower pair of the lugs 33 in the housing 31. The four bearings 34 are electrically connected to the power supply control portion 62.

The power supply control portion 62 has a function of controlling charge and discharge of the power supply device 20 attached to the electronic device 30, and further has a function of outputting power obtained from the power supply device 20 to the control portion 61 and the functional circuit 63. The power supply control portion 62 may have a function of converting power supply voltage of the power supply device 20 into voltage suitable for being applied to the control portion 61 and the functional circuit 63.

The control portion 61 has a function of controlling operations of the power supply control portion 62 and the functional circuit 63.

As the functional circuit 63, an input device or an output device can be used, for example. Examples of the input device include a variety of switches, a sensor (including a touch sensor or a biological sensor), an audio input device, and the like. Examples of the output device include a display device, an audio output device, a vibration device, a light-emitting device, and the like.

Figure 8B:
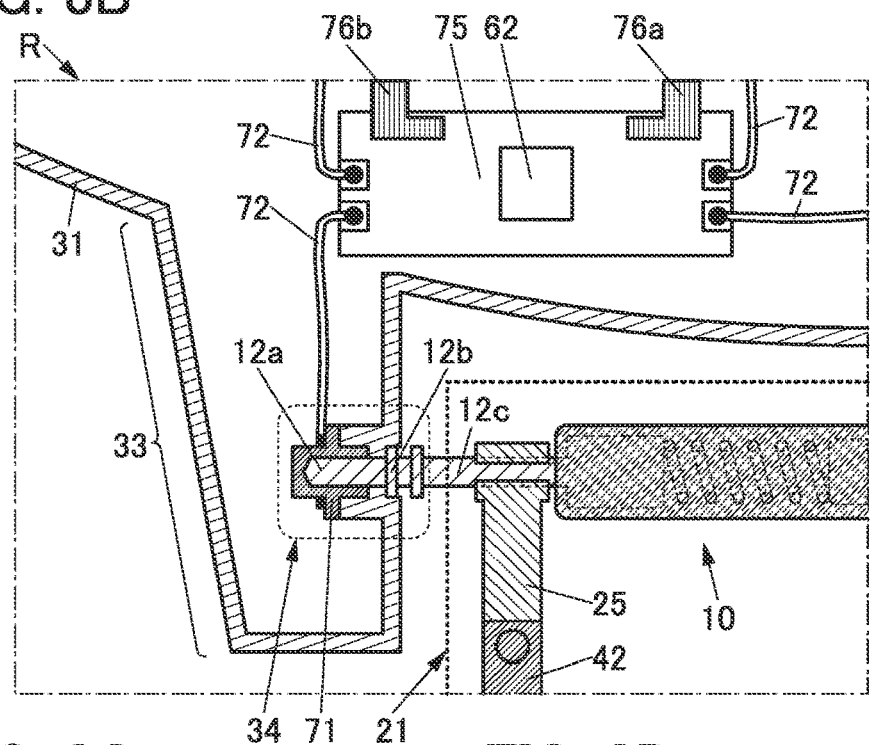

FIG. 8B illustrates a more specific structure example of the electronic device 30. FIG. 8B is a schematic view illustrating the inner structure of the electronic device 30 in a region R indicated by a dashed-dotted line in FIG. 8A.

FIG. 8B illustrates the electronic device 30 to which the connecting member 10 is connected. FIG. 8B illustrates the conductive member 25 which is attached to the axis portion 12c of the connecting member 10 and a tab 42 which is joined with the conductive member 25. The exterior body 21 which covers the connecting member 10, the conductive member 25, and the tab 42 is illustrated by a broken line.

The bearing 34 provided in the lug 33 includes a terminal 71 into which the tip portion 12a of the connecting member 10 fits. The terminal 71 is electrically connected to a wiring 72.

It is preferable that a depressed portion into which the collar portion 12b of the connecting member 10 fits be formed in part of the lug 33 as illustrated in FIG. 8B. This can enhance the stability when the connecting member 10 is connected to the electronic device 30.

FIG. 8B illustrates an example in which the power supply control portion 62 has an IC chip form and is mounted on a substrate 75. For example, a PCB or the like can be used as the substrate 75. The bearing 34 and the substrate 75 are electrically connected to each other by the wiring 72.

In addition, an FPC 76a and an FPC 76b are connected to the substrate 75 as an example here.

The FPC 76a is electrically connected to a substrate on which the control portion 61 is mounted. The FPC 76a includes a wiring for applying a signal to the power supply control portion 62 from the control portion 61, and a wiring for supplying power to the substrate on which the control portion 61 is mounted from the power supply control portion 62, for example.

The FPC 76b is electrically connected to the functional circuit 63 or a substrate on which the functional circuit 63 is mounted, for example. Note that the number of the FPC 76b may be two or more. Alternatively, the FPC 76b may be divided and connected to a plurality of the functional circuits 63. When the same power supply voltages are applied to the control portion 61 and the functional circuit 63, the FPC 76b may be divided and the divided part may be partly connected to the substrate on which the control portion 61 is mounted.

This structure makes it possible to control charge and discharge of the battery 22 (not illustrated) included in the power supply device 20 via the connecting member 10 and the bearing 34 when the power supply device 20 is connected to the electronic device 30.

Here, the bearing 34 preferably includes a gasket for preventing water or dusts from entering the housing 31. The provision of the gasket is particularly effective because there is a danger that the battery 22 is electrically shorted and high current flows if water touches the terminal 71 of the bearing 34.

Figure 8C:
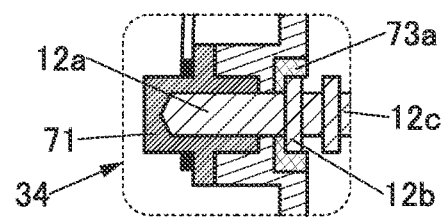
Figure 8D:
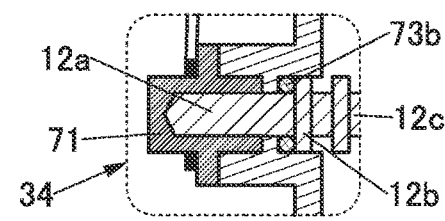

FIGS. 8C and 8D each are an enlarged view of the bearing 34. FIG. 8C illustrates an example in which a cushioning portion 73a is provided at a portion of the lug 33 into which the collar portion 12b fits. FIG. 8D illustrates an example in which a ring-shaped cushioning material 73b is provided between the lug 33 and the collar portion 12b. An elastic body such as rubber, for example, is suitably used for the cushioning portion 73a and the cushioning material 73b. Grease or the like may be applied to a surface of the cushioning portion 73a or 73b.

[Regarding System]

A configuration example of a system including the electronic device 30, the power supply device 20, and the connecting member 10 and an example of a method for controlling charge and discharge of batteries included in the electronic device 30 and the power supply device 20 will be described below.

(Configuration Example of System)

Figure 9A:
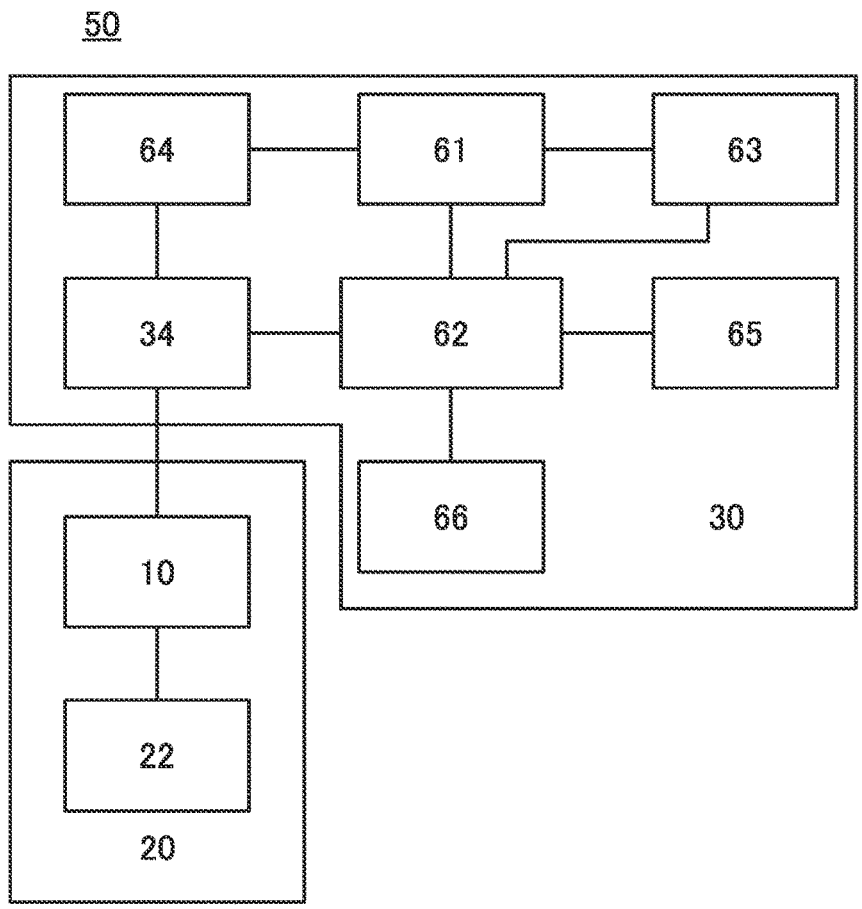
FIGS. 9A and 9B show a system of an embodiment.

FIG. 9A is a block diagram of a system 50 described as an example below. The system 50 includes the electronic device 30 and the power supply device 20.

Although the block diagram attached to this specification shows components classified by their functions in independent blocks, it is difficult to classify actual components according to their functions completely and it is possible for one component to have a plurality of functions.

The configuration of the system 50 illustrated in FIG. 9A is a mere example, and does not need to include all the components. The system 50 includes necessary components among the components illustrated in FIG. 9A and may include a component other than the components in FIG. 9A.

The electronic device 30 includes the control portion 61, the power supply control portion 62, the functional circuit 63, a sensor 64, a battery 65, a power receiving portion 66, the bearing 34, and the like. The power supply device 20 includes the connecting member 10, the battery 22, and the like.

Description on the power supply device 20 and the connecting member 10 is omitted because the above description can be referred to.

The control portion 61 can function as, for example, a central processing unit (CPU). The control portion 61 has a function of controlling components such as the power supply control portion 62, the sensor 64, and the functional circuit 63.

The power receiving portion 66 has a function of receiving power supplied from the outside and supplying the power to the power supply control portion 62.

At the time of charging, a battery charger capable of supplying power to the power receiving portion 66 can be used. At this time, the power receiving portion 66 may receive power through wires using a USB connector, an AC adaptor, or the like; alternatively, the power receiving portion 66 may receive power by a wireless power feeding method such as an electric field coupling method, an electromagnetic induction method, or an electromagnetic resonance (electromagnetic resonant coupling) method.

A power generating device may be provided for the electronic device 30 and used as one of the power receiving portions 66. A solar cell can be typically used as the power generating device, and the power generating device can be provided to overlap with part of the display portion 32 or part of the housing 31 (including the lug 33). Alternatively, a device which generates power when the electronic device 30 is shaken for example, a device which generates power when the power supply device 20 is bent and straightened for example, may be used as the power generating device.

The battery 65 serves as a main power supply of the electronic device 30. Charge and discharge of the battery 65 is controlled by the power supply control portion 62.

The power supply control portion 62 has a function of controlling charge and discharge of the battery 65 and the battery 22. The power supply control portion 62 preferably has a function of transmitting information of, for example, remaining battery power levels of the battery 65 and the battery 22 to the control portion 61.

The sensor 64 has a function of obtaining a potential difference between the pair of bearings 34 and of outputting the information to the control portion 61. A digital signal corresponding to the potential difference between the bearings 34 may be output to the control portion 61 using a comparison circuit or the like, for example. Alternatively, an analog signal corresponding to the potential difference between the bearings 34 may be output to the control portion 61. At this time, an analog-digital converter circuit is preferably used between the sensor 64 and the control portion 61.

In addition, the sensor 64 may have a function of outputting a signal to the control portion 61 in the case where the potential difference between the pair of bearings 34 is outside a predetermined range. For example, when the potential difference is over a voltage of the fully-charged state of the battery 22 specified according to a rated voltage range or the like or when the potential difference is under a voltage in the discharged state, a signal is output to the control portion 61.

The sensor 64 may have a function of sensing insertion of the connecting member 10, the normal spring bar, or the like into the pair of bearings 34 and outputting the sensed information. A sensor in which a light-receiving element and a light source are combined, a physical switch, or the like can be used, for example. When it is determined that nothing is inserted into the pair of bearings 34, the electronic device 30 can use the battery 65 as the power supply.

Figure 9B:
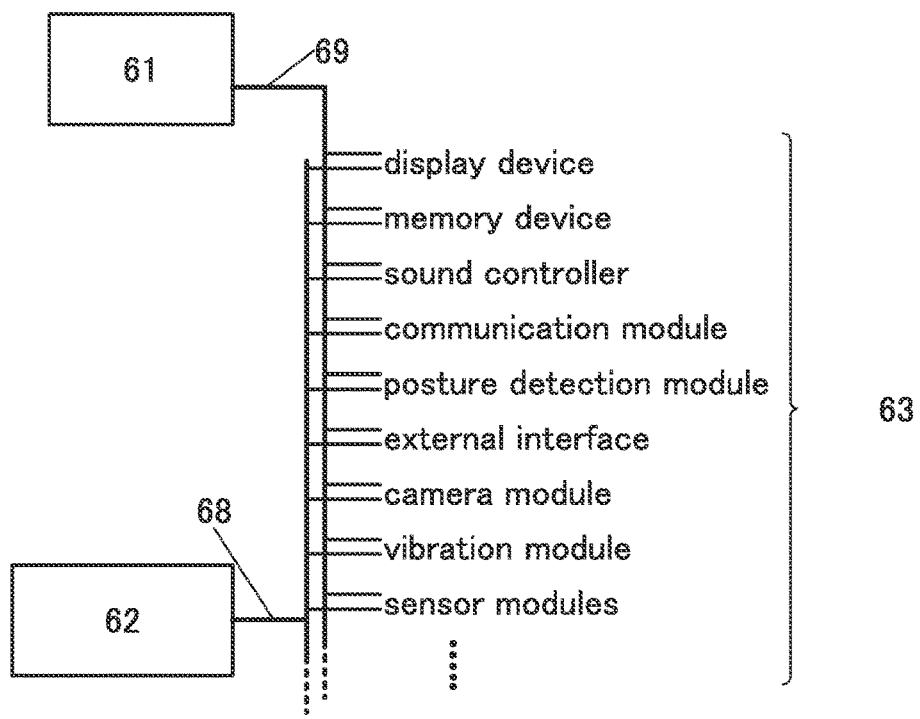

FIG. 9B illustrates examples of components which can be used for the functional circuit 63. As the functional circuit 63, a display device, a memory device, a sound controller, a communication module, a posture detection module, an external interface, a camera module, a vibration module, or a variety of sensor modules can be given. Note that all of these components are not necessarily used as the functional circuit 63. In addition, a component other than these components may be used as the functional circuit 63. As the functional circuit 63, a variety of components can be used in combination depending on the structure, function, usage, or the like of the electronic device 30.

Each component which can be used as the functional circuit 63 is connected to the control portion 61 via a bus line 69. In addition, power is supplied to each of the components from the power supply control portion 62 via a power supply line 68.

The above is the description of the configuration example of the system.

Components included in the system 50 will be described below.

(Control Portion)

The control portion 61 interprets and executes instructions from various programs with a processor to process various kinds of data and control programs. The programs that can be executed by the processor may be stored in a memory region of the processor or in the memory device.

A CPU and another microprocessor such as a digital signal processor (DSP) or a graphics processing unit (GPU) can be used alone or in combination as the control portion 61. Furthermore, such a microprocessor may be obtained with a programmable logic device (PLD) such as a field programmable gate array (FPGA) or a field programmable analog array (FPAA).

Note that a transistor that includes an oxide semiconductor in a channel formation region and that has an extremely low off-state current can be used in an IC or the like included in the control portion 61 or another component. With the use of the transistor having an extremely low off-state current as a switch for holding electric charge (data) which flows into a capacitor serving as a memory element, a long data retention period can be ensured. By utilizing this characteristic for a register or a cache memory of the control portion 61, normally-off computing is achieved where the control portion 61 operates only when needed and data on the previous processing is stored in the memory element in the rest of time; thus, power consumption of the electronic device 30 can be reduced.

The control portion 61 may include a main memory. The main memory can include a volatile memory, such as a random access memory (RAM), and a nonvolatile memory, such as a read only memory (ROM).

For example, a dynamic random access memory (DRAM) is used for the RAM included in the main memory, in which case a memory space as a workspace for the control portion 61 is virtually allocated and used. An operating system, an application program, a program module, program data, and the like which are stored in the memory device are loaded into the RAM and executed. The data, program, and program module which are loaded into the RAM are directly accessed and operated by the control portion 61.

In the ROM, a basic input/output system (BIOS), firmware, and the like for which rewriting is not needed can be stored. As the ROM, a mask ROM, a one-time programmable read only memory (OTPROM), an erasable programmable read only memory (EPROM), or the like can be used. As an EPROM, an ultra-violet erasable programmable read only memory (UV-EPROM) which can erase stored data by irradiation with ultraviolet rays, an electrically erasable programmable read only memory (EEPROM), a flash memory, and the like can be given.

(Power Control Portion)

The power supply control portion 62 may include a battery management unit (BMU), for example. The BMU collects data on cell voltage or cell temperatures of the battery, monitors overcharge and overdischarge, controls a cell balancer, handles a deterioration state of the battery, calculates the remaining battery power level (state of charge: SOC), and controls detection of a failure, for example.

The power supply control portion 62 controls power transmission to the components through the bus line 69 or a power supply line. The power supply control portion 62 can include a power converter with a plurality of channels, an inverter, a protection circuit, and the like.

The power supply control portion 62 preferably has a function of reducing power consumption. As the function of reducing power consumption, for example, after detection of no input to the electronic device 30 for a given period, the power supply control portion 62 lowers clock frequency or stops input of clocks of the control portion 61, stops operation of the control portion 61 itself, stops operation of the auxiliary memory, and reduces power consumption by reducing power supply to the components. Such a function can be performed by the power supply control portion 62 alone or the power supply control portion 62 interlocking with the control portion 61.

(Battery)

Each of the battery 65 and the battery 22 includes one or more primary batteries or secondary batteries, for example. Examples of the secondary battery which can be used as the battery 65 include a lithium-ion secondary battery, or a lithium-ion polymer secondary battery. In addition to such a battery, the battery 65 may be provided with a protection circuit for preventing overcharge and overdischarge or the like.

In the case of indoor use or the like, power supplied by the battery 65 and the battery 22 is not used and an external power supply such as an alternating-current (AC) power supply may be used. Power supplied by a wireless power feeding may be used.

As the battery 65 and the battery 22, batteries including a coin-type (or button-type) exterior body, a cylindrical exterior body, or a prismatic exterior body can be used. In particular, the coin-type battery, which is light and thin, is preferably used as the battery 65 in a wearable device.

Flexible batteries are preferably used as the battery 65 and the battery 22. Especially for the battery 22, such a battery is preferably used.

Examples of the secondary battery which can be used for the flexible battery include a lithium-ion secondary battery, or a lithium-ion polymer secondary battery. It is preferable that a laminate pouch be used as an exterior package of the battery so that the battery has flexibility.

A film used for the laminate pouch is a single-layer film selected from a metal film (e.g., an aluminum film, a stainless steel film, or a nickel steel film), a plastic film made of an organic material, a hybrid material film containing an organic material (e.g., an organic resin or fiber) and an inorganic material (e.g., ceramic), and a carbon-containing inorganic film (e.g., a carbon film or a graphite film), or a stacked-layer film including two or more of the above films. A metal film can be easily embossed. Forming depressions or projections on a surface of a metal film by embossing increases the surface area of the film exposed to outside air, achieving efficient heat dissipation.

It is particularly preferable that a laminate pouch including a metal film having depressions and projections by embossing be used, in which case a strain caused by stress applied to the laminate pouch can be relieved, leading to an effective decrease of defects such as a break of the laminate pouch due to bending of the secondary battery.

(Functional Circuit)

An example of a component that can be used for the functional circuit 63 will be described below.

<Display Device>

As the display device, a segment-type display device, a passive-matrix-type display device, an active-matrix-type display device, or the like can be used. In addition, a touch panel functioning as a touch sensor is preferably used for the display portion.

The display device includes a display panel and a display controller. When a touch panel is used in the display device, the display panel can include a touch panel, a display controller, and a touch sensor controller. Note that the display controller serves also as a touch panel controller in some cases in an in-cell-type touch panel or the like. The details especially of the case where the touch panel is used will be described below.

A touch panel is connected to a display controller and a touch sensor controller. The display controller and the touch sensor controller are connected to the control portion 61 via the bus line 69.

The display controller controls the touch panel in response to drawing instructions input from the control portion 61 via the bus line 69 so that a predetermined image is displayed on the display surface of the touch panel.

The touch sensor controller controls a touch sensor of the touch panel in response to requests input from the control portion 61 via the bus line 69. In addition, the touch sensor controller outputs a signal received by the touch sensor to the control portion 61 via the bus line 69. Note that the function of calculating touch position information from a signal received by the touch sensor may be given to the touch sensor controller or the control portion 61.

The touch panel can display an image on the basis of a signal supplied from the display controller. In addition, the touch panel is capable of sensing the proximity or touch of an object such as a finger or a stylus on the basis of a signal supplied from the touch sensor controller and of outputting the positional information of the object to the touch sensor controller.

The touch sensor and the touch sensor controller preferably have a function of obtaining the distance between a sensing surface and the object in the height direction, a function of obtaining the level of pressure applied to the sensing surface by the object, and a function of obtaining the size of the surface of the sensing surface that is in contact with the object.

In the touch panel, a module including the touch sensor can be provided on the display surface side of the display panel so as to overlap with the display panel. In that case, at least a portion of the module including the touch sensor is preferably flexible to follow the bending of the display panel. The module including the touch sensor can be bonded to the display panel with an adhesive or the like. A polarizing plate or a cushioning material (e.g., a separator) may be provided between the module and the display panel. The thickness of the module including the touch sensor is preferably less than or equal to that of the display panel.

A touch panel in which a display panel and a touch sensor are combined may be used as the touch panel. For example, the touch panel is preferably an on-cell touch panel or an in-cell touch panel. The on-cell or in-cell touch panel has a small thickness and therefore can be lightweight. In addition, the number of components of the on-cell or in-cell touch panel can be reduced, so that cost can be reduced.

A variety of sensors capable of sensing the proximity or touch of an object such as a finger can be used as the touch sensor included in the touch panel. For example, a sensor of a capacitive type, a resistive type, a surface acoustic wave type, an infrared type, or an optical type can be used. In addition, an optical sensor using a photoelectric conversion element, a pressure-sensitive sensor using a pressure-sensitive element, or the like may be used. Two or more sensors of different types may be used, or two or more sensors of the same type may be used.

Examples of the capacitive touch sensor are a surface capacitive touch sensor and a projected capacitive touch sensor. Examples of the projected capacitive touch sensor include a self-capacitive touch sensor and a mutual capacitive touch sensor. The use of the mutual capacitive touch sensor is preferable because simultaneous detection of multiple points can be performed easily.

A flexible touch panel, display panel, touch sensor, and the like can be used. This can be achievable, for example, when a flexible substrate is used as a substrate supporting a display element, a circuit for driving the display element, a circuit included in a touch sensor, and the like.

A typical example of a material of a flexible substrate is an organic resin. In addition, glass, metal, alloy, a semiconductor, or the like that is thin enough to have flexibility, or a composite material or a stacked material containing two or more of an organic resin, glass, metal, alloy, a semiconductor, and the like can be used.

As the display element included in the touch panel, a self-luminous light-emitting element such as an organic light-emitting diode (OLED), a light-emitting diode (LED), or a quantum-dot light-emitting diode (QLED) can be used. Alternatively, a transmissive, reflective, or semi-transmissive liquid crystal element may be used. Besides, for example, a display element such as a micro electro mechanical systems (MEMS) element or an electron emitter can be used. Examples of MEMS display elements include a MEMS shutter display element, an optical interference type MEMS display element, and the like. A carbon nanotube may be used for the electron emitter. Alternatively, electronic paper may be used. As the electronic paper, an element using a microcapsule method, an electrophoretic method, an electrowetting method, an Electronic Liquid Powder (registered trademark) method, or the like can be used.

<Memory Device>

Examples of the memory device are a memory device including a nonvolatile memory element, such as a flash memory, a magnetoresistive random access memory (MRAM), a phase change RAM (PRAM), a resistance RANI (ReRAM), or a ferroelectric RAM (FeRAM), and a memory device including a volatile memory element, such as a dynamic RAM (DRAM) or a static RAM (SRAM). Alternatively, a storage media drive such as a hard disk drive (HDD) or a solid state drive (SSD) may be used, for example.

As the memory device, a memory device which can be connected to and disconnected from an external interface with a connector, such as an HDD or an SSD, or a storage media drive, such as a flash memory, a Blu-ray disc, or a DVD can also be used. Note that the memory device is not necessarily incorporated in the electronic device 30, and a memory device outside the electronic device 30 may be used. In this case, the memory device may be connected through the external interface, or data transmission and reception may be wirelessly performed using a communication module.

<Sound Controller>

A sound controller has a function of controlling an audio input portion and an audio output portion. The audio input portion includes a microphone, an audio input connector, or the like, for example. The audio output portion includes a speaker, an audio output connector, or the like, for example. The audio input portion and the audio output portion are connected to the sound controller, and are connected to the control portion 61 via the bus line 69. Audio data input to the audio input portion is converted into a digital signal in the sound controller and then processed in the sound controller and the control portion 61. In contrast, the sound controller generates an analog audio signal audible to a user in response to instructions from the control portion 61 and outputs the analog audio signal to the audio output portion. To the audio output connector of the audio output portion, an audio output device such as earphones, headphones, or a headset can be connected and a sound generated in the sound controller is output to the device.

<Communication Module>

The communication module can communicate via an antenna. For example, the communication module controls a control signal for connecting the electronic device 30 to a computer network in response to instructions from the control portion 61 and transmits the signal to the computer network. Accordingly, communication can be performed by connecting the electronic device 30 to a computer network such as the Internet, which is an infrastructure of the World Wide Web (WWW), an intranet, an extranet, a personal area network (PAN), a local area network (LAN), a campus area network (CAN), a metropolitan area network (MAN), a wide area network (WAN), or a global area network (GAN). When a plurality of communication methods are used, the electronic device 30 may have a plurality of antennas for the communication methods.

For example, a high frequency circuit (RF circuit) is included in the communication module for transmitting and receiving an RF signal. The high frequency circuit performs conversion between an electromagnetic signal and an electric signal in a frequency band which is set by respective national laws and performs communication with another communication device wirelessly with the use of the electromagnetic signal. Several tens of kilohertz to several tens of gigahertz is a practical frequency band which is generally used. The high frequency circuit connected to an antenna includes a high frequency circuit portion compatible with a plurality of frequency bands; the high frequency circuit portion can include an amplifier, a mixer, a filter, a DSP, an RF transceiver, or the like. The following communication protocol or communication technology for wireless communication can be used: a communications standard such as Long Term Evolution (LTE), Global System for Mobile Communication (GSM) (registered trademark), Enhanced Data Rates for GSM Evolution (EDGE), Code Division Multiple Access 2000 (CDMA2000), or Wideband Code Division Multiple Access (W-CDMA) (registered trademark), or a communications standard developed by IEEE such as Wi-Fi (registered trademark), Bluetooth (registered trademark), or ZigBee (registered trademark).

The communication module may have a function of connecting the electronic device 30 to a telephone line. In the case of a telephone call through the telephone line, the communication module controls a connection signal for connecting the electronic device 30 to the telephone line in response to instructions from the control portion 61 and transmits the signal to the telephone line.

The communication module may include a tuner generating an image signal from airwaves received by the antenna. The image signal is output to the touch panel or the like. For example, the tuner can include a demodulation circuit, an analog-digital (AD) converter circuit, a decoder circuit, and the like. The demodulation circuit has a function of demodulating a signal input from the antenna. The AD converter circuit has a function of converting the demodulated analog signal into a digital signal. The decoder circuit has a function of decoding image data contained in the digital signal and generating a signal to be transmitted to a display controller.

Alternatively, a decoder may include a dividing circuit and a plurality of processors. The dividing circuit has a function of dividing the input image data spatiotemporally and outputting it to the processors. The plurality of processors decode the input image data and generate signals to be transmitted to the display controller. Since the decoder includes the plurality of processors which perform parallel data processing, image data containing enormous amounts of information can be decoded. Particularly in the case of displaying an image with a resolution higher than the full high definition, a decoder circuit for decoding compressed data preferably includes a processor having extremely high-speed processing capability. The decoder circuit preferably includes a plurality of processors capable of performing 4 or more, preferably 8 or more, further preferably 16 or more parallel operations. The decoder may include a circuit for classifying an image signal contained in the input signal from other signals (e.g., text information, broadcast program information, and certification information).

The antenna can receive airwaves such as a ground wave and a satellite wave. The antenna can receive airwaves for analog broadcasting, digital broadcasting, and the like, and image-sound-only broadcasting, sound-only broadcasting, and the like. For example, the antenna can receive airwaves transmitted in a certain frequency band, such as a UHF band (about 300 MHz to 3 GHz) or a VHF band (30 MHz to 300 MHz). When a plurality of pieces of data received in a plurality of frequency bands is used, the transfer rate can be increased and more information can thus be obtained. Accordingly, an image with resolution higher than the full high definition, such as 4K-2K, 8K-4K, 16K-8K, or higher, can be displayed on a touch panel or the like.

Alternatively, the tuner may be configured to generate a signal using the broadcasting data transmitted with data transmission technology through a computer network. The signal is transmitted to the display controller. In the case where the tuner receives a digital signal, the tuner does not necessarily include the demodulation circuit and the AD converter circuit.

<Posture Measurement Module>

The posture measurement module has a function of measuring a tilt, a posture, and the like of the electronic device 30. For example, an acceleration sensor, an angular velocity sensor, a vibration sensor, a pressure sensor, a gyroscope sensor, or the like can be used for the posture measurement module. Alternatively, these sensors may be combined.

<External Interface>

Examples of the external interface include one or more buttons or switches (also referred to as housing switches) and an external port to which another input component can be connected which are provided on the housing 31. The external interface is connected to the control portion 61 via the bus line 69. Examples of the housing switch include a switch which links with powering on/off, a button for adjusting volume, and a camera button.

The external port of the external interface can be connected to an external device such as a computer, a printer, a video reproducing device, for example, through a cable. An universal serial bus (USB) terminal is a typical example. As the external port, a local area network (LAN) connection terminal, a digital broadcasting reception terminal, an AC adaptor connection terminal, or the like may be provided. A transceiver for optical communication, without limitation to wire communication, using infrared rays, visible light, ultraviolet rays, or the like, may be provided.

<Camera Module>

A camera module has a function of taking still images and moving images. The camera module is connected to the control portion 61 via the bus line 69, for example. The camera module can take a still image or a moving image in synchronization with pushing a switch provided on the housing or touching the touch panel, for example. The camera module may include a light source for taking images. For example, a lamp such as a xenon lamp, a light-emitting element such as an LED or an organic EL element, or the like can be used. Alternatively, the touch panel may be used as the light source for taking images, in which case light with a variety of colors in addition to white may be used for taking images.

<Vibration Module>

The vibration module includes a vibrating element for vibrating the electronic device 30 and a vibration controller for controlling the vibrating element. As the vibrating element, an element capable of converting an electric signal or a magnetic signal into vibration, such as a vibration motor (eccentric motor), a resonant actuator, a magnetostrictive element, or a piezoelectric element can be used.

The vibration module can vibrate the electronic device 30 in accordance with a variety of vibration patterns by controlling the number of vibrations, the amplitude, vibration time, and the like of the vibrating element according to instructions from the control portion 61. The vibration module can generate vibration with a variety of vibration patterns based on operation executed by a variety of applications. Examples of such vibration include vibration linked with operation of the housing switch or the like, vibration linked with startup of the electronic device 30, vibration linked with a moving image or audio reproduced by an application for reproducing a moving image, vibration linked with reception of an e-mail, and vibration linked with input operation to the touch panel.

<Sensor Module>

The sensor module includes a sensor unit and a sensor controller. The sensor controller supplies power from the battery module or the like to the sensor unit. Moreover, the sensor controller converts the input from the sensor unit into a control signal and outputs it to the control portion 61 via the bus line 69. The sensor controller may handle errors made by the sensor unit or may calibrate the sensor unit. Note that the sensor controller may include a plurality of controllers for controlling the sensor unit.

The sensor module may include any of a variety of sensors which measure force, displacement, position, speed, acceleration, angular velocity, rotational frequency, distance, light, liquid, magnetism, temperature, a chemical substance, a sound, time, hardness, electric field, current, voltage, electric power, radiation, flow rate, humidity, gradient, vibration, smell, and infrared rays.

In addition, as a sensor included in the sensor module, a sensor which obtains biological information can be used. Examples of biological information include body temperature, blood pressure, pulse rate, the amount of sweat, lung capacity, blood sugar level, blood alcohol concentration, $SpO_2$ (blood oxygen saturation), and the like. Obtaining such biological information enables the electronic device 30 to be used as a healthcare system.

In addition, as the sensor included in the sensor module, a sensor which obtains biological information of fingerprints, veins, iris, voice prints, or the like can also be used. The use of such a sensor enables biometric identification function to be performed and can prevent unauthorized use of the electronic device 30 by others, so that the security level can be increased.

The above is the description of examples of components that can be used as the functional circuit 63.

Example of Operation Method of System

Next, operation of the system 50 illustrated in FIG. 9A will be described.

Operation Method Example 1

Figure 10:
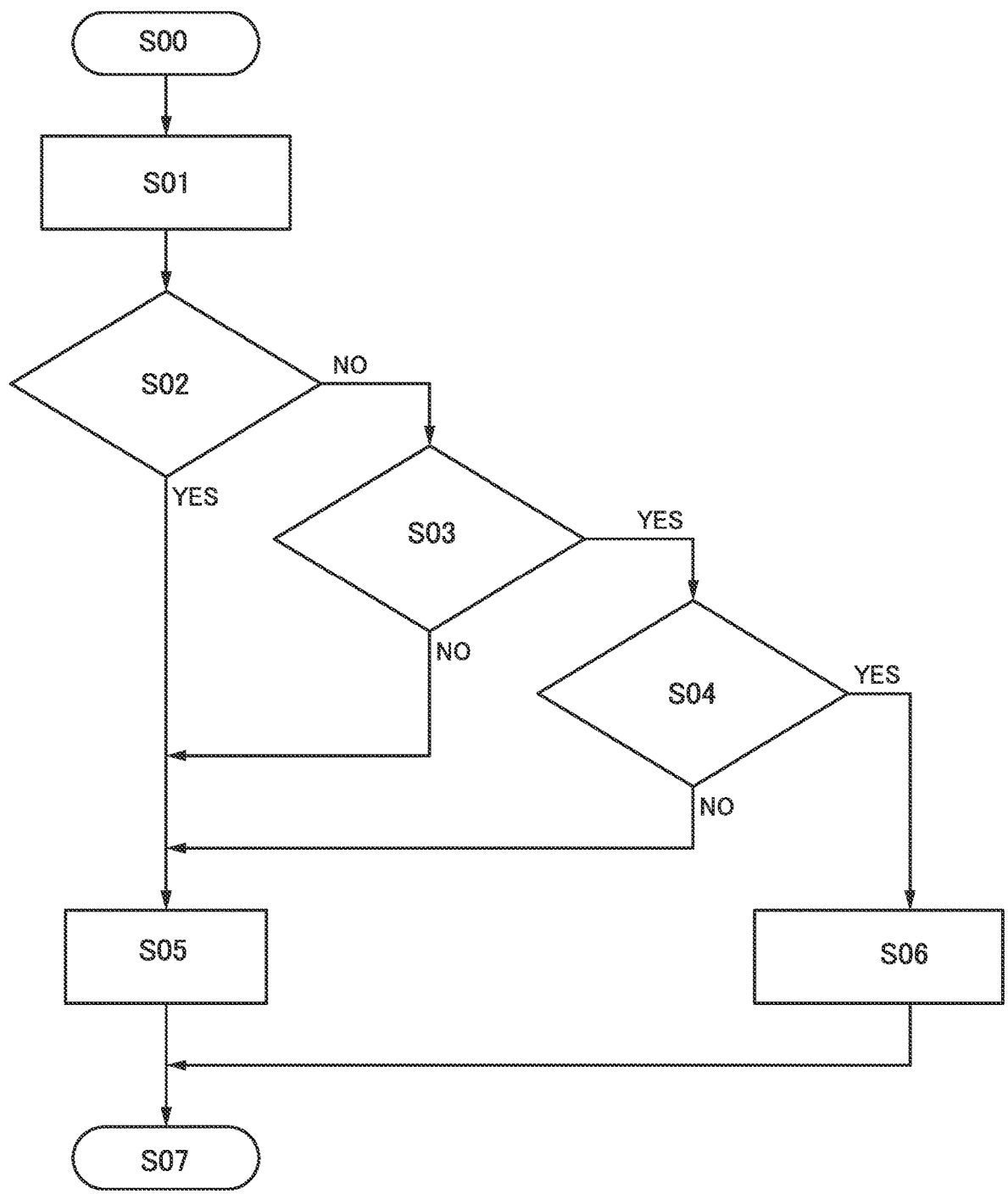
FIG. 10 shows an operation method of a system of an embodiment.

FIG. 10 is a flow chart of an operation of the system 50. FIG. 10 is an example in which the operation is performed so that power of either the battery 22 or the battery 65 is used. The following operations are mainly performed by the control portion 61.

First, the operation starts in Step S00. The operation is started when the electronic device 30 is turned on or the system 50 is set to be effective by the user, for example. Alternatively, the operation may be started when the connecting member 10 or a component such as the conventional spring bar is attached to or detached from the bearings 34, for example.

Next, information of a potential of the pair of bearings 34 (hereinafter, also referred to as potential information) is obtained in Step S01. Specifically, the control portion 61 controls the sensor 64 to obtain information of a potential between the pair of bearings 34. The sensor 64 outputs the obtained potential information to the control portion 61.

Next, whether the pair of bearings 34 are electrically shorted or insulated from each other or not is determined in Step S02. When it is determined that the pair of bearings 34 are electrically shorted or insulated from each other, Step S02 is shifted to Step S05, and when it is determined that the pair of bearings 34 are not electrically shorted and insulated from each other, Step S02 is shifted to Step S03.

Step S02 corresponds to a step for determining whether the power supply device 20 is connected to the electronic device 30 or not.

Specifically, when a potential difference between the pair of bearings 34 is 0 V or in the neighborhood thereof, it is determined that the pair of bearings 34 are electrically shorted or insulated from each other. At this time, it can be determined that the power supply device 20 provided with the battery 22 is not connected to at least the pair of bearings 34.

In contrast, when a potential difference between the pair of bearings 34 is higher than or equal to 0.5 V, higher than or equal to 1 V, or the like, it is determined that the pair of bearings 34 are not electrically shorted and insulated from each other. At this time, it can be determined that the power supply device 20 is connected to the pair of bearings 34.

Next, whether a potential difference of the pair of bearings 34 is in a range of a given potential difference or not is determined in Step S03. When it is in the range of the given potential difference, Step S03 is shifted to Step S04; in contrast, when it is not in the range of the given potential difference, Step S03 is shifted to Step S05.

Step S03 corresponds to a step for checking the remaining power level of the battery 22 in the power supply device 20. The remaining power level of the battery 22 can be measured here using a value of output voltage in a range specified according to a rated voltage range or the like. For example, in the rated voltage range, it can be assumed that fully-charged voltage is 100% and discharged voltage is 0%. At this time, in Step S03, it can be determined that the remaining power level of the battery 22 is not enough when a potential difference between the pair of bearings 34 is higher than or equal to 0% and lower than 5% or higher than or equal to 0% and lower than 3% of the potential difference in the rated voltage range.

Step S03 also corresponds to a step for excluding output voltage of the battery 22 when the voltage is beyond an expected voltage range. In the case where the output voltage of the battery 22 is beyond the expected voltage, components in the electronic device 30 might be broken. For example, when the potential difference of the pair of bearings 34 is beyond the maximum value, set in advance, of voltage that can be input to the electronic device 30, it is determined that the potential difference is not in the range of the given potential difference.

Note that the remaining power level of the battery 22 is measured using, but not limited to, the potential difference between the pair of bearings 34. The remaining power level may be measured using the current amount, the power amount, or the like.

Next, whether power supplied from the bearings 34 is used or not is determined in Step S04. When the power is used, Step S04 is shifted to Step S06; when it is not used, Step S04 is shifted to Step S05.

In Step S04, the operation of the control portion 61 can be specified in accordance with setting information that is set in advance. The setting information may be set in advance before shipment. In addition, the setting information may be changeable by the user. In addition, a condition that power supplied from the bearings 34 is used when the remaining power level of the battery 65 becomes lower than 10%, or the like may be added to the setting information.

In Step S05, the electronic device 30 is driven using power by the battery 65 included in the electronic device 30. Specifically, the control portion 61 controls the power supply control portion 62 so that power supplied from the battery 65 is output to the components. After that, Step S05 is shifted to Step S07.

In Step S06, the electronic device 30 is driven using power supplied from the pair of bearings 34. Specifically, the control portion 61 controls the power supply control portion 62 so that power input from the battery 22 included in the power supply device 20 via the connecting member 10 and the bearings 34 is output to the components. After that, Step S06 is shifted to Step S07.

In Step S07, the operation is completed.

The above is the description of the flow shown in FIG. 10.

The use of the method illustrated here makes it possible to easily determine which is connected to the pair of bearings 34, the power supply device 20 including the battery 22 and the connecting member 10 or a normal wearing tool not including them. When the normal wearing tool is connected to the pair of bearings 34, the electronic device 30 can be driven using the battery 65 included in the electronic device 30 itself as the power supply.

Operation Method Example 2

Figure 11:
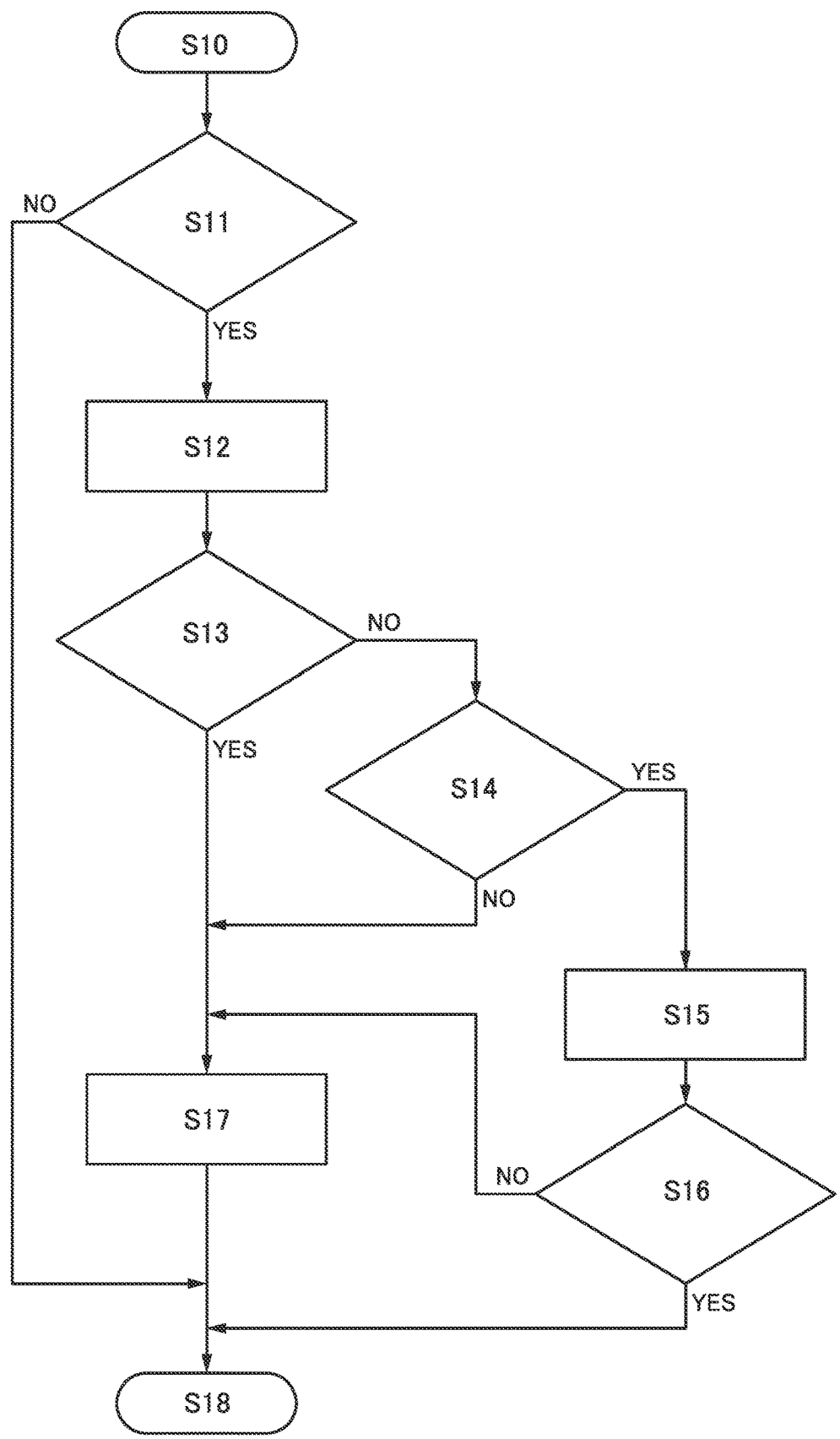
FIG. 11 shows an operation method of a system of an embodiment.

FIG. 11 is a flow chart of an operation of the system 50. FIG. 11 is a flow chart of an operation for charging the battery 22 and the battery 65. In particular, FIG. 11 is an example of a case where the battery 22 is preferentially charged. The following operations are mainly performed by the control portion 61.

First, the operation starts in Step S10.

Next, it is determined whether power is being received or not in Step S11 Specifically, it is determined whether the power receiving portion 66 is receiving power or not. When power is being received, Step S11 is shifted to Step S12; when power is not received, Step S11 is shifted to Step S18.

In Step S12, positional information is obtained.

In Step S13, whether the pair of bearings 34 are electrically shorted or insulated from each other or not is determined. When it is determined that the pair of bearings 34 are electrically shorted or insulated from each other, Step S13 is shifted to Step S17, and when it is determined that the pair of bearings 34 are not electrically shorted and insulated from each other, Step S13 is shifted to Step S14.

In Step S14, it is determined whether a potential difference of the pair of bearings 34 is lower than a given potential difference or not. When it is lower than the given potential difference, Step S14 is shifted to Step S15; in contrast, when it is higher than or equal to the given potential difference, Step S14 is shifted to Step S17.

Step S14 corresponds to a step for checking whether the battery 22 in the power supply device 20 is fully charged or not. For example, the given potential difference in Step S14 can be set as a potential difference corresponding to that of a fully-charged state of the battery 22 (a state in which the output voltage is 100% in the rated voltage range).

In Step S15, power is output to the pair of bearings 34, so that the battery 22 is charged. Specifically, the control portion 61 controls the power supply control portion 62 so that power supplied from the power receiving portion 66 is output to the pair of bearings 34. The power supply control portion 62 gives a potential difference for charging the battery 22 to the pair of bearings 34. This makes it possible to charge the battery 22 via the connecting member 10. After that, Step S15 is shifted to Step S16.

Step S15 is continued until the battery 22 becomes fully-charged or in the neighborhood state. Specifically, charge is completed when the potential difference between the pair of bearings 34 is equal to the potential difference corresponding to that of the fully-charged battery 22 or higher than or equal to 95% of the potential difference. In contrast, charge is continued when the potential difference corresponds to a potential difference of a state where the charged state of the battery is lower than 100% or lower than 95%.

In Step S16, it is determined whether the battery 65 has been completely charged or not. When the battery 65 has been completely charged, Step S16 is shifted to Step S18. In contrast, when the battery 65 has not been completely charged, Step S16 is shifted to Step S17.

Specifically, it is determined that the battery 65 has been completely charged when its charged state is a fully-charged state or higher than or equal to 95%. In contrast, it is determined that the battery 65 has not been completely charged when the charged state is lower than 100% or 95%.

In Step S17, power is output to the battery 65, so that the battery 65 is charged. Specifically, the control portion 61 controls the power supply control portion 62 so that power supplied from the power receiving portion 66 is output to the battery 65. After that, Step S17 is shifted to Step S18.

Step S17 is continued until the battery 65 becomes fully-charged or in the neighborhood state, as in Step S15.

In Step S18, the operation is completed. At this point, the battery 22 and the battery 65 have been completely charged.

The above is the description of the operation method example 2.

Operation Method Example 3

Figure 12:
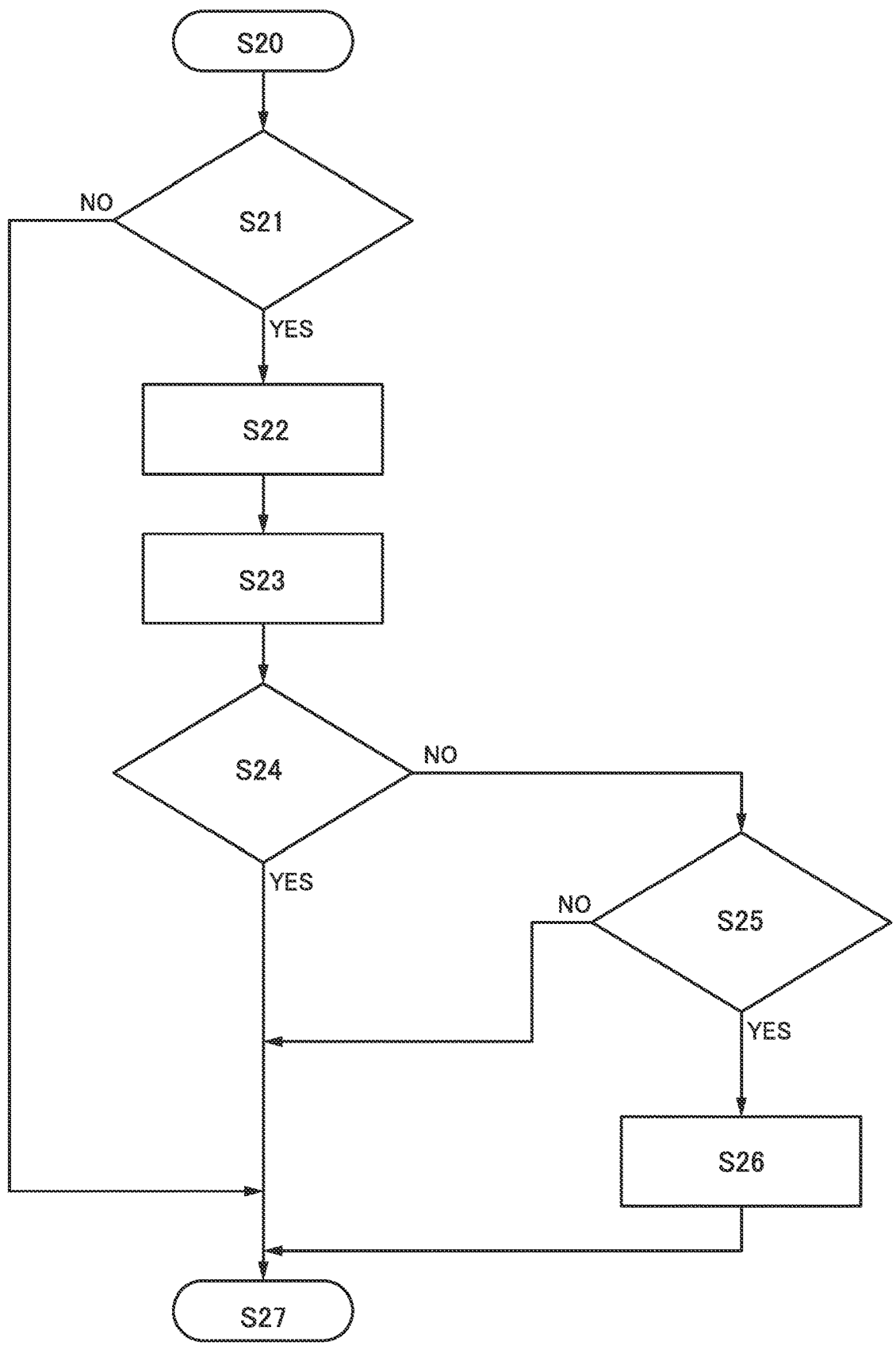
FIG. 12 shows an operation method of a system of an embodiment.

FIG. 12 is a flow chart of an operation of the system 50. FIG. 12 is a flow chart of an operation for charging the battery 22 and the battery 65. In particular, FIG. 12 is an example of a case where the battery 65 is preferentially charged. The following operations are mainly performed by the control portion 61.

First, the operation starts in Step S20.

Next, it is determined whether power is being received or not in Step S21. When power is being received, Step S21 is shifted to Step S22; when power is not received, Step S21 is shifted to Step S27.

In Step S22, power is output to the battery 65, so that the battery 65 is charged. Specifically, the control portion 61 controls the power supply control portion 62 so that power supplied from the power receiving portion 66 is output to the battery 65. After the battery 65 is completely charged, Step S22 is shifted to Step S23.

In Step S23, positional information is obtained.

In Step S24, whether the pair of bearings 34 are electrically shorted or insulated from each other or not is determined. When it is determined that the pair of bearings 34 are electrically shorted or insulated from each other, Step S24 is shifted to Step S27, and when it is determined that the pair of bearings 34 are not electrically shorted and insulated from each other, Step S24 is shifted to Step S25.

In Step S25, it is determined whether the potential difference of the pair of bearings 34 is lower than a given potential difference or not. When it is lower than the given potential difference, Step S25 is shifted to Step S26; in contrast, when it is higher than or equal to the given potential difference, Step S25 is shifted to Step S27.

The above description can be referred to for the standards for determination of Step S25.

In Step S26, power is output to the pair of bearings 34, so that the battery 22 is charged. After the battery 22 is completely charged, Step S26 is shifted to Step S27.

In Step S27, the operation is completed. At this point, the battery 22 and the battery 65 have been completely charged.

The above is the description of the operation method example 3.

Two methods for charging the battery 22 and the battery 65 are described here. Either method may be selected in accordance with which battery is preferentially charged. In addition, which method is used may be set in advance as the setting information or may be changeable by the user.

Note that one embodiment of the present invention may be achieved in such a manner that a program is stored in a memory portion included in the electronic device 30 and read out and executed by the control portion 61. That is, another embodiment of the present invention is a program which makes the control portion 61 to perform the operations of the above flow.

The above is the description of the operation method examples of the system.

Application

Although a watch-type information terminal is described above as an example of an electronic device in which the connecting member, power supply device, and the like of one embodiment of the present invention can be used, the electronic device is not limited thereto. The connecting member, the power supply device, and the like can be used in various electronic devices. Examples of an electronic device which is different from the above will be described below.

The power supply device of one embodiment of the present invention can be used for various usages because of its characteristics of the band shape, the flexibility, or the like. For example, the power supply device can be used as a wearing tool for wearing the device on the arm, foot, west, or the like. In addition, the power supply device can be used for parts of the device serving as its handle or a strap for being suspended from the shoulder or neck, or can be used as an accessary, like a cell phone charm, which is also used to prevent slipping down.

Examples of a device in which the power supply device of one embodiment of the present invention can be used include wearable devices such as a watch-type electronic device, a glasses-type electronic device, a head mounted display (HMD), and the like. In addition, the power supply device can be favorably used for a biological information device such as blood pressure meter, an electrocardiograph, and a pedometer. In addition, the following various electronic devices can be given: a mobile information terminal such as a mobile phone, a smart phone, and a tablet device; a digital camera; an audio reproducing device; a moving image reproducing device; a communication device such as a mobile router; wireless earphones; wireless headphones; a speaker; and the like.

The power supply device can be used not only for electronic devices, but also for bags, clothes (including hats), and the like. The power supply device of one embodiment of the present invention can be used for bags or clothes without injuring its lightweight or fittability because of its thinness, lightweight, and flexibility.

For example, a bag whose handle or strap includes the power supply device of one embodiment of the present invention serves as a charger for charging electronic devices which are carried in the bag. In addition, various functions using power such as a communication function, a function of transmitting a sound or vibration, or the like can be added to the bag itself, for example.

The power supply device included in clothes can add a function of obtaining biological information by an electrode or sensor provided in the clothes, can change its design by emitting light from part of the clothes or displaying an image on part of the clothes, and can extend the clothes.

The power supply device of one embodiment of the present invention can be easily attached and detached and can be easily detached when the clothes are washed, for example; therefore, risks of shorting the battery or the like can be prevented.

Figure 13A:
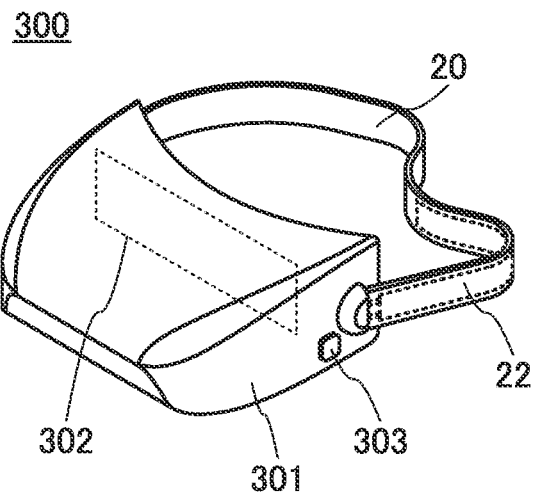
FIGS. 13A to 13E each illustrate an electronic device of an embodiment.
Figure 13B:
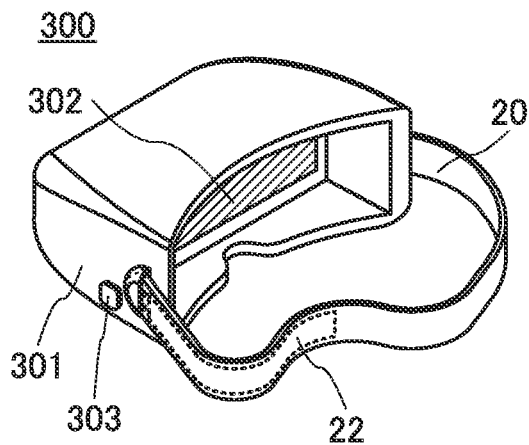

FIGS. 13A and 13B are external views of a head-mounted display 300.

The head-mounted display 300 includes a housing 301, a display portion 302, and an operation button 303. The strap-like power supply device 20 is attached to the housing 301. The power supply device 20 includes the battery 22.

The head-mounted display 300 can use a battery provided in the housing 301 and the battery 22 provided in the power supply device 20 as its power supply.

The head-mounted display 300 may include a power generating device such as a solar cell in the housing 301. A device which generates power when the head-mounted display 300 is shaken for example, a device which generates power when the power supply device 20 is bent and straightened for example, may be used as the power generating device.

The housing 301 includes a wireless receiver, a connector, or the like to receive video data, such as image data, and display it on the display portion 302. The head-mounted display preferably has a function of sensing the movement of the user's head or the like with an acceleration sensor or the like included in the housing 301 to move an image displayed on the display portion 302 in synchronization with the movement of the user's head or the like.

The movement of the eyeball and the eyelid of a user is captured by a camera in the housing 301 and then coordinates of the points the user looks at are calculated using the captured data to utilize the eye of the user as an input means. The housing 301 may include a plurality of electrodes to be in contact with the user. The housing 301 may be configured to sense current flowing through the electrodes with the movement of the user's eyeball to recognize the direction of his or her eyes. The housing 301 may be configured to sense current flowing through the electrodes to monitor the user's pulse. The housing 301 may include sensors, such as a temperature sensor, a pressure sensor, or an acceleration sensor, so that the user's biological information can be displayed on the display portion 302.

The operation button 303 serves as a power button or the like. A button other than the operation button 303 may be included.

Figure 13C:
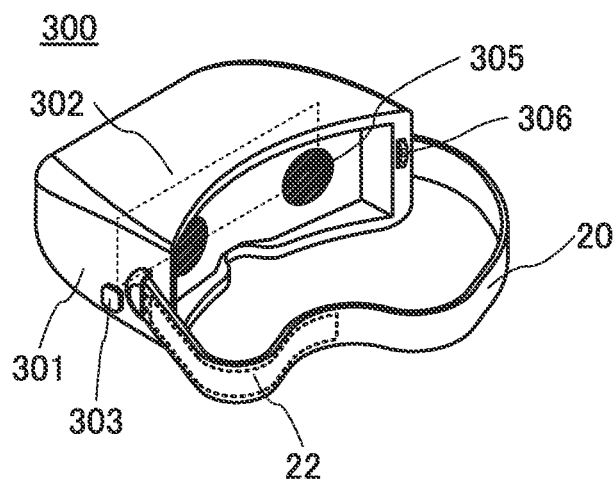

As illustrated in FIG. 13C, lenses 305 may be provided between the display portion 302 and the user's eyes. With the lenses 305, the user can see magnified images on the display portion 302; thus, the realism is further increased. In this case, as illustrated in FIG. 13C, a dial 306 for adjusting the position of the lenses may be included to adjust visibility.

The display portion 302 can display an image for the right eye and an image for the left eye side by side on a right region and a left region, respectively. Thus, a three-dimensional image using binocular disparity can be displayed.

One binocular visible image may be displayed on the entire region of the display portion 302. A panorama image can thus be displayed from end to end of the field of view; therefore, the sense of reality is increased.

With the lenses 305 provided as illustrated in FIG. 13C, two images may be displayed side by side on the display portion 302; alternatively, one image may be displayed on the display portion 302 and seen by both eyes through the lenses 305.

Figure 13D:
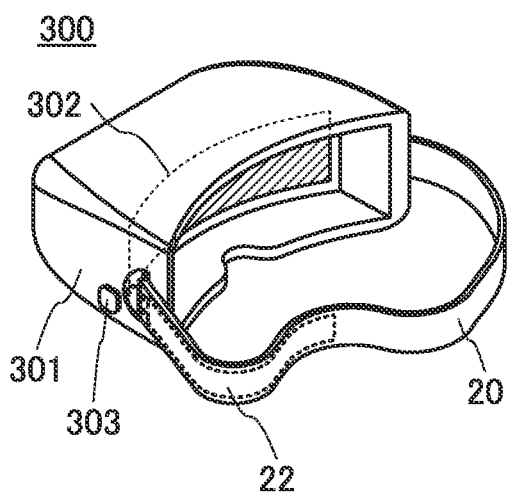

FIG. 13D illustrates an example in which a curved display is used as the display portion 302. This structure can perform more realistic display than the case where a display having a flat display surface is used.

Figure 13E:
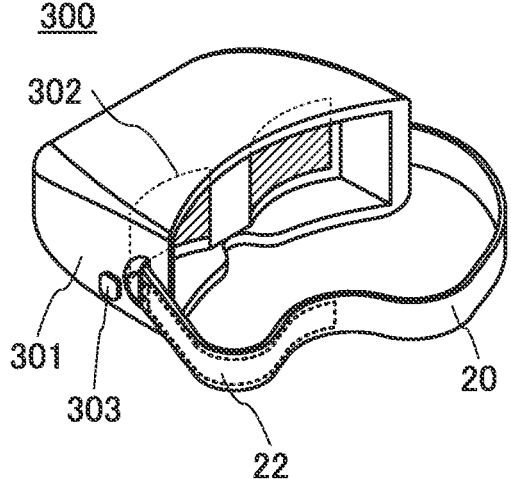

FIG. 13E illustrates an example in which two displays, a right-eye display and a left-eye display, are provided as the display portions 302.

With the two display portions 302, the user can see one of the display portions 302 with one eye. Thus, a high-resolution image can be displayed even when a three-dimensional display using parallax or the like is performed. In addition, the display portions 302 are each curved around an arc with the user's eye as an approximate center. Owing to this, the distance between the user's eye and the display surface of the display portion 302 is uniform; thus, the user can see a more natural image. Even when the directivity of light emitted from the display portion 302 is high and the luminance or chromaticity of the light is changed depending on the angle at which the user see it, the influence of the change can be substantially ignorable and thus a more realistic image can be displayed because the user's eye is positioned in a normal direction of the display surface of the display portion 302.

Figure 14A:
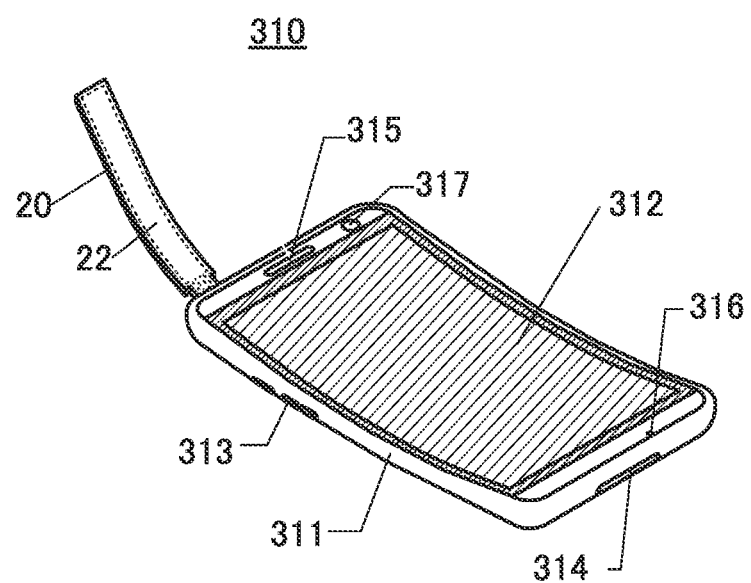
FIGS. 14A and 14B each illustrate an electronic device of an embodiment.

FIG. 14A illustrates an example of a mobile information terminal. A mobile information terminal 310 illustrated in FIG. 14A includes a housing 311, a display portion 312, an operation button 313, an external connection port 314, a speaker 315, a microphone 316, a camera 317, and the like. The band-like power supply device 20 is attached to the housing 311. The power supply device 20 includes the battery 22.

The mobile information terminal 310 can use a battery provided in the housing 311 and the battery 22 provided in the power supply device 20 as its power supply.

The mobile information terminal 310 may include a power generating device such as a solar cell in the housing 311. A device which generates power when the mobile information terminal 310 is shaken for example, a device which generates power when the power supply device 20 is bent and straightened for example, may be used as the power generating device.

The mobile information terminal 310 includes a touch sensor in the display portion 312. Operations such as making a call and inputting a letter can be performed by touch on the display portion 312 with a finger, a stylus, or the like.

With the operation button 313, the power can be switched on and off. In addition, types of images displayed on the display portion 312 can be switched; for example, switching images from a mail creation screen to a main menu screen is performed with the operation button 313.

When a sensing device such as a gyroscope sensor or an acceleration sensor is provided inside the mobile information terminal 310, the direction of display on the screen of the display portion 312 can be automatically changed by determining the orientation of the mobile information terminal 310 (whether the mobile information terminal is placed horizontally or vertically). Furthermore, the direction of display on the screen can be changed by touch on the display portion 312, operation with the operation button 313, sound input using the microphone 316, or the like.

The mobile information terminal 310 has a function as, for example, one or more of a telephone set, a notebook, and an information browsing system. Specifically, the mobile information terminal 310 can be used as a smartphone. The mobile information terminal 310 is capable of executing a variety of applications such as mobile phone calls, e-mailing, viewing and editing texts, music reproduction, moving image reproduction, Internet communication, and computer games, for example.

Figure 14B:
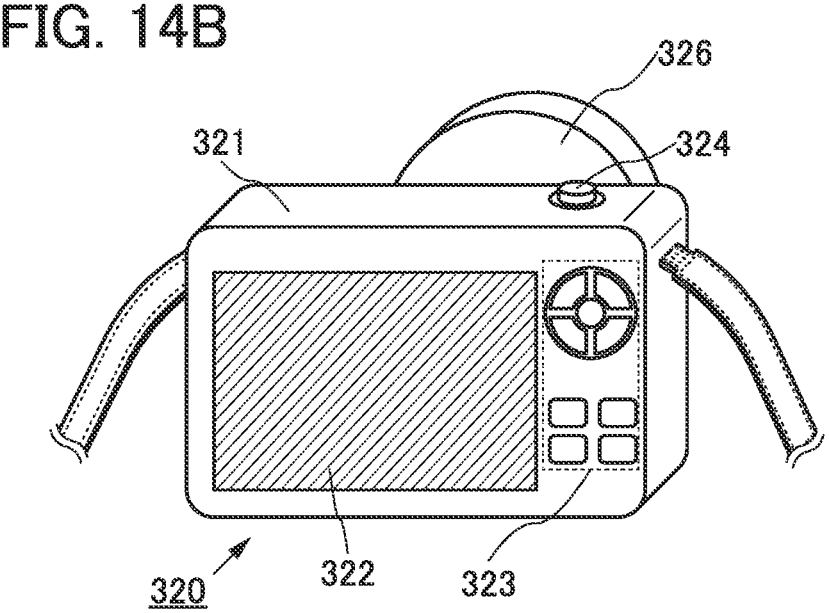

FIG. 14B illustrates an example of a camera. A camera 320 includes a housing 321, a display portion 322, operation buttons 323, a shutter button 324, and the like. Furthermore, an attachable lens 326 is attached to the camera 320. The band-like power supply device 20 is attached to the housing 321. The power supply device 20 includes the battery 22.

The camera 320 can use a battery provided in the housing 321 and the battery 22 provided in the power supply device 20 as its power supply.

The camera 320 may include a power generating device such as a solar cell in the housing 321. A device which generates power when the camera 320 is shaken for example, a device which generates power when the power supply device 20 is bent and straightened for example, may be used as the power generating device.

Although the lens 326 of the camera 320 here is detachable from the housing 321 for replacement, the lens 326 may be included in the housing.

The camera 320 can shoot still images or moving images when the shutter button 324 is pressed. In addition, the display portion 322 functions as a touch panel, and shooting can also be performed when the display portion 322 is touched.

Note that the camera 320 can be additionally provided with a stroboscope, a viewfinder, or the like. Alternatively, they may be incorporated in the housing 321.

The above is the description of the application examples.

This embodiment can be implemented in combination with any of the other embodiment described in this specification as appropriate.

Embodiment 2

Structure examples and manufacturing method examples of a secondary battery that can be used for the battery 22 of one embodiment of the present invention, or the like will be described below with reference to drawings. In particular, an example of a bendable secondary battery will be described below.

Structure Example

Figure 15:
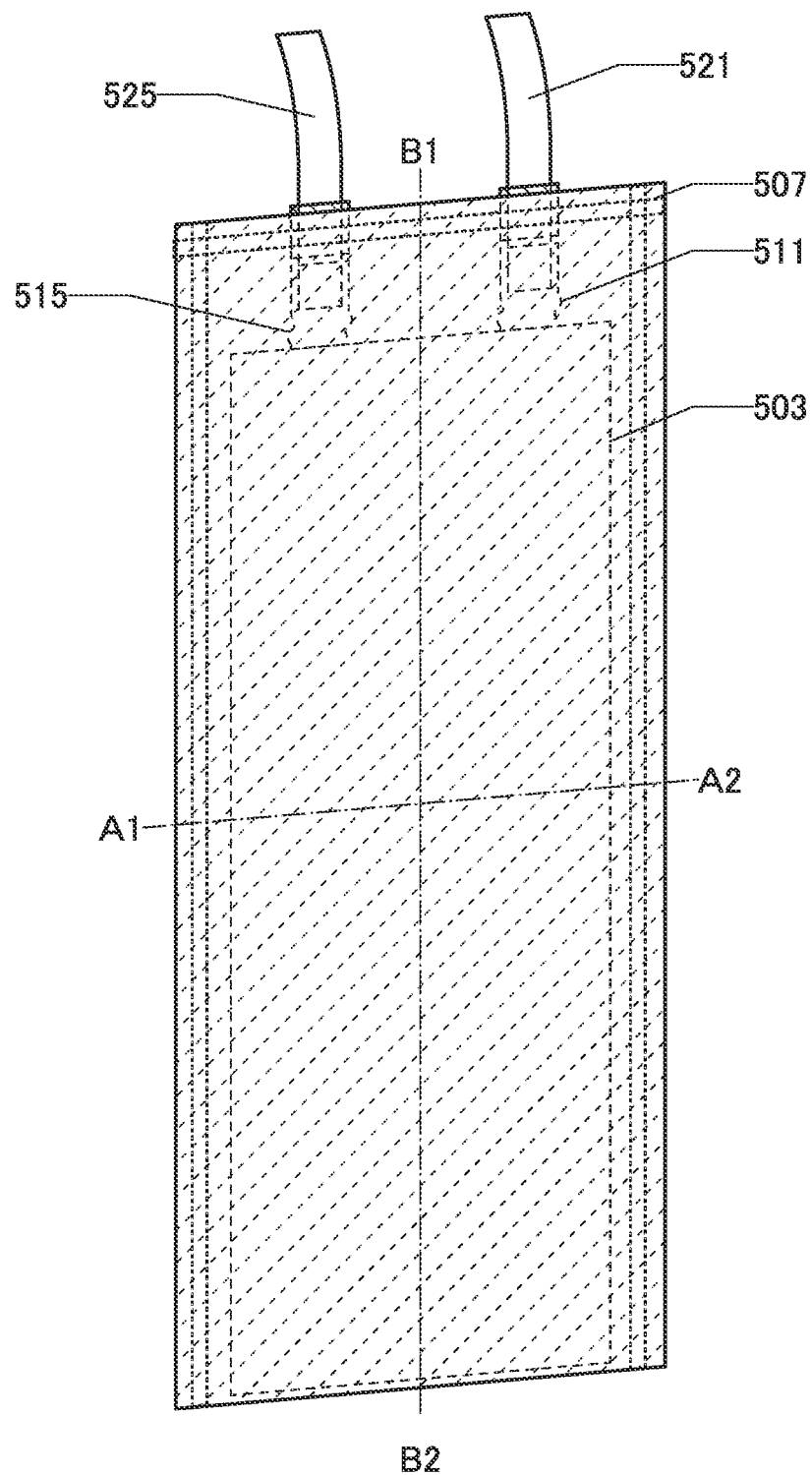
FIG. 15 illustrates a structure of a secondary battery of an embodiment.
Figure 16A:
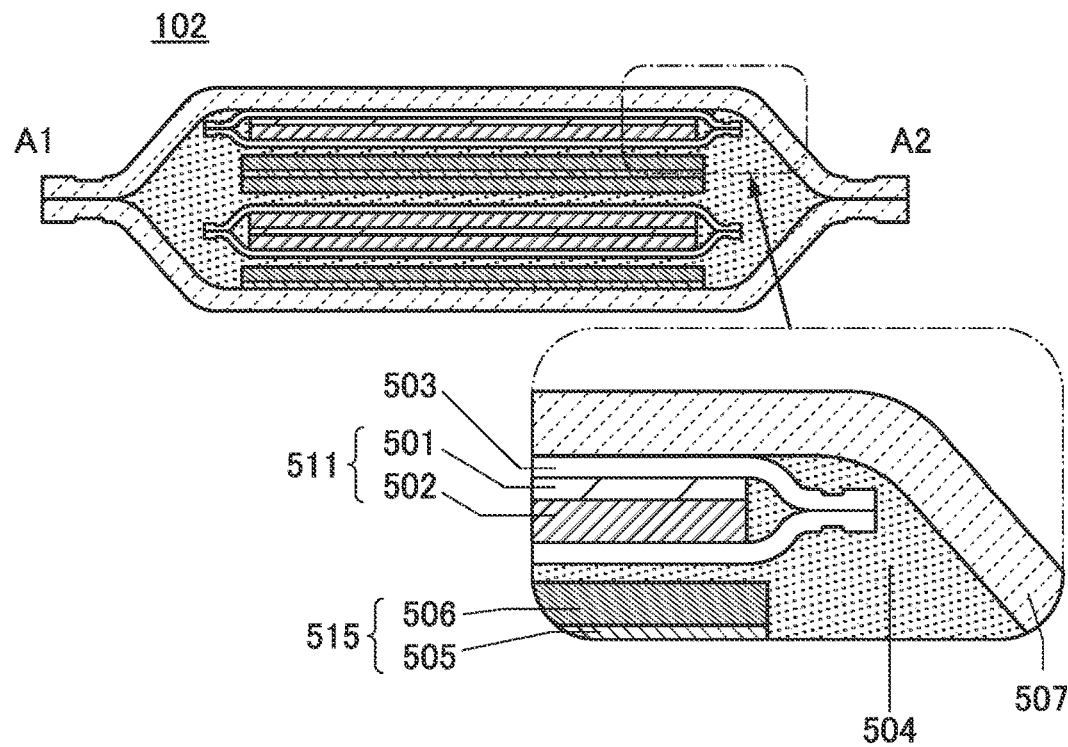
FIGS. 16A and 16B illustrate a structure of a secondary battery of an embodiment.
Figure 16B:
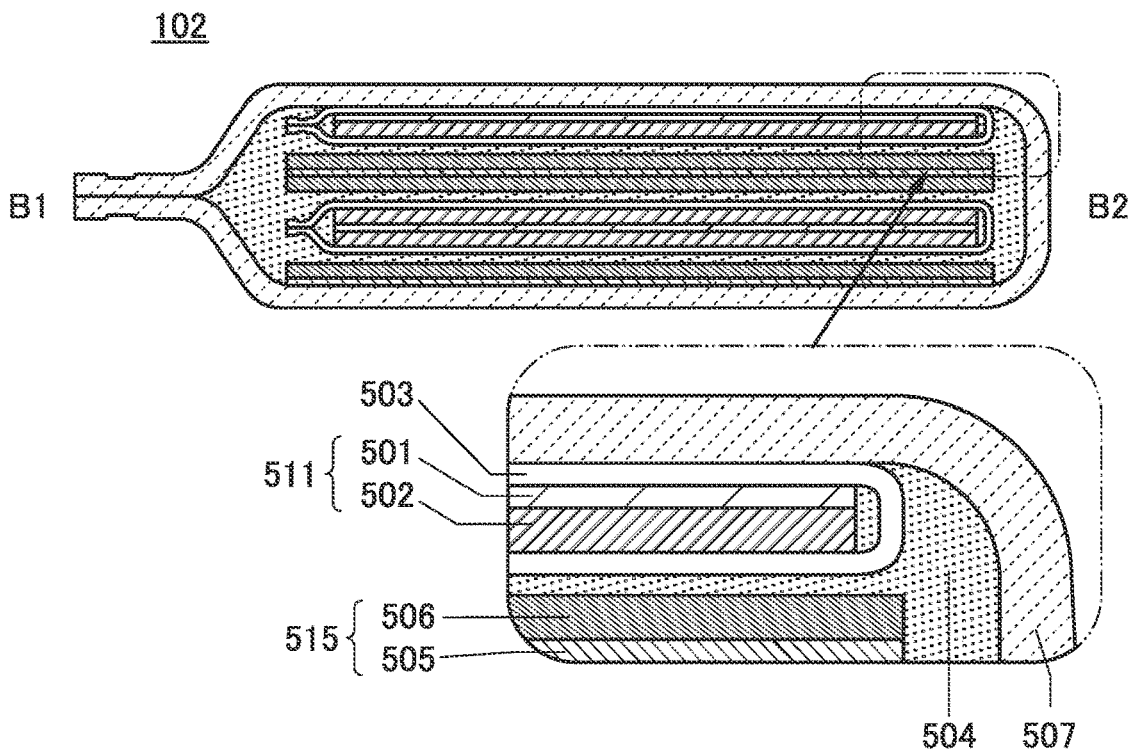

FIG. 15 is a perspective view showing an appearance of the secondary battery 102. FIG. 16A is a cross-sectional view taken along dashed-dotted line A1-A2 in FIG. 15. FIG. 16B is a cross-sectional view taken along dashed-dotted line B1-B2 in FIG. 15.

The secondary battery 102 of one embodiment of the present invention includes, in an exterior body 507, a positive electrode 511 covered with a separator 503, a negative electrode 515, and an electrolyte solution 504. In the example in FIG. 15 and FIGS. 16A and 16B, the secondary battery includes one positive electrode including a positive electrode active material layer 502 on one side of a positive electrode current collector 501, one positive electrode including the positive electrode active material layer 502 on each side of the positive electrode current collector 501, one negative electrode including a negative electrode active material layer 506 on one side of a negative electrode current collector 505, and one negative electrode including the negative electrode active material layer 506 on each side of the negative electrode current collector 505. The positive electrode 511 is electrically connected to a positive electrode lead 521. The negative electrode 515 is electrically connected to a negative electrode lead 525. Each of the positive electrode lead 521 and the negative electrode lead 525 is also referred to as a lead electrode or a lead terminal. Parts of the positive electrode lead 521 and the negative electrode lead 525 are positioned outside the exterior body. The secondary battery 102 is charged and discharged through the positive electrode lead 521 and the negative electrode lead 525.

Note that although FIGS. 16A and 16B illustrate the example in which the positive electrode 511 is covered with the separator 503, one embodiment of the present invention is not limited thereto. The positive electrode 511 is not necessarily covered with the separator 503, for example. The negative electrode 515, instead of the positive electrode 511, may be covered with the separator 503, for example.

(Positive Electrode)

The positive electrode 511 includes, for example, the positive electrode current collector 501 and the positive electrode active material layer 502 formed over the positive electrode current collector 501. Although FIGS. 16A and 16B illustrate the example of one positive electrode 511 including the positive electrode active material layer 502 on only one side of the positive electrode current collector 501 with a sheet shape (or a band-like shape) and one positive electrode 511 including the positive electrode active material layer 502 on each side of the positive electrode current collector 501, one embodiment of the present invention is not limited thereto. Only the positive electrodes 511 each including the positive electrode active material layer 502 on only one side of the positive electrode current collector 501 may be used. Only the positive electrodes 511 each including the positive electrode active material layer 502 on each side of the positive electrode current collector 501 may be used. With the use of the positive electrodes 511 including the positive electrode active material layer 502 on each side of the positive electrode current collector 501 allows the secondary battery 102 to have high capacity. In addition, the secondary battery 102 may include three or more positive electrodes 511. An increase in the number of the positive electrodes 511 in the secondary battery 102 can increase the capacity of the secondary battery 102.

The positive electrode current collector 501 can be formed using a material that has high conductivity and does not dissolve at the potential of the positive electrode, such as a metal typified by stainless steel, gold, platinum, aluminum, or titanium, or an alloy thereof. Alternatively, an aluminum alloy to which an element which improves heat resistance, such as silicon, titanium, neodymium, scandium, or molybdenum, is added can be used. Still alternatively, a metal element which forms silicide by reacting with silicon can be used. Examples of the metal element which forms silicide by reacting with silicon are zirconium, titanium, hafnium, vanadium, niobium, tantalum, chromium, molybdenum, tungsten, cobalt, nickel, and the like. The positive electrode current collector 501 can have a foil-like shape, a plate-like shape (a sheet-like shape), a net-like shape, a punching-metal shape, an expanded-metal shape, or the like as appropriate. The positive electrode current collector 501 preferably has a thickness of greater than or equal to 5 μm and less than or equal to 30 μm. The surface of the positive electrode current collector 501 may be provided with an undercoat using graphite or the like.

The positive electrode active material layer 502 may further include, in addition to a positive electrode active material, a binder for increasing adhesion of the positive electrode active material, a conductive additive for increasing the conductivity of the positive electrode active material layer 502, and the like.

Examples of the positive electrode active material that can be used for the positive electrode active material layer 502 include a composite oxide with an olivine structure, a composite oxide with a layered rock-salt structure, and a composite oxide with a spinel structure. For example, a compound such as $LiFeO_2$, $LiCoO_2$, $LiNiO_2$, $LiMn_2O_4$, $V_2O_5$, $Cr_2O_5$, or $MnO_2$ can be used as the positive electrode active material.

In particular, $LiCoO_2$ is preferable because it has high capacity and higher stability in the air and higher thermal stability than $LiNiO_2$, for example.

It is preferable to add a small amount of lithium nickel oxide (LiNiO$_2$ or LiNi$_{1-x}$M$_x$O$_2$ (0<x<1) (M=Co, Al, or the like)) to a lithium-containing material with a spinel structure which contains manganese such as LiMn$_2$O$_4$ because characteristics of the secondary battery using such a material can be improved.

Alternatively, a complex material (LiMPO$_4$ (general formula) (M is one or more of Fe(II), Mn(II), Co(II), and Ni(II))) can be used. Typical examples of the general formula LiMPO$_4$ which can be used as a material are lithium compounds such as LiFePO$_4$, LiNiPO$_4$, LiCoPO$_4$, LiMnPO$_4$, LiFe$_a$Ni$_b$PO$_4$, LiFe$_a$Co$_b$PO$_4$, LiFe$_a$Mn$_b$PO$_4$, LiNi$_a$Co$_b$PO$_4$, LiNi$_a$Mn$_b$PO$_4$ (a+b≤1, 0<a<1, and 0<b<1), LiFe$_c$Ni$_d$Co$_e$PO$_4$, LiFe$_c$Ni$_d$Mn$_e$PO$_4$, LiNi$_c$Co$_d$Mn$_e$PO$_4$ (c+d+e≤1, 0<c<1, 0<d<1, and 0<e<1), and LiFe$_f$Ni$_g$Co$_h$M-n$_i$PO$_4$ (f+g+h+i≤1, 0<f<1, 0<g<1, 0<h<1, and 0<i<1).

LiFePO$_4$ is particularly preferable because it meets requirements for the positive electrode active material in a balanced manner, such as safety, stability, high capacity density, and the existence of lithium ions that can be extracted in initial oxidation (charging).

Alternatively, a complex material such as Li$_{(2-j)}$MSiO$_4$ (general formula) (M is one or more of Fe(II), Mn(II), Co(II), and Ni(II); 0≤j≤2) can be used. Typical examples of the general formula Li$_{(2-j)}$MSiO$_4$ which can be used as a material are lithium compounds such as Li$_{(2-j)}$FeSiO$_4$, Li$_{(2-j)}$NiSiO$_4$, Li$_{(2-j)}$CoSiO$_4$, Li$_{(2-j)}$MnSiO$_4$, Li$_{(2-j)}$Fe$_k$Ni$_l$SiO$_4$, Li$_{(2-j)}$Fe$_k$Co$_l$SiO$_4$, Li$_{(2-j)}$Fe$_k$Mn$_l$SiO$_4$, Li$_{(2-j)}$Ni$_k$Co$_l$SiO$_4$, Li$_{(2-j)}$Ni$_k$Mn$_l$SiO$_4$ (k+l≤1, 0<k<1, and 0<l<1), Li$_{(2-j)}$Fe$_m$Ni$_n$Co$_q$SiO$_4$, Li$_{(2-j)}$Fe$_m$Ni$_n$Mn$_q$SiO$_4$, Li$_{(2-j)}$Ni$_m$Co$_n$Mn$_q$SiO$_4$ (m+n+q≤1, 0<m<1, 0<n<1, and 0<q<1), and Li$_{(2-j)}$Fe$_r$Ni$_s$Co$_t$Mn$_u$SiO$_4$ (r+s+t+u≤1, 0<r<1, 0<s<1, 0<t<1, and 0<u<1).

Still alternatively, a nasicon compound expressed by A$_x$M$_2$(XO$_4$)$_3$ (general formula) (A=Li, Na, or Mg, M=Fe, Mn, Ti, V, or Nb, X=S, P, Mo, W, As, or Si) can be used for the positive electrode active material. Examples of the nasicon compound are Fe$_2$(MnO$_4$)$_3$, Fe$_2$(SO$_4$)$_3$, and Li$_3$Fe$_2$(PO$_4$)$_3$. Further alternatively, a compound expressed by Li$_2$MPO$_4$F, Li$_2$MP$_2$O$_7$, or Li$_5$MO$_4$ (general formula) (M=Fe or Mn), a perovskite fluoride such as NaFeF$_3$ and FeF$_3$, a metal chalcogenide (a sulfide, a selenide, or a telluride) such as TiS$_2$ and MoS$_2$, an oxide with an inverse spinel structure such as LiMVO$_4$, a vanadium oxide (V$_2$O$_5$, V$_6$O$_{13}$, LiV$_3$O$_8$, or the like), a manganese oxide, an organic sulfur compound, or the like can be used as the positive electrode active material.

In the case where carrier ions are alkali metal ions other than lithium ions, or alkaline-earth metal ions, a material containing an alkali metal (e.g., sodium or potassium) or an alkaline-earth metal (e.g., calcium, strontium, barium, beryllium, or magnesium) instead of lithium may be used as the positive electrode active material. For example, the positive electrode active material may be a layered oxide containing sodium such as NaFeO$_2$ or Na$_{2/3}$[Fe$_{1/2}$Mn$_{1/2}$]O$_2$.

Further alternatively, any of the above materials may be combined to be used as the positive electrode active material. For example, a solid solution obtained by combining two or more of the above materials can be used as the positive electrode active material. For example, a solid solution of LiCo$_{1/3}$Mn$_{1/3}$Ni$_{1/3}$O$_2$ and Li$_2$MnO$_3$ can be used as the positive electrode active material.

Note that although not illustrated, a conductive material such as a carbon layer may be provided on a surface of the positive electrode active material layer 502. With the conductive material such as the carbon layer, conductivity of the electrode can be increased. For example, the positive electrode active material layer 502 can be coated with the carbon layer by mixing a carbohydrate such as glucose at the time of baking the positive electrode active material.

The average particle diameter of the primary particle of the positive electrode active material layer 502 is preferably greater than or equal to 50 nm and less than or equal to 100 μm.

Examples of the conductive additive include acetylene black (AB), graphite (black lead) particles, carbon nanotubes, graphene, and fullerene.

A network for electron conduction can be formed in the positive electrode 511 by the conductive additive. The conductive additive also allows maintaining of a path for electric conduction between the particles of the positive electrode active material layer 502. The addition of the conductive additive to the positive electrode active material layer 502 increases the electron conductivity of the positive electrode active material layer 502.

As the binder, instead of polyvinylidene fluoride (PVDF) as a typical one, polyimide, polytetrafluoroethylene, polyvinyl chloride, ethylene-propylene-diene polymer, styrene-butadiene rubber, acrylonitrile-butadiene rubber, fluorine rubber, polyvinyl acetate, polymethyl methacrylate, polyethylene, nitrocellulose or the like can be used.

The content of the binder in the positive electrode active material layer 502 is preferably greater than or equal to 1 wt % and less than or equal to 10 wt %, further preferably greater than or equal to 2 wt % and less than or equal to 8 wt %, and still further preferably greater than or equal to 3 wt % and less than or equal to 5 wt %. The content of the conductive additive in the positive electrode active material layer 502 is preferably greater than or equal to 1 wt % and less than or equal to 10 wt %, and further preferably greater than or equal to 1 wt % and less than or equal to 5 wt %.

In the case where the positive electrode active material layer 502 is formed by a coating method, the positive electrode active material, the binder, and the conductive additive are mixed to form a positive electrode paste (slurry), and the positive electrode paste is applied to the positive electrode current collector 501 and dried.

(Negative Electrode)

The negative electrode 515 includes, for example, the negative electrode current collector 505 and the negative electrode active material layer 506 formed over the negative electrode current collector 505. Although FIGS. 16A and 16B illustrate the example of one negative electrode 515 including the negative electrode active material layer 506 on only one side of the negative electrode current collector 505 with a sheet shape (or a band-like shape) and one negative electrode 515 including the negative electrode active material layer 506 on each side of the negative electrode current collector 505, one embodiment of the present invention is not limited thereto. Only the negative electrodes 515 each including the negative electrode active material layer 506 on only one side of the negative electrode current collector 505 may be used. In this case, the sides of the negative electrode current collectors 505, each of which is not provided with the negative electrode active material layer 506, are preferably placed to be in contact with each other because such arrangement can make friction between the contacting sides low to easily relieve stress generated when the secondary battery 102 is curved. Only the negative electrodes 515 each including the negative electrode active material layer 506 on each side of the negative electrode current collector 505 may be used. With the use of the negative electrode 515 including the negative electrode active material layer 506 on each side of the negative electrode current collector 505 allows the secondary battery 102 to have high capacity. In addition, the secondary battery 102 may include three or more negative electrodes 515. An increase in the number of the negative electrodes 515 in the secondary battery 102 can increase the capacity of the secondary battery 102.

The negative electrode current collector 505 can be formed using a material that has high conductivity and is not alloyed with a carrier ion of lithium or the like, such as stainless steel, gold, platinum, iron, copper, titanium, or an alloy thereof. Alternatively, an aluminum alloy to which an element which improves heat resistance, such as silicon, titanium, neodymium, scandium, or molybdenum, is added can be used. The negative electrode current collector 505 can have a foil-like shape, a plate-like shape (a sheet-like shape), a net-like shape, a punching-metal shape, an expanded-metal shape, or the like as appropriate. The negative electrode current collector 505 preferably has a thickness greater than or equal to 5 μm and less than or equal to 30 μm. The surface of the negative electrode current collector 505 may be provided with an undercoat using graphite or the like.

The negative electrode active material layer 506 may further include, in addition to a negative electrode active material, a binder for increasing adhesion of the negative electrode active material, a conductive additive for increasing the conductivity of the negative electrode active material layer 506, and the like.

There is no particular limitation on the negative electrode active material as long as it is a material with which lithium can be dissolved and precipitated or a material into/from which lithium ions can be inserted and extracted. Other than a lithium metal or lithium titanate, a carbon-based material generally used in the field of power storage, an alloy-based material, or the like can also be used for the negative electrode active material layer 506.

The lithium metal is preferable because of its low redox potential (−3.045 V lower than that of a standard hydrogen electrode) and high specific capacity per unit weight and per unit volume (3860 mAh/g and 2062 mAh/cm$^3$).

Examples of the carbon-based material include graphite, graphitizing carbon (soft carbon), non-graphitizing carbon (hard carbon), a carbon nanotube, graphene, carbon black, and the like.

Examples of the graphite include artificial graphite such as meso-carbon microbeads (MCMB), coke-based artificial graphite, or pitch-based artificial graphite and natural graphite such as spherical natural graphite.

Graphite has a low potential substantially equal to that of a lithium metal (0.1 V to 0.3 V vs. Li/Li$^+$) when lithium ions are inserted into the graphite (when a lithium-graphite intercalation compound is formed). For this reason, a lithium ion battery can have a high operating voltage. In addition, graphite is preferable because of its advantages such as relatively high capacity per unit volume, small volume expansion, low cost, and safety greater than that of a lithium metal.

For the negative electrode active material, an alloy-based material or an oxide which enables charge-discharge reaction by an alloying reaction and a dealloying reaction with lithium can be used. In the case where lithium ions are carrier ions, the alloy-based material is, for example, a material containing at least one of Mg, Ca, Al, Si, Ge, Sn, Pb, Sb, Bi, Ag, Au, Zn, Cd, Hg, In, and the like. Such elements have higher capacity than carbon. In particular, silicon has a significantly high theoretical capacity of 4200 mAh/g. For this reason, silicon is preferably used as the negative electrode active material. Examples of the alloy-based material using such elements include $Mg_2Si$, $Mg_2Ge$, $Mg_2Sn$, $SnS_2$, $V_2Sn_3$, $FeSn_2$, $CoSn_2$, $Ni_3Sn_2$, $Cu_6Sn_5$, $Ag_3Sn$, $Ag_3Sb$, $Ni_2MnSb$, $CeSb_3$, $LaSn_3$, $La_3Co_2Sn_7$, $CoSb_3$, InSb, SbSn, and the like.

Alternatively, for the negative electrode active material, an oxide such as SiO, SnO, $SnO_2$, titanium oxide ($TiO_2$), lithium titanium oxide ($Li_4Ti_5O_{12}$), lithium-graphite intercalation compound ($Li_xC_6$), niobium oxide ($Nb_2O_5$), tungsten oxide ($WO_2$), or molybdenum oxide ($MoO_2$) can be used.

Still alternatively, for the negative electrode active material, $Li_{(3-x)}M_xN$ (M is Co, Ni, or Cu) with a $Li_3N$ structure, which is a nitride containing lithium and a transition metal, can be used. For example, $Li_{2.6}Co_{0.4}N_3$ is preferable because of high charge and discharge capacity (900 mAh/g and 1890 mAh/cm$^3$).

A nitride containing lithium and a transition metal is preferably used, in which case lithium ions are contained in the negative electrode active materials and thus the negative electrode active materials can be used in combination with a material for a positive electrode active material that does not contain lithium ions, such as $V_2O_5$ or $Cr_3O_8$. Note that in the case of using a material containing lithium ions as a positive electrode active material, the nitride containing lithium and a transition metal can be used as the negative electrode active material by extracting the lithium ions contained in the positive electrode active material in advance.

Alternatively, a material which causes a conversion reaction can be used as the negative electrode active material. For example, a transition metal oxide with which an alloying reaction with lithium is not caused, such as cobalt oxide (CoO), nickel oxide (NiO), or iron oxide (FeO), may be used for the negative electrode active material. Other examples of the material which causes a conversion reaction include oxides such as $Fe_2O_3$, CuO, $Cu_2O$, $RuO_2$, and $Cr_2O_3$, sulfides such as $CoS_{0.89}$, NiS, or CuS, nitrides such as $Zn_3N_2$, $Cu_3N$, and $Ge_3N_4$, phosphides such as $NiP_2$, $FeP_2$, and $CoP_3$, and fluorides such as $FeF_3$ and $BiF_3$. Note that any of the fluorides can be used as a positive electrode active material because of its high electrode potential.

In the case where the negative electrode active material layer 506 is formed by a coating method, the negative electrode active material and the binder are mixed to form a negative electrode paste (slurry), and the negative electrode paste is applied to the negative electrode current collector 505 and dried. Note that a conductive additive may be added to the negative electrode paste.

Graphene may be formed on a surface of the negative electrode active material layer 506. In the case of using silicon as the negative electrode active material, the volume of silicon is greatly changed due to occlusion and release of carrier ions in charge-discharge cycles. Therefore, adhesion between the negative electrode current collector 505 and the negative electrode active material layer 506 is decreased, resulting in degradation of battery characteristics caused by charge and discharge. Thus, graphene is preferably formed on a surface of the negative electrode active material layer 506 containing silicon because even when the volume of silicon is changed in charge-discharge cycles, decrease in the adhesion between the negative electrode current collector 505 and the negative electrode active material layer 506 can be inhibited, which makes it possible to reduce degradation of battery characteristics.

Alternatively, a coating film of an oxide or the like may be formed on the surface of the negative electrode active material layer 506. A coating film formed by decomposition or the like of an electrolyte solution or the like in charging cannot release electric charges used at the formation, and therefore forms irreversible capacity. In contrast, the film of an oxide or the like provided on the surface of the negative electrode active material layer 506 in advance can reduce or prevent generation of irreversible capacity.

As the coating film coating the negative electrode active material layer 506, an oxide film of any one of niobium, titanium, vanadium, tantalum, tungsten, zirconium, molybdenum, hafnium, chromium, aluminum, and silicon or an oxide film containing any one of these elements and lithium can be used. Such a coating film is denser than a conventional coating film formed on a surface of a negative electrode due to a decomposition product of an electrolyte solution.

For example, niobium oxide ($Nb_2O_5$) has a low electric conductivity of $10^{-9}$ S/cm and a high insulating property. For this reason, a niobium oxide film inhibits electrochemical decomposition reaction between the negative electrode active material and the electrolyte solution. On the other hand, niobium oxide has a lithium diffusion coefficient of $10^{-9}$ cm$^2$/sec and high lithium ion conductivity. Therefore, niobium oxide can transmit lithium ions. Alternatively, silicon oxide or aluminum oxide may be used.

A sol-gel method can be used to coat the negative electrode active material layer 506 with the coating film, for example. The sol-gel method is a method for forming a thin film in such a manner that a solution of metal alkoxide, a metal salt, or the like is changed into a gel, which has lost its fluidity, by hydrolysis reaction and polycondensation reaction and the gel is baked. Since a thin film is formed from a liquid phase in the sol-gel method, raw materials can be mixed uniformly on the molecular scale. For this reason, by adding a negative electrode active material such as graphite to a raw material of the metal oxide film which is a solvent, the active material can be easily dispersed into the gel. In such a manner, the coating film can be formed on the surface of the negative electrode active material layer 506. A decrease in the capacity of the power storage unit can be prevented by using the coating film.

(Separator)

As a material of the separator 503, a porous insulator such as cellulose, polypropylene (PP), polyethylene (PE), polybutene, nylon, polyester, polysulfone, polyacrylonitrile, polyvinylidene fluoride, tetrafluoroethylene, or polyphenylene sulfide can be used. Alternatively, nonwoven fabric of a glass fiber or the like, or a diaphragm in which a glass fiber and a polymer fiber are mixed may be used.

(Electrolyte Solution)

As an electrolyte in the electrolyte solution 504, a material having carrier ion mobility and containing lithium ions serving as carrier ions is used. Typical examples of the electrolyte are lithium salts such as $LiPF_6$, $LiClO_4$, $LiAsF_6$, $LiBF_4$, $LiCF_3SO_3$, $Li(CF_3SO_2)_2N$, $Li(C_2F_5SO_2)_2N$, and $Li(SO_2F)_2N$. One of these electrolytes may be used alone, or two or more of them may be used in an appropriate combination and in an appropriate ratio.

As a solvent of the electrolyte solution 504, a material having carrier ion mobility is used. As the solvent of the electrolyte solution, an aprotic organic solvent is preferably used. Typical examples of aprotic organic solvents include ethylene carbonate (EC), propylene carbonate, dimethyl carbonate, diethyl carbonate (DEC), ethylmethyl carbonate (EMC), γ-butyrolactone, acetonitrile, dimethoxyethane, tetrahydrofuran, and the like, and one or more of these materials can be used. When a gelled high-molecular material is used as the solvent of the electrolytic solution or a high-molecular material for gelling is added to the electrolytic solution, for example, safety against liquid leakage and the like is improved. Furthermore, the storage battery can be thinner and more lightweight. Typical examples of gelled high-molecular materials include a silicone gel, an acrylic gel, an acrylonitrile gel, a polyethylene oxide-based gel, a polypropylene oxide-based gel, a gel of a fluorine-based polymer, and the like. Alternatively, the use of one or more kinds of ionic liquids (room temperature molten salts) which have features of non-flammability and non-volatility as the solvent of the electrolyte solution can prevent the storage battery from exploding or catching fire even when the storage battery internally shorts out or the internal temperature increases owing to overcharging or the like. An ionic liquid is a salt in the fluid state and has high ion mobility (conductivity). An ionic liquid contains a cation and an anion. Examples of ionic liquids include an ionic liquid containing an ethylmethylimidazolium (EMI) cation and an ionic liquid containing an N-methyl-N-propylpiperidinium ($PP_{13}$) cation.

(Exterior Body)

There are a variety of structures of a secondary battery, and a film is used for formation of the exterior body 507 in this embodiment. Note that the film used for the exterior body 507 is a single-layer film selected from a metal film (e.g., an aluminum film, a stainless steel film, and a nickel steel film), a plastic film made of an organic material, a hybrid material film including an organic material (e.g., an organic resin or fiber) and an inorganic material (e.g., ceramic), and a carbon-containing inorganic film (e.g., a carbon film or a graphite film); or a stacked-layer film including two or more of the above films. Forming depressions or projections on a surface of a metal film by embossing increases the surface area of the exterior body 507 exposed to outside air, achieving efficient heat dissipation.

In the case where the secondary battery 102 is changed in form by externally applying force, bending stress is externally applied to the exterior body 507 of the secondary battery 102. This might partly deform or damage the exterior body 507. Projections or depressions formed on the exterior body 507 can relieve a strain caused by stress applied to the exterior body 507. Therefore, the secondary battery 102 can be more reliable. Note that a "strain" is the scale of change in form indicating the displacement of a point of an object relative to the reference (initial) length of the object. The exterior body 507 having depressions or projections can reduce the influence of a strain caused by application of external force to the power storage unit to an acceptable level. Thus, the power storage unit having high reliability can be provided.

The above is the description of the structure example.

Fabricating Method Example

An example of a fabricating method of the secondary battery 102 will be described below.

(Preparing Positive Electrode and Covering it with Separator)

Figure 17A:
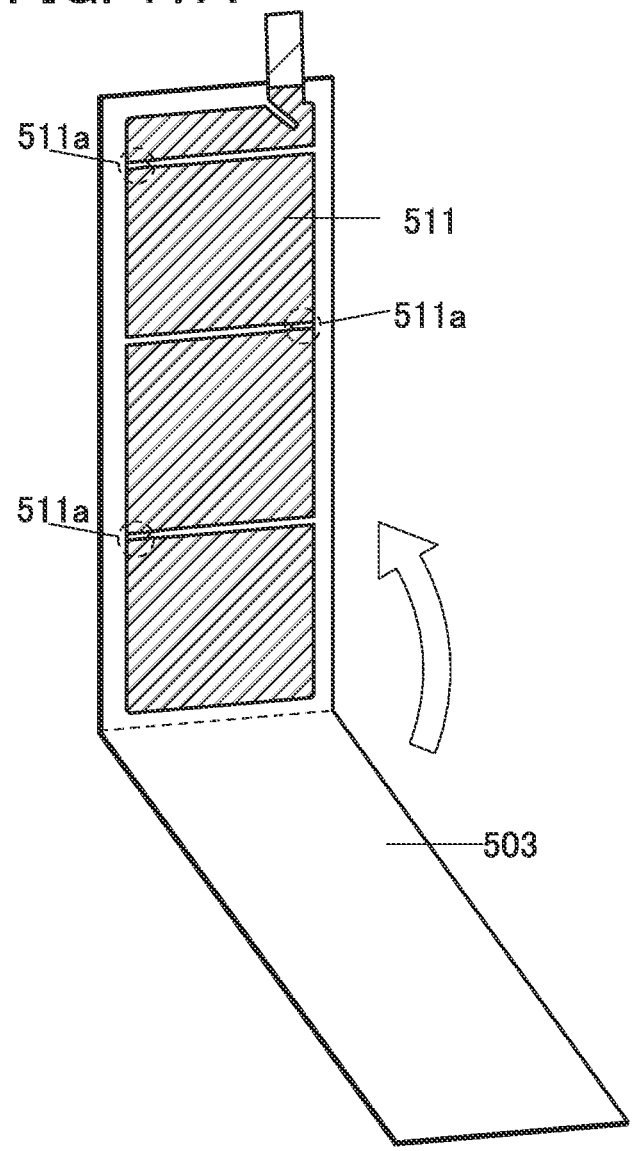
FIGS. 17A to 17C illustrate a method for fabricating a secondary battery of an embodiment.

First, the positive electrode 511 including the positive electrode active material layer 502 is placed on the separator 503 (see FIG. 17A). FIG. 17A illustrates an example where the positive electrode active material layer 502 is provided on each side of the positive electrode current collector 501 having a meandering shape in which slits are formed.

The slit formed in the positive electrode current collectors 501 can suppress the difference between the positions of end portions of the plurality of current collectors when the secondary battery 102 is curved. The slit can also relieve tension applied to the current collector far from the curvature center.

Furthermore, there is no positive electrode active material layer 502 in a region 511a, which overlaps with a later-described slit of the negative electrode 515 when the positive electrode 511 and the negative electrode 515 are stacked in a later step. If the positive electrode active material layer 502 is present in the region 511a, which overlaps with the slit of the negative electrode 515, there is no negative electrode active material layer 506 over and below the positive electrode active material layer 502 in the region 511a, which might cause a problem in a battery reaction. Specifically, this might concentrate carrier ions released from the positive electrode active material layer 502 in the negative electrode active material layer 506 in the region closest to the slit, so that the carrier ions might be deposited on the negative electrode active material layer 506. Thus, the deposition of the carrier ions on the negative electrode active material layer 506 can be suppressed when there is no positive electrode active material layer 502 in the region 511a, which overlaps with the slit of the negative electrode 515.

Then, the separator 503 is folded along the dotted line in FIG. 17A so that the positive electrode 511 is interposed between facing parts of the separator 503. Next, the outer edges of the separator 503, which is outside of the positive electrode 511, are bonded to form the bag-like separator 503 (see FIG. 17B). The bonding of the outer edges of the separator 503 can be performed with the use of an adhesive or the like, by ultrasonic welding, or by thermal fusion bonding.

Figure 17B:
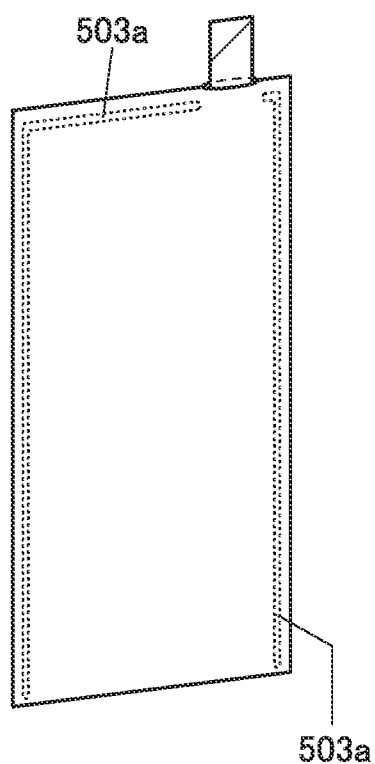

In this embodiment, polypropylene is used as the separator 503, and the outer edges of the separator 503 are bonded to each other by heating. Bonding portions 503a are illustrated in FIG. 17B. In such a manner, the positive electrode 511 can be covered with the separator 503. The separator 503 is formed so as to cover the positive electrode active material layer 502 and does not necessarily cover the whole positive electrode 511.

Note that although FIGS. 17A and 17B illustrate the example in which the separator 503 is folded, one embodiment of the present invention is not limited thereto. For example, the positive electrode 511 may be interposed between two separators. In that case, the bonding portion 503a may be formed to surround almost all of the four sides of the positive electrode 511.

The outer edges of the separator 503 may be bonded intermittently or may be bonded at dot-like bonding portions provided at regular intervals.

Alternatively, bonding may be performed along only one side of the outer edges. Alternatively, bonding may be performed along only two sides of the outer edges. Alternatively, bonding may be performed along four sides of the outer edges; accordingly, the four sides can be in an even state.

Note that although the case where the positive electrode 511 is covered with the separator 503 is shown in FIGS. 17A and 17B and the like, one embodiment of the present invention is not limited thereto. The positive electrode 511 is not necessarily covered with the separator 503, for example. The negative electrode 515, instead of the positive electrode 511, may be covered with the separator 503, for example.

(Preparing Negative Electrode)

Figure 17C:
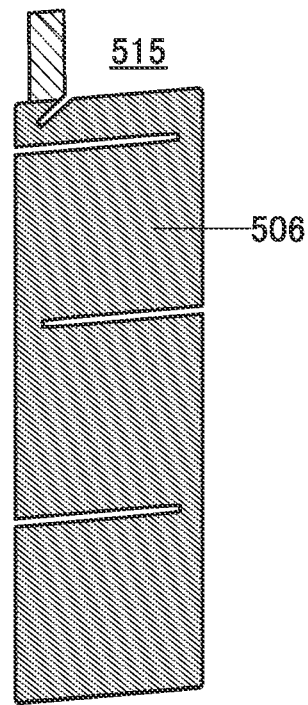

Next, the negative electrode 515 is prepared (see FIG. 17C). FIG. 17C illustrates an example where the negative electrode active material layer 506 is provided on each side of the negative electrode current collector 505 having a meandering shape in which slits are formed.

The slit formed in the negative electrode current collectors 505 can suppress the difference between the positions of end portions of the plurality of current collectors when the secondary battery 102 is curved. The slit can also relieve tension applied to the current collector far from the curvature center.

(Making Positive Electrodes and Negative Electrodes Overlap With Each Other and Connecting Leads)

Figure 18A:
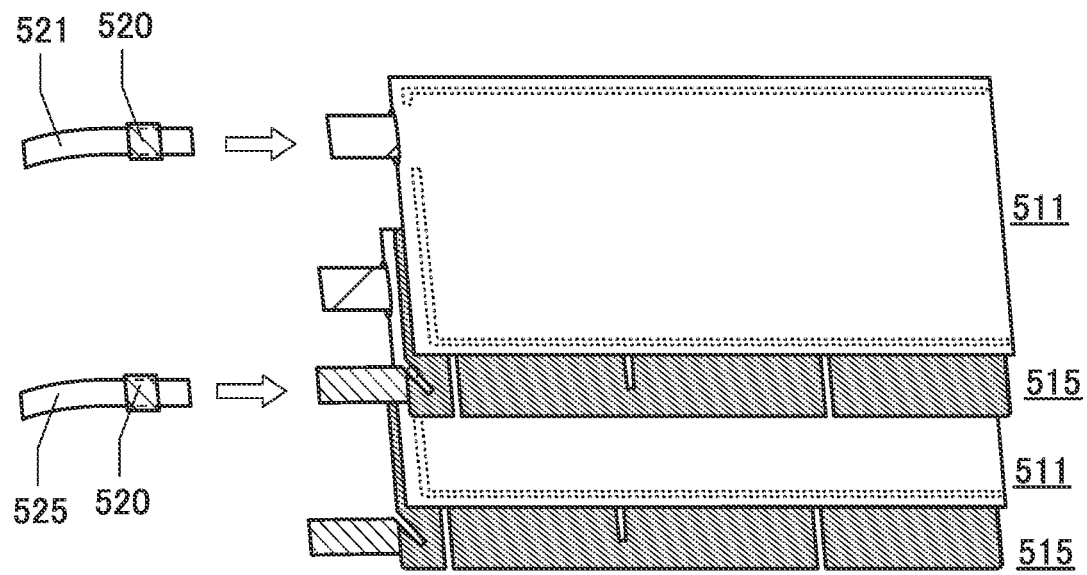
FIGS. 18A and 18B illustrate a method for fabricating a secondary battery of an embodiment.

Next, the positive electrodes 511 and the negative electrodes 515 are stacked (see FIG. 18A). This embodiment shows an example in which two positive electrodes 511 and two negative electrodes 515 are used.

Next, the positive electrode lead 521 including a sealing layer 520 is electrically connected to positive electrode tabs of the plurality of positive electrode current collectors 501 by ultrasonic wave irradiation with pressure applied (ultrasonic welding).

The lead is likely to be cracked or cut by stress due to external force applied after fabrication of the power storage unit.

Figure 18B:
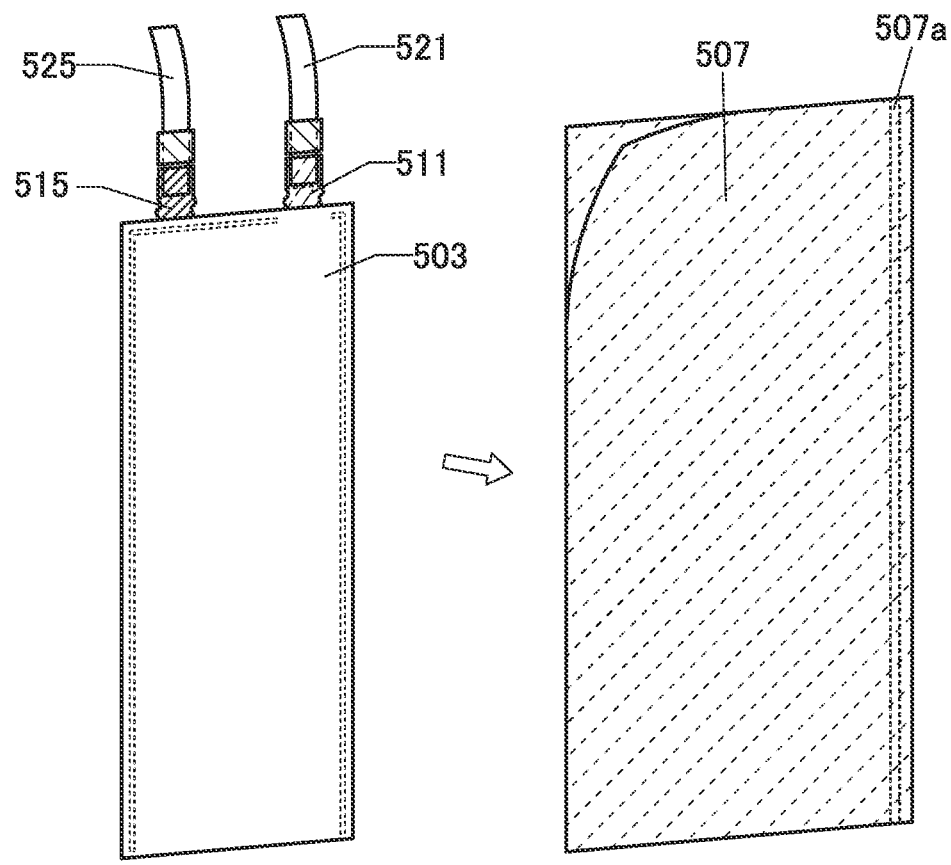

When subjected to ultrasonic welding, the positive electrode lead 521 are placed between bonding dies provided with projections, whereby a connection region and a curved portion can be formed in the positive electrode tab (FIG. 18B).

This curved portion can relieve stress due to external force applied after fabrication of the secondary battery 102. Therefore, the secondary battery 102 can be more reliable.

The curved portion is not necessarily formed in the positive electrode tab. The positive electrode current collector may be formed using a high-strength material such as stainless steel to a thickness of 10 μm or less, in order to easily relieve stress due to external force applied after fabrication of a secondary battery.

It is needless to say that two or more of the above examples may be combined to relieve concentration of stress in the positive electrode tab.

Then, in a manner similar to that of the positive electrode current collector 501, the negative electrode lead 525 including the sealing layer 520 is electrically connected to the negative electrode tab of the negative electrode current collector 505 by ultrasonic welding.

(Preparing Exterior Body and Covering Positive Electrodes and Negative Electrodes)

A film used as an exterior body is folded, and thermocompression bonding is performed along one side of the folded exterior body. A portion where thermocompression bonding is performed along one side of the folded exterior body 507 is shown as a bonding portion 507a in FIG. 18B. With the exterior body 507 thus obtained, the positive electrodes 511 and the negative electrodes 515 are covered.

(Injecting Electrolyte Solution)

Figure 19A:
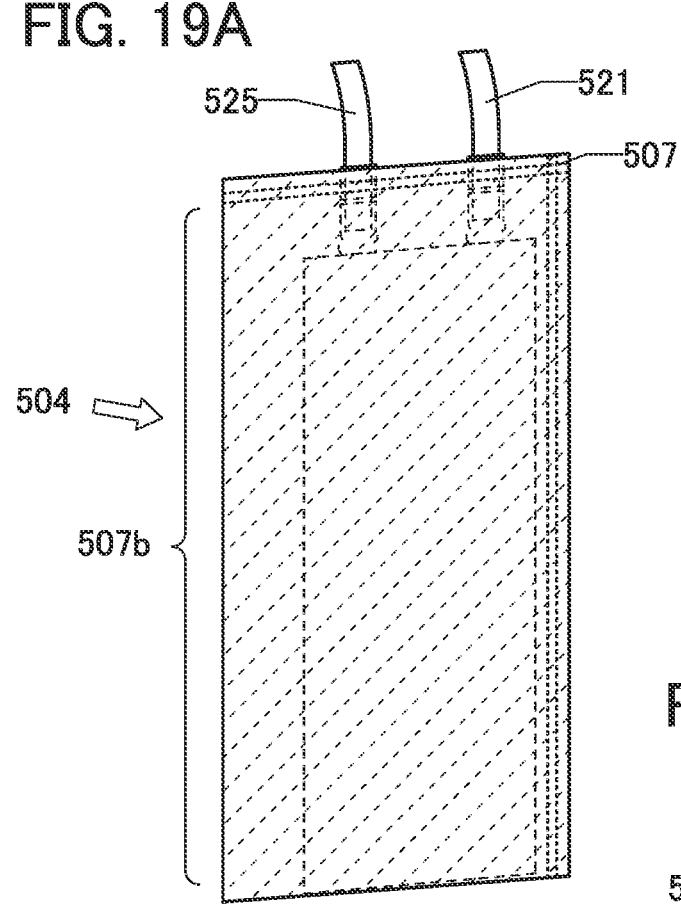
FIGS. 19A and 19B illustrate a method for fabricating a secondary battery of an embodiment.

Next, thermocompression bonding is also performed in a manner similar to the above along one side of the exterior body 507, which overlaps with the sealing layer 520 provided on the positive electrode lead 521 and the sealing layer 520 provided on the negative electrode lead 525 (FIG. 19A). After that, the electrolyte solution 504 is injected from an unsealed side 507b of the exterior body 507, which is illustrated in FIG. 19A, into a region covered with the exterior body 507.

Figure 19B:
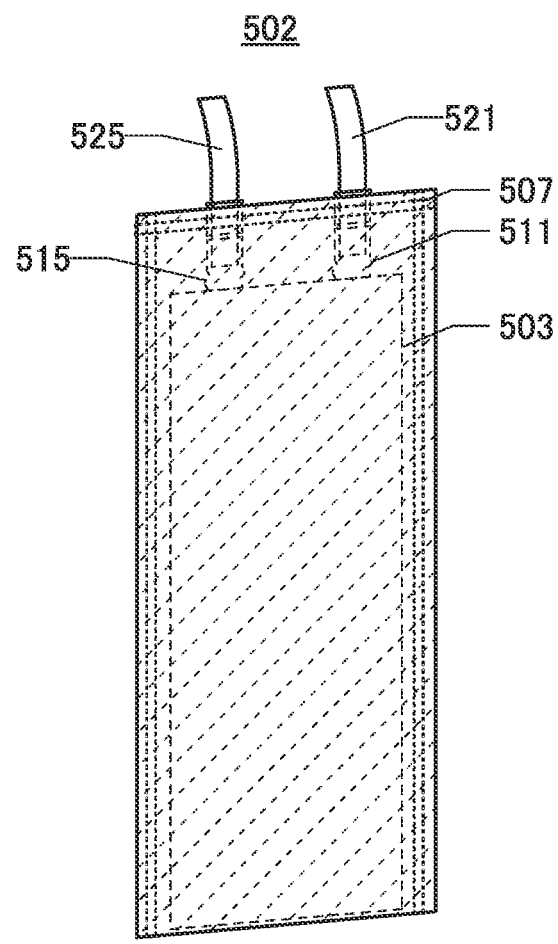

Then, the remaining open side of the exterior body 507 is sealed under vacuum, heating, and pressing, whereby the secondary battery 102 can be formed (FIG. 19B). Injecting the electrolyte solution and sealing are performed in an environment from which oxygen is eliminated, for example, in a glove box. The evacuation to a vacuum is preferably performed with a vacuum sealer, a liquid pouring sealer, or the like. Heating and pressing can be performed for the unsealed side 507b placed between two heatable bars included in the sealer. An example of the conditions is as follows: the degree of vacuum is 60 kPa, the heating temperature is 190° C., the pressure is 0.1 MPa, and the time is 3 seconds. Here, sealing may be performed while the exterior body 507 is held down on its upper side. Thus, bubbles which enter between the positive electrode and the negative electrode when the electrolyte solution is injected can be removed.

Modification Example

Figure 20A:
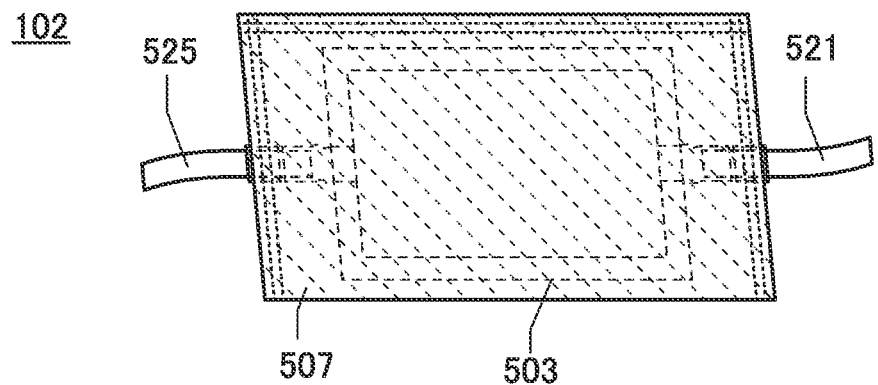
FIGS. 20A and 20B illustrate a structure of a secondary battery and a fabricating method thereof.
Figure 20B:
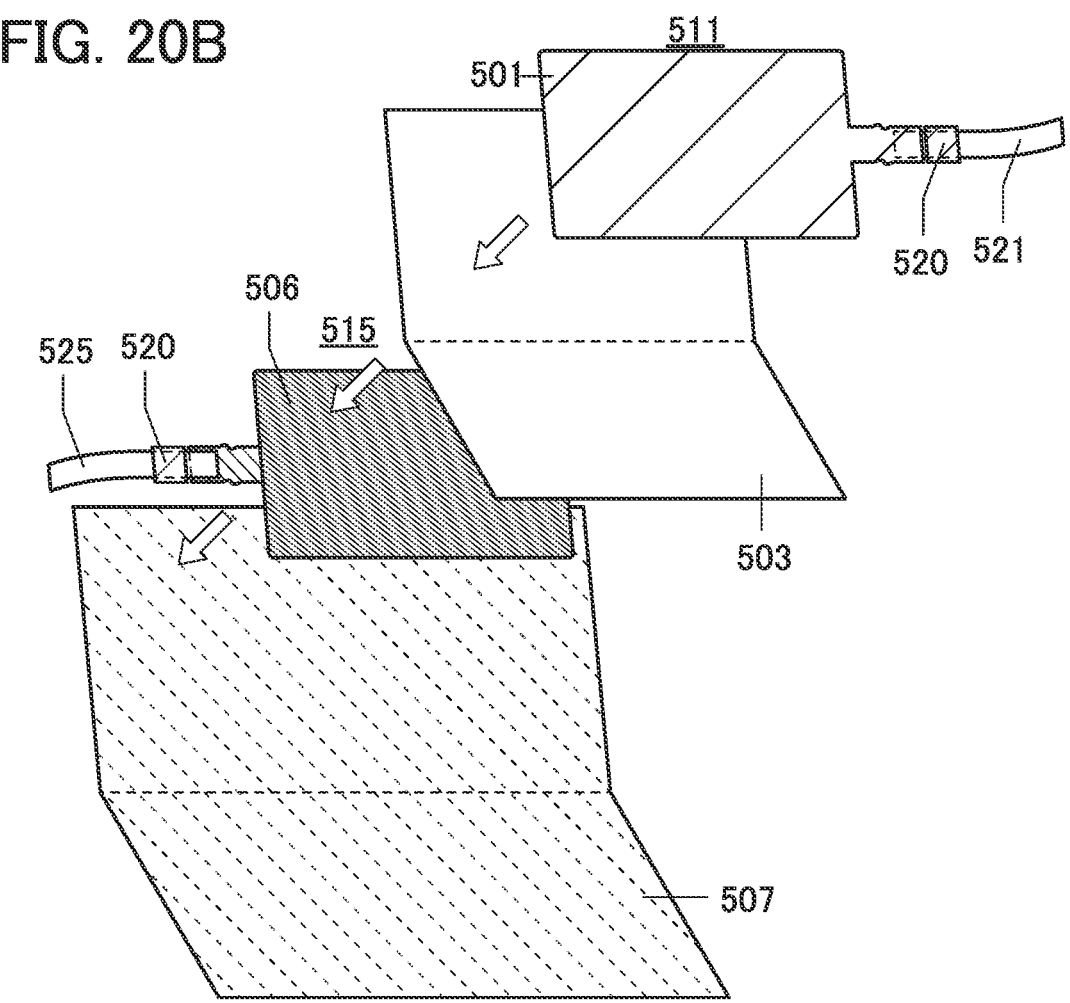

FIG. 20A illustrates a modification example of the secondary battery 102. The secondary battery 102 illustrated in FIG. 20A is different from the secondary battery 102 shown in FIG. 15 in the arrangement of the positive electrode lead 521 and the negative electrode lead 525. Specifically, the positive electrode lead 521 and the negative electrode lead 525 in the secondary battery 102 in FIG. 15 are provided on the same side of the exterior body 507, whereas the positive electrode lead 521 and the negative electrode lead 525 in the secondary battery 102 in FIGS. 20A and 20B are provided on different sides of the exterior body 507. Thus, the leads of the secondary battery of one embodiment of the present invention can be freely positioned, and accordingly the degree of freedom in design is high. Accordingly, a product including the secondary battery of one embodiment of the present invention can have a higher degree of freedom in design. Furthermore, the yield of products each including the secondary battery of one embodiment of the present invention can be increased.

FIG. 20B illustrates a fabrication process of the secondary battery 102 in FIG. 20A. The fabricating method of the secondary battery 102 in FIG. 15 can be referred to for the details. Note that in FIG. 20B, the electrolyte solution 504 is not illustrated.

Pressing (e.g., embossing) may be performed to form unevenness in advance on a surface of a film used as the exterior body 507. The unevenness on the surface of the film increases flexibility of a secondary battery and further relieves stress. The depressions or projections of a surface (or a rear surface) of the film formed by embossing form an obstructed space that is sealed by the film serving as a part of a wall of the sealing structure and whose inner volume is variable. It can be said that the depressions or projections of the film form an accordion structure (bellows structure) in this obstructed space. Note that embossing, which is a kind of pressing, is not necessarily employed and any method that allows formation of a relief on part of the film is employed.

Note that one embodiment of the present invention is not limited thereto. Various embodiments of the invention are described in this embodiment and the other embodiment, and one embodiment of the present invention is not limited to a particular embodiment. For example, although an example of use of one embodiment of the present invention in a lithium-ion secondary battery is described, one embodiment of the present invention is not limited thereto. One embodiment of the present invention can be used for a variety of secondary batteries, a lead storage battery, a lithium-ion polymer secondary battery, a nickel-hydrogen storage battery, a nickel-cadmium storage battery, a nickel-iron storage battery, a nickel-zinc storage battery, a silver oxide-zinc storage battery, a solid-state battery, an air battery, a primary battery, a capacitor or a lithium ion capacitor, and the like. One embodiment of the present invention is not necessarily used for a lithium-ion secondary battery.

The above is the description of the fabricating method example.

At least part of this embodiment can be implemented in combination with any of the other embodiment described in this specification as appropriate.

EXPLANATION OF REFERENCE

10: connecting member, 11: pipe, 11a: partition wall, 11b: portion, 11c: portion, 12: pivot, 12a: tip portion, 12b: collar portion, 12c: axis portion, 12d: end portion, 13: spring, 13a: spring, 13b: spring, 14: cushioning material, 15: cushioning material, 20: power supply device, 20a: power supply device, 20b: power supply device, 21: exterior body, 21a: exterior body, 21b: exterior body, 21c: exterior body, 21d: exterior body, 22: battery, 23: tab, 24: wiring, 25: conductive member, 26: exterior body, 27: content, 28: protective circuit, 29: substrate, 30: electronic device, 31: housing, 32: display portion, 33: lug, 34: bearing, 35: switch, 41: battery, 42: tab, 42a: electrode, 42b: electrode, 50: system, 51: buckle, 52: hole, 61: control portion, 62: power control portion, 63: functional circuit, 64: sensor, 65: battery, 66: power receiving portion, 68: power supply line, 69: bus line, 71: terminal, 72: wiring, 73a: cushioning portion, 73b: cushioning material, 75: substrate, 76a: FPC, 76b: FPC, 102: secondary battery, 300: head-mounted display, 301: housing, 302: display portion, 303: operation button, 305: lens, 306: dial, 310: mobile information terminal, 311: housing, 312: display portion, 313: operation button, 314: external connection port, 315: speaker, 316: microphone, 317: camera, 320: camera, 321: housing, 322: display portion, 323: operation button, 324: shutter button, 326: lens, 501: positive electrode current collector, 502: positive electrode active material layer, 503: separator, 503a: bonding portion, 504: electrolyte solution, 505: negative electrode current collector, 506: negative electrode active material layer, 507: exterior body, 507a: bonding portion, 507b: side, 511: positive electrode, 511a: region, 515: negative electrode, 520: sealing layer, 521: positive electrode lead, 525: negative electrode lead This application is based on Japanese Patent Application serial No. 2016-035810 filed with Japan Patent Office on Feb. 26, 2016, the entire contents of which are hereby incorporated by reference.

What is claimed is:

1. A head-mounted display device comprising:
a housing;
a display portion placed in the housing; and
a power supply device attached to the housing,
wherein the power supply device comprises a battery,
wherein the battery comprises:
   an exterior body;
   a pair of tabs; and
   a content,
wherein the exterior body comprises a flexible and moisture-resistant film,
wherein the battery is bendable,
wherein the content is sealed by the exterior body,
wherein the content comprises:
   a positive electrode;

a negative electrode; and an electrolyte, wherein one of the pair of tabs is electrically connected to the positive electrode, wherein the other of the pair of tabs is electrically connected to the negative electrode, and wherein the pair of tabs partly projects from the exterior body.

2. The head-mounted display device according to claim 1, wherein the battery comprises a protective circuit, and wherein the protective circuit is provided between the exterior body and a conductive member.

3. A head-mounted display device comprising:

a housing;

a first battery placed in the housing;

a display portion placed in the housing;

a power supply device attached to the housing; and an operation button in the housing, wherein the power supply device comprises a second battery, wherein the power supply device has a strap-like shape, wherein the second battery comprises:

an exterior body;

a pair of tabs; and a content, wherein the exterior body comprises a flexible and moisture-resistant film, wherein the second battery is bendable, wherein the content is sealed by the exterior body, wherein the content comprises:

a positive electrode;

a negative electrode; and an electrolyte, wherein one of the pair of tabs is electrically connected to the positive electrode, wherein the other of the pair of tabs is electrically connected to the negative electrode, and wherein the pair of tabs partly projects from the exterior body.

4. The head-mounted display device according to claim 3, wherein the second battery comprises a protective circuit, and wherein the protective circuit is provided between the exterior body and a conductive member.

5. A head-mounted display device comprising:

a housing;

a wireless receiver placed in the housing;

a first battery placed in the housing;

a display portion placed in the housing;

a lens provided between the display portion and an eye of a user; and a power supply device attached to the housing, wherein the power supply device comprises a second battery, wherein the power supply device has a strap-like shape, wherein the wireless receiver is configured to receive image data, wherein the display portion is configured to display an image based on the image data, wherein the second battery comprises:

an exterior body;

a pair of tabs; and a content, wherein the exterior body comprises a flexible and moisture-resistant film, wherein the second battery is bendable, wherein the content is sealed by the exterior body, wherein the content comprises:

a positive electrode;

a negative electrode; and an electrolyte, wherein one of the pair of tabs is electrically connected to the positive electrode, wherein the other of the pair of tabs is electrically connected to the negative electrode, and wherein the pair of tabs partly projects from the exterior body.

6. The head-mounted display device according to claim 5, wherein the second battery comprises a protective circuit, and wherein the protective circuit is provided between the exterior body and a conductive member.

* * * * *